(12) United States Patent (10) Patent No.: US 8,015,183 B2
Frank (45) Date of Patent: Sep. 6, 2011

(54) SYSTEM AND METHODS FOR PROVIDING STATSTICALLY INTERESTING GEOGRAPHICAL INFORMATION BASED ON QUERIES TO A GEOGRAPHIC SEARCH ENGINE

(75) Inventor: John R. Frank, Cambridge, MA (US)

(73) Assignee: Nokia Corporation, Espoo (FI)

( * ) Notice: Subject to any disclaimer, the term of this patent is extended or adjusted under 35 U.S.C. 154(b) by 315 days.

(21) Appl. No.: 11/818,074

(22) Filed: Jun. 12, 2007

(65) Prior Publication Data

US 2008/0010262 A1 Jan. 10, 2008

Related U.S. Application Data

(60) Provisional application No. 60/812,865, filed on Jun. 12, 2006.

(51) Int. Cl.
*G06F 7/00* (2006.01)
*G06F 17/30* (2006.01)

(52) U.S. Cl. ........ 707/724; 707/728; 707/743; 707/770; 702/179; 715/253; 715/277

(58) Field of Classification Search .................. 707/1, 3, 707/5, 10, 100–102, 104.1, 729, 723, 724, 707/730, 728, 715, 743, 770; 700/83, 86; 701/200; 715/716, 253, 277; 345/629, 641, 345/677; 702/179
See application file for complete search history.

(56) References Cited

U.S. PATENT DOCUMENTS

| | | | |
|---|---|---|---|
| 5,032,989 A | 7/1991 | Tornetta | |
| 5,623,541 A | 4/1997 | Boyle et al. | |
| 5,659,732 A * | 8/1997 | Kirsch ............................ | 707/5 |
| 5,664,115 A | 9/1997 | Fraser | |
| 5,668,897 A | 9/1997 | Stolfo | |
| 5,761,538 A * | 6/1998 | Hull .............................. | 712/300 |
| 5,778,362 A | 7/1998 | Deerwester et al. | |
| 5,802,361 A * | 9/1998 | Wang et al. .................... | 382/217 |
| 5,839,088 A | 11/1998 | Hancock et al. | |
| 5,845,278 A * | 12/1998 | Kirsch et al. ....................... | 707/3 |

(Continued)

FOREIGN PATENT DOCUMENTS

EP 1 426 876 A 6/2004

(Continued)

OTHER PUBLICATIONS

"Integrating symbolic images into a multimedia database system using classification and abstraction approarach", Aya Soffer, and Hanan Samet—The VLDB Journal vol. 7, issue 4 (Dec. 1998) (pp. 253-274)—Springer-verlag New York, Inc.Secausus, NJ, USA.*

(Continued)

*Primary Examiner* — Jean B. Fleurantin
*Assistant Examiner* — Anh Ly
(74) *Attorney, Agent, or Firm* — Ditthavong Mori & Steiner, P.C.

(57) ABSTRACT

Under one aspect, an interface program stored on a computer-readable medium causes a computer system with a display device to perform the functions of: accepting search criteria from a user, the search criteria including a domain identifier identifying a domain and a free text query entry; in response to accepting said search criteria from the user, receiving a set of document-location tuples from a corpus of documents, wherein each document: (a) contains information that is responsive to the free text query entry; and (b) contains location-related information that refers to a location within the domain; requesting and receiving a result from an additional query based at least in part on the domain identifier, the result not being a document-location tuple; and displaying a visual representation of at least a subset of the document-location tuples and a visual representation of the result of the additional query on the display device.

34 Claims, 23 Drawing Sheets

U.S. PATENT DOCUMENTS

| | | | |
|---|---|---|---|
| 5,852,810 | A | 12/1998 | Sotiroff et al. |
| 5,856,060 | A | 1/1999 | Kawamura et al. |
| 5,870,559 | A * | 2/1999 | Leshem et al. ............... 709/224 |
| 5,878,126 | A | 3/1999 | Velamuri et al. |
| 5,893,093 | A * | 4/1999 | Wills ................................ 707/5 |
| 5,920,856 | A * | 7/1999 | Syeda-Mahmood ............. 707/3 |
| 5,930,474 | A * | 7/1999 | Dunworth et al. ............ 709/217 |
| 5,958,008 | A * | 9/1999 | Pogrebisky et al. .......... 709/223 |
| 5,960,447 | A | 9/1999 | Holt et al. |
| 5,961,571 | A | 10/1999 | Gorr et al. |
| 5,961,572 | A | 10/1999 | Craport et al. |
| 5,963,956 | A * | 10/1999 | Smartt ........................ 707/104.1 |
| 5,978,747 | A | 11/1999 | Craport et al. |
| 5,978,804 | A | 11/1999 | Dietzman |
| 5,991,754 | A * | 11/1999 | Raitto et al. ...................... 707/2 |
| 5,991,781 | A | 11/1999 | Nielsen |
| 6,035,297 | A | 3/2000 | Van Huben et al. |
| 6,052,691 | A | 4/2000 | Ardoin et al. |
| 6,057,842 | A | 5/2000 | Knowlton et al. |
| 6,070,157 | A * | 5/2000 | Jacobson et al. .................. 707/1 |
| 6,092,076 | A * | 7/2000 | McDonough et al. ......... 707/102 |
| 6,133,913 | A | 10/2000 | White et al. |
| 6,144,962 | A * | 11/2000 | Weinberg et al. ............... 707/10 |
| 6,148,260 | A * | 11/2000 | Musk et al. .................... 701/200 |
| 6,148,289 | A * | 11/2000 | Virdy ................................ 705/1 |
| 6,151,624 | A * | 11/2000 | Teare et al. .................... 709/217 |
| 6,184,823 | B1 | 2/2001 | Smith et al. |
| 6,202,065 | B1 | 3/2001 | Wills |
| 6,233,618 | B1 * | 5/2001 | Shannon ....................... 709/229 |
| 6,236,768 | B1 | 5/2001 | Rhodes et al. |
| 6,237,006 | B1 * | 5/2001 | Weinberg et al. ......... 707/103 R |
| 6,240,410 | B1 | 5/2001 | Wical |
| 6,240,413 | B1 | 5/2001 | Learmont |
| 6,249,252 | B1 | 6/2001 | Dupray |
| 6,269,368 | B1 | 7/2001 | Diamond |
| 6,275,610 | B1 | 8/2001 | Hall et al. |
| 6,282,540 | B1 | 8/2001 | Goldensher et al. |
| 6,295,528 | B1 | 9/2001 | Marcus et al. |
| 6,341,310 | B1 * | 1/2002 | Leshem et al. ................ 709/223 |
| 6,343,139 | B1 | 1/2002 | Finkelstein et al. |
| 6,343,290 | B1 * | 1/2002 | Cossins et al. .................. 707/10 |
| 6,366,851 | B1 | 4/2002 | Chojnacki et al. |
| 6,377,961 | B1 | 4/2002 | Ryu et al. |
| 6,397,228 | B1 | 5/2002 | Lamburt et al. |
| 6,411,293 | B1 | 6/2002 | Sakamoto et al. |
| 6,470,287 | B1 * | 10/2002 | Smartt .......................... 702/102 |
| 6,470,383 | B1 * | 10/2002 | Leshem et al. ................ 709/223 |
| 6,493,711 | B1 * | 12/2002 | Jeffrey .............................. 707/5 |
| 6,542,813 | B1 | 4/2003 | Kovacs et al. |
| 6,556,990 | B1 * | 4/2003 | Lane ................................ 707/6 |
| 6,577,714 | B1 * | 6/2003 | Darcie et al. ................ 379/93.17 |
| 6,584,459 | B1 | 6/2003 | Chang et al. |
| 6,629,065 | B1 * | 9/2003 | Gadh et al. ........................ 703/1 |
| 6,631,364 | B1 | 10/2003 | Rioux et al. |
| 6,640,145 | B2 * | 10/2003 | Hoffberg et al. ............... 700/83 |
| 6,701,307 | B2 * | 3/2004 | Himmelstein et al. ............ 707/3 |
| 6,721,728 | B2 | 4/2004 | McGreevy |
| 6,731,314 | B1 * | 5/2004 | Cheng et al. .................. 715/848 |
| 6,741,981 | B2 * | 5/2004 | McGreevy ........................ 707/3 |
| 6,823,333 | B2 | 11/2004 | McGreevy |
| 6,850,252 | B1 * | 2/2005 | Hoffberg ....................... 715/716 |
| 6,853,389 | B1 | 2/2005 | Ikeda et al. |
| 6,859,800 | B1 * | 2/2005 | Roche et al. ............ 707/999.003 |
| 6,862,586 | B1 | 3/2005 | Kreulen et al. |
| 6,934,710 | B1 | 8/2005 | Mills |
| 7,007,228 | B1 * | 2/2006 | Carro ..................... 707/999.003 |
| 7,017,285 | B2 | 3/2006 | Lakic |
| 7,024,403 | B2 * | 4/2006 | Kyler ................................ 707/3 |
| 7,035,869 | B2 * | 4/2006 | Smartt .......................... 707/102 |
| 7,065,532 | B2 | 6/2006 | Elder et al. |
| 7,092,969 | B2 * | 8/2006 | Meek et al. ............ 707/999.104 |
| 7,107,285 | B2 * | 9/2006 | von Kaenel et al. ........ 707/104.1 |
| 7,117,199 | B2 * | 10/2006 | Frank et al. ........................ 707/3 |
| 7,143,344 | B2 | 11/2006 | Parker et al. |
| 7,163,739 | B2 | 1/2007 | Koike et al. |
| 7,233,942 | B2 | 6/2007 | Nye et al. |
| 7,246,116 | B2 * | 7/2007 | Barsness et al. ......... 707/999.003 |
| 7,274,332 | B1 | 9/2007 | Dupray |
| 7,310,633 | B1 | 12/2007 | Wang et al. |
| 7,325,201 | B2 | 1/2008 | Ferrari et al. |
| 7,353,113 | B2 | 4/2008 | Sprague et al. |
| 7,393,924 | B2 | 7/2008 | Vitaliano et al. |
| 7,403,939 | B1 * | 7/2008 | Virdy ..................... 707/999.003 |
| 7,411,204 | B2 | 8/2008 | Appleby et al. |
| 7,428,528 | B1 * | 9/2008 | Ferrari et al. ...................... 707/3 |
| 7,437,703 | B2 * | 10/2008 | Wu .............................. 717/100 |
| 7,473,843 | B2 | 1/2009 | Wang et al. |
| 7,483,025 | B2 | 1/2009 | Roy et al. |
| 7,539,693 | B2 * | 5/2009 | Frank et al. .................... 707/101 |
| 7,596,581 | B2 * | 9/2009 | Frank et al. ............ 707/999.104 |
| 7,720,806 | B2 * | 5/2010 | Piedmonte .................... 707/719 |
| 7,908,280 | B2 * | 3/2011 | Frank et al. .................... 707/749 |
| 2001/0011270 | A1 | 8/2001 | Himmelstein et al. |
| 2001/0011365 | A1 | 8/2001 | Helfman |
| 2002/0000999 | A1 | 1/2002 | McCarty et al. |
| 2002/0016796 | A1 | 2/2002 | Hurst et al. |
| 2002/0055924 | A1 * | 5/2002 | Liming ......................... 707/100 |
| 2002/0065844 | A1 | 5/2002 | Robinson et al. |
| 2002/0076099 | A1 | 6/2002 | Sakamoto et al. |
| 2002/0078035 | A1 * | 6/2002 | Frank et al. ....................... 707/3 |
| 2002/0082901 | A1 | 6/2002 | Dunning et al. |
| 2002/0151992 | A1 * | 10/2002 | Hoffberg et al. ............... 700/83 |
| 2002/0161736 | A1 * | 10/2002 | Beygelzimer et al. ............ 707/1 |
| 2002/0188599 | A1 * | 12/2002 | McGreevy ........................ 707/3 |
| 2003/0004802 | A1 * | 1/2003 | Callegari ........................ 705/14 |
| 2003/0004914 | A1 * | 1/2003 | McGreevy ......................... 707/1 |
| 2003/0005053 | A1 | 1/2003 | Novaes |
| 2003/0037048 | A1 | 2/2003 | Kabra et al. |
| 2003/0078913 | A1 * | 4/2003 | McGreevy ........................ 707/3 |
| 2003/0097357 | A1 | 5/2003 | Ferrari et al. |
| 2003/0187867 | A1 * | 10/2003 | Smartt .......................... 707/102 |
| 2004/0093328 | A1 | 5/2004 | Damle |
| 2004/0095376 | A1 | 5/2004 | Graham et al. |
| 2004/0100506 | A1 | 5/2004 | Shiota et al. |
| 2004/0117358 | A1 * | 6/2004 | von Kaenel et al. ............. 707/3 |
| 2004/0119759 | A1 * | 6/2004 | Barros .......................... 345/853 |
| 2004/0139400 | A1 | 7/2004 | Allam et al. |
| 2004/0236730 | A1 | 11/2004 | Frank |
| 2005/0004910 | A1 | 1/2005 | Trepess |
| 2005/0008849 | A1 | 1/2005 | Kagami et al. |
| 2005/0091193 | A1 * | 4/2005 | Frank et al. ....................... 707/1 |
| 2005/0091209 | A1 * | 4/2005 | Frank et al. ....................... 707/3 |
| 2005/0096991 | A1 | 5/2005 | Main, II et al. |
| 2005/0108213 | A1 * | 5/2005 | Riise et al. ........................ 707/3 |
| 2005/0108224 | A1 | 5/2005 | Silverbrook et al. |
| 2005/0119824 | A1 * | 6/2005 | Rasmussen et al. ........... 701/200 |
| 2005/0193003 | A1 * | 9/2005 | Popovici .................... 707/104.1 |
| 2005/0198008 | A1 * | 9/2005 | Adler ................................ 707/3 |
| 2005/0222879 | A1 | 10/2005 | Dumas et al. |
| 2005/0246310 | A1 | 11/2005 | Chang et al. |
| 2005/0270311 | A1 * | 12/2005 | Rasmussen et al. .......... 345/677 |
| 2005/0278378 | A1 | 12/2005 | Frank |
| 2005/0278616 | A1 | 12/2005 | Eller |
| 2006/0004752 | A1 | 1/2006 | Harel et al. |
| 2006/0004797 | A1 * | 1/2006 | Riise et al. ..................... 707/100 |
| 2006/0036588 | A1 * | 2/2006 | Frank et al. ....................... 707/3 |
| 2006/0085234 | A1 | 4/2006 | Cagan |
| 2006/0122794 | A1 | 6/2006 | Sprague et al. |
| 2006/0149774 | A1 * | 7/2006 | Egnor ........................... 707/102 |
| 2006/0155679 | A1 | 7/2006 | Kothuri et al. .................... 707/3 |
| 2006/0159367 | A1 | 7/2006 | Zeineh et al. |
| 2006/0174209 | A1 * | 8/2006 | Barros .......................... 715/764 |
| 2006/0179453 | A1 | 8/2006 | Kadie et al. |
| 2006/0184519 | A1 * | 8/2006 | Smartt .............................. 707/3 |
| 2006/0200259 | A1 * | 9/2006 | Hoffberg et al. ............... 700/86 |
| 2006/0200260 | A1 * | 9/2006 | Hoffberg et al. ............... 700/86 |
| 2006/0224587 | A1 | 10/2006 | Zamir et al. |
| 2006/0271281 | A1 * | 11/2006 | Ahn et al. ..................... 701/208 |
| 2007/0011150 | A1 | 1/2007 | Frank |
| 2007/0016562 | A1 | 1/2007 | Cooper |
| 2007/0073748 | A1 * | 3/2007 | Barney ......................... 707/101 |
| 2007/0078768 | A1 | 4/2007 | Dawson |
| 2007/0130112 | A1 | 6/2007 | Lin |
| 2007/0143318 | A1 * | 6/2007 | Hendrey et al. ............... 707/100 |
| 2007/0156677 | A1 | 7/2007 | Szabo |
| 2007/0179932 | A1 | 8/2007 | Piaton |
| 2007/0192300 | A1 | 8/2007 | Reuther et al. |

| | | |
|---|---|---|
| 2007/0198495 A1 | 8/2007 | Buron et al. |
| 2007/0233692 A1 | 10/2007 | Lisa et al. |
| 2007/0239692 A1* | 10/2007 | McBride .......................... 707/3 |
| 2007/0288160 A1 | 12/2007 | Ebert |
| 2007/0294233 A1 | 12/2007 | Sheu et al. |
| 2008/0010262 A1 | 1/2008 | Frank |
| 2008/0033935 A1 | 2/2008 | Frank |
| 2008/0033936 A1 | 2/2008 | Frank |
| 2008/0033944 A1 | 2/2008 | Frank |
| 2008/0040336 A1 | 2/2008 | Frank |
| 2008/0052638 A1 | 2/2008 | Frank et al. |
| 2008/0056538 A1 | 3/2008 | Frank |
| 2008/0059452 A1 | 3/2008 | Frank |
| 2008/0065685 A1 | 3/2008 | Frank |
| 2008/0131003 A1 | 6/2008 | Bober |
| 2009/0119255 A1 | 5/2009 | Frank et al. |
| 2009/0183097 A1 | 7/2009 | Bayiates |
| 2009/0299975 A1* | 12/2009 | Coifman et al. .................. 707/3 |

FOREIGN PATENT DOCUMENTS

| | | |
|---|---|---|
| GB | 2364225 | 1/2002 |
| WO | WO-05/114484 | 12/2005 |
| WO | WO-2007/002800 | 1/2007 |

OTHER PUBLICATIONS

Ceseli et al.—"Modeling and Assessing Interence Exposure in Encypted Databases"—ACM Transactions on Information and System Security, vol. 8, No. 1, Feb. 2005 (pp. 119-152).*
Henning Maass—LOcation-aware Mobile Applications based on Directory Services—ACM Mobile Networks and Applications, Aug. 1998 (pp. 157-173).*
Beard and Sharma, Multidimensional ranking for data in digital spatial libraries, Int. J. Digit. Libr. 1, pp. 153-160 (1997).
Christel, M.G. et al., "Interactive Maps for a Digital Video Library", IEEE Multimedia, IEEE Service Center, New York, vol. 7, No. 1, Jan. 2000, pp. 60-67.
Clifton, et al., "GeoNODE: An End-to-End System from Research Components", the 17th International Conference on Data Engineering, Heidelberg, Germany, Apr. 2-6, 2001.
Duhring, Geospatial Archive and Exploitation System, SGI White Paper, pp. 1-13 (Dec. 2001).
Excerpts from Texis Tutorial, URL Http://www.thunderstone, com/texis/site/demos/map/(1997).
Gaede, V., "Multidimensional Access Methods", ACM Computing Surveys, vol. 30, No. 2, Jun. 1998, pp. 170-231.
Gueting R H: "An Introduction to Spatial Database Systems" VLDB Journal, Springer Verlag, Berlin, ET, vol. 3, No. 4, Oct. 1994, pp. 357-399.
Hill and Rasmussen, Geographic Indexing Terms as Spatial Indicators, in S. Stone & M.K. Buckland (Eds.), Studies in Multimedia: State-of-the-Art Solutions in Multimedia and Hypertext, Medford, NJ: Learned Information, pp. 9-20, 1992.
Hill, Spatial Access to, and display of, Global Change Data: Avenues for Libraries, Proceedings of the Data Processing Clinic Geographic Information Systems and Libraries: Patrons, Maps, and Spatial Information, pp. 125-150, 1995.
Hyland, et al., "GEONODE: Visualizing News in Geospatial Context", Federal Data Mining Symposium and Exposition '99, AFCEA, Mar. 9-10, 1999, Washington, D.C.
International Search Report for PCT/US07/003769, mailed Aug. 2, 2007, 4 pages.
Internet Website: http://www.bbc.co.uk/h2g2/guide, The Hitchhiker's Guide to the Galaxy, pp. 1-2, Feb. 1, 2001.
Internet Website: http://mapsonus.switchboard.com/bin/maps-route, Show Route, pp. 1-3, Show Map, pp. 1-2, Feb. 1, 2001.
Internet Website: http://www.dogpile.com, homepage, pp. 1; Dogpile Local Search, pp. 1, Feb. 1, 2001.
Internet website: http://www.mapblast.com, home page, p. 1, Feb. 1, 2001.
Internet Website: http://www.mapplanet.com, home page, p. 1; Guided Tour—Introduction, p. 1; Guided Tour—Navigation, p. 1; Guided Tour—Claming a cell, p. 1; Guided Tour—Registration, p. 1; Guided Tour—Signing in, p. 1; Guided Tour—Searching, p. 1; Guided Tour—Technical Requirements, p. 1, Feb. 1, 2001.
Internet Website: http://www.northernlight.com, home page, pp. 1-2, 2000 Press Releases, Dec. 6; pp. 1-3, 2000 Press Releases, Jan. 19, pp. 1-3.
Internet Website: http://www.thunderstone.com/texis/site/demos/map, Web Indexing and GIS Example, pp. 1-2, Feb. 1, 2001.
Larson, et al., "The Sequoia 2000 Electronic Repository," Digital Technical Journal, vol. 7(3), pp. 50-65 (1995).
Ooi, B.C., "Indexing in Spatial Databases", http://www.comp.nus.edu.sg/-ooibc/papers.html, A Spatial Indexing Structures (long survey) 1993, pp. 1-71.
Open GIS Consortium, Request for Quotation and Call for Participation in the OCG Geospatial Fusion Services Testbed Phase 1, Jun. 2000.
Plazanet et al., Experiments with Learning Techniques for Spatial Model Enrichment and Line Generalization, GeoInformatica 2:4, pp. 315-333 (1998).
Sekine and Isahara, IREX Project Overview, Procedings of LREC 2000: 2nd International Cofnerence on Language Resources & Evaluation, Athens (2000).
Sester et al., Linking Objects of Different Spatial Data Sets by Integration and Aggregation, GeoInformatica 2:4, pp. 335-358 (1998).
Smith et al., "Geographic Information Systems and Libraries: Patrons, Maps, and Spatial Information," Papers presented at the 1995 Clinic on Library Applications of Data Processing, pp. title, contents, 1, 80-121 (1995).
Smith, T., "A Digital Library for Geographically Referenced Materials" IEEE Computer (1996), vol. 29, pp. 54-60.
Su et al., Morphological Models for the Collapse of Area Features in Digital Map Generalization, GeoInformatica 2:4, pp. 359-382 (1998).
Vilain, et al., "Exploiting Semantic Extraction for Spatiotemporal Indexing in GeoNODE", Published Apr. 2000.
Ware and Jones, Conflict Reduction in Map Generalization Using Iterative Improvement, GeoInformatica 2:4, pp. 383-407 (1998).
Weibel and Jones, Computational Perspectives on Map Generalization, GeoInformatica 2:4, pp. 307-314 (1998).
Woodruff, et al., "GIPSY: Georeferenced Information Processing System", Computer Science Division University of California, Berkley and Library and Information Studies, University of California Berkley, pp. i-iii and 1-21 (1994).
Chen, et al., "The BioPortal Project: A National Center of Excellence for Infectious Disease Informatics", Proceedings of the 2006 International Conference on Digital Government Research, May 21-24, 2006, pp. 373-374.
European Patent Office, Supplementary Partial European Search Report, for application No. EP 01925106.5-2001/US0140173, mailed Jun. 3, 2005, 2 pages.
International Search Report from PCT/US2007/075266 mailed Jan. 14, 2008, 13 pages.
International Search Report from PCT/US2007/075289, Mailed Feb. 12, 2008, 4 pages.
International Search Report from PCT/US2007/075294, Mailed Feb. 6, 2008, 4 pages.
International Search Report issued for PCT/US2007/083238, dated May 21, 2008, 15 pages.
International Search Report, PCT/US2006/025296, mailed Feb. 9, 2007, 6 pages.
Internet Website:"http//www.ismap.com", home page; Locate addresses and local services in Europe, pp. 1-2, Jun. 14, 2001, 3 pages.
Liu, et al., "A New Point Process Transition Density Model for Space-Time Event Prediction", IEEE Transactions on Systems, Man, and Cybernetics: Part C: Applications and Reviews, 34(3):310-324 (2004).
Liu, et al., "Criminal Incident Prediction Using a Point-Pattern-Based Density Model", International Journal of Forecasting, 19(4):603-622 (2003).
MAPQUEST, retrieved from the Internet: http://www.mapquest.com, retrieved Apr. 20, 2001, 9 pages.
Matheson, et al., Geoparser Evaluation (geoXwalk Phase III WP 4), University of Edinburgh Data Library, Aug. 2004 (9 pages).
Nadeau, et al., "Unsupervised Named-Entity Recognition: Generating Gazetteers and Resolving Ambiguity", Published at the 19th Canadian Conference on Artificial Intelligence, Quebec City, Quebec, Canada Jun. 7, 2006, NRC 48727 (13 pages).
Petras, et al., "Time Period Directories: A Metadata Infrastructure for Placing Events in Temporal and Geographic Context", Proceedings of the 6th ACM.IEEE-CS Joint Conference on Digital Libraries, Jun. 2006, pp. 151-160, XP002478581.
Robertson, S.E. et al., "Simple, proven approaches to text retrieval", Technical Report, University of Cambrige, No. 356, May 1997, pp. 1-7.
Soffer, et al., "Integrating Symbolic Images into a Multimedia Database System using Classification and Abstraction Approaches", VLDB Journal, 7:253-274 (1998).
Zeng, et al., "West Nile Virus and Botulism Portal: A Case Study in Infectious Disease Informatics", Lecture Notes in Computer Science: Intelligence and Security Informatics [Online], vol. 3037/2004, Aug. 24, 2004, pp. 28-41.
European Office action for corresponding EP app. No. 01925106.5-2201 dated Aug. 9, 2007, pp. 1-5.
Intl Preliminary Report on Patentability for corresponding Intl app. No. PCT/US2007/003769 dated Aug. 12, 2008, pp. 1-7.
Intl preliminary report on patentablity for corresponding intl app. No. PCT/US2006/025296 dated Jan. 9, 2008, pp. 1-9.
Intl preliminary report on patentablity for corresponding intl app. No. PCT/US2007/013807 dated Dec. 16, 2008, pp. 1-10.
Intl preliminary report on patentablity for corresponding intl app. No. PCT/US2007/075289 dated Feb. 10, 2009, pp. 1-8.
Intl preliminary report on patentablity for corresponding intl app. No. PCT/US2007/075294 dated Feb. 10, 2009, pp. 1-6.
Intl preliminary report on patentablity for corresponding intl app. No. PCT/US2007/083238 dated May 5, 2009 pp. 1-7.
Office action for related U.S. Appl. No. 11/811,976 (P4236US02) dated Jun. 23, 2010, pp. 1-30.
Supplementary European search report for corresponding EP app. No. 01925106.5-2201 dated Aug. 24, 2005, pp. 1-5.
Supplementary partial European search report for corresponding EP app. No. 01925106.5-2201 dated Jun. 3, 2005, pp. 1-4.
Office action for related U.S. Appl. No. 11/811,976 (P4236US02) dated Nov. 17, 2010, pp. 1-32.
Korn, Flip. "A Taxonomy of Browsing Methods: Approaches to the Lost in Concept Spa." Internet Citation. 1996. XP002443738. http://citeseer.is.psu.edu/cache/papers/cs/3507/http:zSzzSzwww.cs.umd.eduzSzprojectszSzhcilzSvisible-humanzSzvhpzSzgraphbrowse.pdf/korn9 6taxonomy.pdf>. Retreived Jul. 20, 2007. pp. 7-9.
"MetaCarta: A White Paper on MetaCarta's Technology and Products." Internet Citation. 2005. XP002463193. http://www.metacarta.com/docs/Corporate_White_Paper.pdf>. pp. 5-9.
International Search Report for International Patent Application No. PCT/US2007/013807 mailed Oct. 1, 2008.

* cited by examiner

Non-Geographic: 0 documents
Earth: 1 document, 10 locations
> United States: 1 document, 7 locations
> France: 1 document, 1 location
>> Paris/Eiffel Tower (or)

Non-Geographic: 0 documents
Earth: 1 document, 10 locations
> United States: 1 document, 7 locations
> France / Paris / Eiffel Tower Trekking down the coast ... documented his extensive travels in Oman ...
find water, he put his trust in Mohammed ...

FIG. 13A

Terrorist Abu Musab al-Zarqawi died in 'safe house' rubble in Baghdad neighborhood of Aza. al-Zarqawi was betrayed from inside the al
[0.834]

Qaeda group that he led in the insurgency against coalition troops in

Iraq. "Tips and intelligence from Iraqi senior leaders from his network
[0.679]

led U.S. forces to al-Zarqawi, "U.S. Army Maj. Gen. Bill Caldwell said
[0.679]                          [0.679]

from his commend in the Green Zone. Officials say a tape made by
[0.679]

Abu Musab al-Zarqawi may have led to his undoing.

FIG. 13B

Terrorist Abu Musab al-Zarqawi died in 'safe house' rubble in Baghdad

[1.0] neighborhood of Aza. al-Zarqawi was betrayed from inside the al

Qaeda group that he led in the insurgency against coalition troops in

[1.0] Iraq. "Tips and intelligence from Iraqi senior leaders from his network led U.S. forces to al-Zarqawi, "U.S. Army Maj. Gen. Bill Caldwell said from his command in the Green Zone. Officials say a tape made by
[1.0]
Abu Musab al-Zarqawi may have led to his undoing.

FIG. 13C

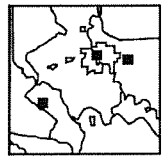

Terrorist Abu Musab al-Zarqawi died in 'safe hou neighborhood of Aza. al-Zarqawi was betraye
[1.0]

Qaeda group that he led in the insurgency again

[1.0] Iraq. "Tips and intelligence from Iraqi senior lea

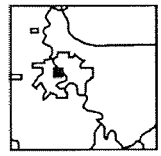

led U.S. forces to al-Zarqawi. " U.S. Army Maj. G from his command in the Green Zone. Officials
[0.679]
Abu Musab al-Zarqawi may have led to his undo

FIG. 13D

SYSTEM AND METHODS FOR PROVIDING STATSTICALLY INTERESTING GEOGRAPHICAL INFORMATION BASED ON QUERIES TO A GEOGRAPHIC SEARCH ENGINE

CROSS REFERENCE TO RELATED APPLICATIONS

This application claims the benefit of U.S. Provisional Application No. 60/812,865, filed Jun. 12, 2006 and entitled "Answer Engine for Presenting Geo-Text Search Results," the entire contents of which are incorporated herein by reference.

This application is related to U.S. Pat. No. 7,117,199, issued Oct. 2, 2006 and entitled "Spatially Coding and Displaying Information," the entire contents of which are incorporated herein by reference.

This application is related to the following applications filed concurrently herewith, the entire contents of which are incorporated herein by reference:

U.S. patent application Ser. No. 11/818,066, entitled "Systems and Methods for Hierarchical Organization and Presentation of Geographic Search Results;" and U.S. patent application Ser. No. 11/811,976, entitled "Systems and Methods for Generating and Correcting Location References Extracted from Text."

TECHNICAL FIELD

This invention relates to computer systems, and more particularly to spatial databases, document databases, search engines, and data visualization.

BACKGROUND

There are many tools available for organizing and accessing documents through different interfaces that help users find information. Some of these tools allow users to search for documents matching specific criteria, such as containing specified keywords. Some of these tools present information about geographic regions or spatial domains, such as driving directions presented on a map.

These tools are available on private computer systems and are sometimes made available over public networks, such as the Internet. Users can use these tools to gather information.

SUMMARY OF THE INVENTION

The invention provides systems and methods for hierarchical organization and presentation of geographic search results.

The invention also provides systems and methods for providing statistically interesting geographical information based on queries to a geographical search engine.

The invention also provides systems and methods of generating and correcting location references extracted from text.

Under one aspect, an interface program stored on a computer-readable medium causes a computer system with a display device to perform the functions of: accepting search criteria from a user, the search criteria including a free-text query and a domain identifier, the domain identifier identifying a physical location; in response to accepting said search criteria from the user, receiving a set of document-location tuples from a corpus of documents, each document-location tuple satisfying the search criteria from the user; organizing the document-location tuples into a hierarchical graph structure, the hierarchical graph structure representing hierarchical spatial relationships between the physical locations; and displaying a visual representation of the hierarchical graph structure on the display device.

Under another aspect, a method of displaying information about documents includes: accepting search criteria from a user, the search criteria including a free-text query and a domain identifier, the domain identifier identifying a physical location; in response to accepting said search criteria from the user, receiving a set of document-location tuples from a corpus of documents, each document-location tuple satisfying the search criteria from the user; organizing the document-location tuples into a hierarchical graph structure, the hierarchical graph structure representing hierarchical spatial relationships between the physical locations; and displaying a visual representation of the hierarchical graph structure on a display device.

One or more embodiments include one or more of the following features. The visual representation of the hierarchical graph structure includes at least one of a map and a set of nested folders. At least some of the folders of the set of nested folders include references to at least some of the documents. Further organizing the document-location tuples into a hierarchical graph structure based on a reference graph structure. The reference graph structure includes a plurality of geographical locations arranged into hierarchical nodes, wherein at least some nodes representing larger-area geographical features are at a higher level than nodes representing smaller-area geographical features that are encompassed within the larger-area geographical features. The reference graph structure includes one of a tree graph and a directed acyclic graph. Further performing the functions of organizing the document document-location tuples into a hierarchical graph structure, said organizing including initializing an empty graph-based result set, and for each location in the document-location tuples: (a) finding a node in a reference graph corresponding to the location; (b) attaching the node and any parents of the node to the graph-based result set; and (c) attaching all document-location tuples having the location to the node. The parents of the node include at least one physical domain having a larger spatial area than the node corresponding to the location. The physical domain includes a planetary body. The physical domain includes a geographical region. Further displaying a map image and displaying visual indicators representing at least a subset of the locations in the map image. At least one document references multiple locations, and the visual indicators include lines connecting at least some of the multiple locations. Each of the visual indicators has an opacity proportional to a relevance score of at least one document-location tuple it represents. The spatial relationships between the locations include at least one of containment, partial containment, and proximity.

Under another aspect, an interface program stored on a computer-readable medium causes a computer system with a display device to perform the functions of: accepting search criteria from a user, the search criteria including a free text entry query and a domain identifier identifying the domain; in response to accepting said search criteria from the user, receiving a first set of documents from a corpus of documents that: (a) contains anywhere within the document location-related information that refers to a specific location within the domain identified by the domain identifier; and (b) contains anywhere within the document text that is responsive to the free text entry query, wherein said identified documents are identified by a plurality of document identifiers; displaying a representation of said domain on the display device, wherein the domain is a geographical region and said representation is multi-dimensional map of the geographical region; displaying on the display device a plurality of visual indicators as representations of the first set of documents identified by said plurality of document identifiers, the corresponding visual indicator for each document identifier of said plurality of document identifiers being positioned within the representation of the domain at a coordinate within the domain that corresponds to the location-related information for the corresponding document; receiving an inspection request from the user, the inspection request including a subdomain identifier identifying the subdomain, the subdomain within the domain; in response to the inspection request from the user, receiving a second set of documents from the corpus of documents that: (a) contains anywhere within the document location-related information that refers to a specific location within the subdomain identified by the subdomain identifier; and (b) contains anywhere within the document text that is responsive to the free text entry query, wherein said identified documents are identified by a plurality of document identifiers; and displaying information about the second set of documents on the display device.

Under another aspect, a method of displaying information about documents includes: accepting search criteria from a user, the search criteria including a free text entry query and a domain identifier identifying the domain; in response to accepting said search criteria from the user, receiving a first set of documents from a corpus of documents that: (a) contains anywhere within the document location-related information that refers to a specific location within the domain identified by the domain identifier; and (b) contains anywhere within the document text that is responsive to the free text entry query, wherein said identified documents are identified by a plurality of document identifiers; displaying a representation of said domain on a display device, wherein the domain is a geographical region and said representation is multi-dimensional map of the geographical region; displaying on the display device a plurality of visual indicators as representations of the first set of documents identified by said plurality of document identifiers, the corresponding visual indicator for each document identifier of said plurality of document identifiers being positioned within the representation of the domain at a coordinate within the domain that corresponds to the location-related information for the corresponding document; receiving an inspection request from the user, the inspection request including a subdomain identifier identifying the subdomain, the subdomain within the domain; in response to the inspection request from the user, receiving a second set of documents from the corpus of documents that: (a) contains anywhere within the document location-related information that refers to a specific location within the subdomain identified by the subdomain identifier; and (b) contains anywhere within the document text that is responsive to the free text entry query, wherein said identified documents are identified by a plurality of document identifiers; and displaying information about the second set of documents on the display device.

One or more embodiments include one or more of the following features. The inspection request includes a movable subdomain indicator displayed on the representation of said domain. Displaying information about the second set of documents on the display device includes displaying a plurality of visual indicators as representations of the second set of documents, the corresponding visual indicator for each document being positioned within the representation of the domain at a coordinate within the domain that corresponds to the location-related information for the corresponding document. Displaying information about the second set of documents on the display device includes displaying a plurality of snippets of text from the second set of documents. The first and second sets of documents are hierarchically organized based on a reference graph.

Under another aspect, an interface program stored on a computer-readable medium causes a computer system with a display device to perform the functions of: accepting search criteria from a user, the search criteria including a domain identifier identifying a domain and a free text query entry; in response to accepting said search criteria from the user, receiving a set of document-location tuples from a corpus of documents, wherein each document of the set of documents: (a) contains anywhere within the document information that is responsive to the free text query entry; and (b) contains anywhere within the document location-related information that refers to a location within the domain; requesting and receiving a result from an additional query based at least in part on the domain identifier, the result not being a document-location tuple; and displaying a visual representation of at least a subset of the document-location tuples and a visual representation of the result of the additional query on the display device.

Under another aspect, a method of displaying information about documents includes: accepting search criteria from a user, the search criteria including a domain identifier identifying a domain and a free text query entry; in response to accepting said search criteria from the user, receiving a set of document-location tuples from a corpus of documents, wherein each document of the set of documents: (a) contains anywhere within the document information that is responsive to the free text query entry; and (b) contains anywhere within the document location-related information that refers to a location within the domain; requesting and receiving a result from an additional query based at least in part on the domain identifier, the result not being a document-location tuple; and displaying a visual representation of at least a subset of the document-location tuples and a visual representation of the result of the additional query on a display device.

One or more embodiments include one or more of the following features. The visual representation of the at least a subset of the document-location tuples includes a plurality of visual indicators on a map image. The visual representation of the result of the additional query includes a visual indicator on the map image. The additional query includes a query to a database. The additional query includes statistically analyzing phrases within the set of documents, and identifying a plurality of statistically interesting phrases based on the statistical analysis, the statistically interesting phrases having a statistical property that distinguishes them from other phrases in the documents. Identifying the plurality of statistically interesting phrases includes one of selecting phrases having a frequency of occurrence that exceeds a predetermined threshold, and selecting a predetermined number of phrases having a frequency of occurrence higher than a frequency of occurrence of other phrases in the documents. The visual representation of the result of the additional query includes a visual representation of the plurality of statistically interesting phrases. The visual representation of the plurality of statistically interesting phrases includes a plurality of annotations on a map. The visual representation of the plurality of statistically interesting phrases includes a list of the statistically interesting phrases. A plurality of the statistically interesting phrases are associated with a subdomain within the domain, and wherein the visual representation of the plurality statistically interesting phrases includes a bounding box indicating the subdomain on a map.

Under another aspect, an interface program stored on a computer-readable medium causes a computer system with a display device to perform the functions of: identifying a plurality of statistically interesting phrases occurring within a plurality of documents of a corpus of documents, the statistically interesting phrases having a statistical property that distinguishes them from other phrases in the documents; identifying locations referenced within the identified statistically interesting phrases; displaying a visual representation of a domain, the domain encompassing at least a subset of the identified locations; displaying a visual representation of at least a subset of the identified locations; and displaying at least a subset of the identified statistically interesting phrases, each of the displayed phrases visually associated with a corresponding visual representation of the at least a subset of the identified locations.

Under another aspect, a method of displaying information about documents includes: identifying a plurality of statistically interesting phrases occurring within a plurality of documents of a corpus of documents, the statistically interesting phrases having a statistical property that distinguishes them from other phrases in the documents; identifying locations referenced within the identified statistically interesting phrases; displaying a visual representation of a domain, the domain encompassing at least a subset of the identified locations; displaying a visual representation of at least a subset of the identified locations; and displaying at least a subset of the identified statistically interesting phrases, each of the displayed phrases visually associated with a corresponding visual representation of the at least a subset of the identified locations.

One or more embodiments include one or more of the following features. Further computing a relevance score for each of the identified statistically interesting phrases, and displaying only phrases having a relevance score exceeding a predetermined threshold. The statistical property of the statistically interesting phrases is related to a user's free text query.

Under another aspect, an interface program stored on a computer-readable medium causes a computer system with a display device to perform the functions of: identifying a plurality of locations referenced within a plurality of documents of a corpus of documents; for each location of the plurality of locations, computing a value score based on a frequency of occurrences of references to the location in the corpus of documents; displaying a visual representation of a domain, the domain encompassing the locations; and displaying a visual indicator on the visual representation of the domain, the visual indicator representing locations of the plurality of locations having a value score exceeding a predetermined value score.

Under another aspect, a method of displaying information about documents includes: identifying a plurality of locations referenced within a plurality of documents of a corpus of documents; for each location of the plurality of locations, computing a value score based on a frequency of occurrences of references to the location in the corpus of documents; displaying a visual representation of a domain, the domain encompassing the locations; and displaying a visual indicator on the visual representation of the domain, the visual indicator representing locations of the plurality of locations having a value score exceeding a predetermined value score.

In some embodiments, the visual indicator includes a bounding box representing an area encompassing a plurality of proximate locations each having a value score exceeding the predetermined value score.

Under another aspect, an interface program stored on a computer-readable medium causes a computer system with a display to perform the functions of: accepting search criteria from a user, the search criteria including a domain identifier identifying a domain and a free text query entry; in response to accepting said search criteria from the user, receiving a set of document-location tuples from a corpus of documents, wherein each document of the set of documents: (a) contains anywhere within the document information that is responsive to the free text query entry; and (b) contains anywhere within the document location-related information that refers to a location within the domain; identifying a subset of documents that refer to locations that are more spatially proximate to each other than to other locations referred to by other documents in the corpus of documents; and displaying a visual representation of at the subset of documents on the display device.

Under another aspect, a method of displaying information about documents includes: accepting search criteria from a user, the search criteria including a domain identifier identifying a domain and a free text query entry; in response to accepting said search criteria from the user, receiving a set of document-location tuples from a corpus of documents, wherein each document of the set of documents: (a) contains anywhere within the document information that is responsive to the free text query entry; and (b) contains anywhere within the document location-related information that refers to a location within the domain; identifying a subset of documents that refer to locations that are more spatially proximate to each other than to other locations referred to by other documents in the corpus of documents; and displaying a visual representation of at the subset of documents on the display device.

In some embodiments, the visual representation of the subset of documents includes at least one of a hotspot box and a plurality of annotations representing statistically interesting phrases within the subset of documents.

Under another aspect, an interface program stored on a computer-readable medium causes a computer system with a display device to perform the functions of: displaying a document on the display device; displaying a selectable button for requesting location-related information pertaining to the document; accepting a user selection of the button as a request to view the location-related information pertaining to the document; in response to the request, requesting and receiving metadata identifying candidate location references within the document; displaying on the display device a map with visual indicators representing at least a subset of the plurality of location references within the document; and displaying on the display device the document with visual indicators representing at least a subset of the plurality of location references within the document.

Under another aspect, a method of displaying information about a document includes displaying a document on the display device; displaying a selectable button for requesting location-related information pertaining to the document; accepting a user selection of the button as a request to view the location-related information pertaining to the document; in response to the request, requesting and receiving metadata identifying candidate location references within the document; displaying on the display device a map with visual indicators representing at least a subset of the plurality of location references within the document; and displaying on the display device the document with visual indicators representing at least a subset of the plurality of location references within the document.

One or more embodiments include one or more of the following features. The selection of the button includes a single mouse click. Requesting and receiving the plurality of location references within the document includes transmitting the document to an external server. Further displaying an interface allowing the user to edit the metadata. The interface allows at least one of associating the metadata with a previously unidentified location reference within the document, removing metadata that inappropriately identifies a location reference within the document, modifying coordinates associated with a location reference within the document, and modifying a confidence score associated with a location reference within the document.

Under another aspect, an interface program stored on a computer-readable medium causes a computer system with a display to perform the functions of: displaying a document on the display; displaying metadata associated with the document on the display, the displayed metadata including a confidence score indicating the likelihood that the author intended for the document to refer to a candidate location; and providing an interface through which a user can alter the confidence score in the metadata.

Under another aspect, a method for displaying and altering information about a document includes: displaying a document on a display; displaying metadata associated with the document on the display, the displayed metadata including a confidence score indicating the likelihood that the author intended for the document to refer to a candidate location; and providing an interface through which a user can alter the confidence score in the metadata.

The details of one or more embodiments of the invention are set forth in the accompanying drawings and the description below. Other features, objects, and advantages of the invention will be apparent from the description and drawings, and from the claims.

DEFINITIONS

For clarity, we define several terms of art:

"Data" is any media object that can be represented by numbers, such as numbers in base two, which are called "binary numbers."

"Information" is data that a human or machine or a machine can interpret as having meaning.

"Metadata" is information about other information. For example, a document is a media object containing information and possibly also metadata about the information. For example, if a document contains text by an author named "Dave," then the document may also contain metadata identifying Dave as the author. Metadata often performs the function of "identifying" part of a media object. The metadata usually identifies part of a media object in order to provide additional information about that part of the media object. The mechanism for identifying part of a media object usually depends on the format and specific composition of a given media object. For text documents, character ranges are often used to identify substrings of the text. These substrings are media objects.

A "media object" is any physical or electronic object that can be interpreted as containing information, thoughts, or emotions. Thus, a media object is a broad class of things, including such diverse objects as living organisms, paper documents, rocks, videos, email messages, web pages, slide show presentations, spreadsheets, renderings of equations, and music.

A "digital media object" is a media object constructed from binary electronic signals or similar computing-machine oriented signals. Frequently, media objects can be stored in digital form, and this digital form can be replicated and transmitted to different computer systems many separate times.

A "document" is a media object containing information composed by humans for the purpose of transmission or archiving for other humans. Documents are typically the targets of the queries issued by users to search systems. Examples of documents include text-based computer files, as well as files that are partially text-based, files containing spatial information, and computer entities that can be accessed via a document-like interface. Documents can contain other documents and may have other interfaces besides their document-like interfaces. Every document has an address. In the case of world-wide web documents, this address is commonly a URL. The documents exist on computer systems arrayed across a computer network, such as a private network or the Internet. The documents may be hyperlinked, that is, may contain references (hyperlinks) to an address of another document. Copies of the documents may be stored in a repository.

A "digital document" is a document that is a digital media object, such as a file stored in a file system or web server or digital document repository.

A "text document" is a document containing character symbols that humans can interpret as signifying meaning. A "digital text document" is a text document that is also a digital document. Typically, digital text documents contain character symbols in standardized character sets that many computer systems can interpret and render visually to users. Digital text documents may also contain other pieces of information besides text, such as images, graphs, numbers, binary data, and other signals. Some digital documents contain images of text, and a digital representation of the text may be separated from the digital document containing the images of text.

A "corpus of documents" is a collection of one or more documents. Typically, a corpus of documents is grouped together by a process or some human-chosen convention, such as a web crawler gathering documents from a set of web sites and grouping them together into a set of documents; such a set is a corpus. The plural of corpus is corpora.

A "subcorpus" is a corpus that is fully contained within a larger corpus of documents. A subcorpus is simply another name for a subset of a corpus.

A "summary" is a media object that contains information about some other media object. By definition, a summary does not contain all of the information of the other media object, and it can contain additional information that is not obviously present in the other media object.

An "integrated summary" is a set of summaries about the same media object. For example, a web site about a book typically has several summaries organized in different ways and in different mediums, although they are all about the same book. An integrated summary can include both sub-media objects excerpted from the media object summarized by the integrated summary, and also summary media objects.

To "summarize" is to provide information in the form of a media object that is a selection of less than all of the information in a second media object possibly with the addition of information not contained in the second media object. A summary may simply be one or more excerpts of a subset of the media object itself. For example, a text search engine often generates textual summaries by combining a set of excerpted text from a document. A summary may be one or more sub-strings of a text document connected together into a human-readable string with ellipses and visual highlighting added to assist users reading the summary. For example, a query for "cars" might cause the search engine to provide a search result listing containing a list item with the textual summary " . . . highway accidents often involve <b>cars</b> that . . . dangerous pileups involving more than 20 <b>cars</ b>...." In this example, the original media object contained the strings "highway accidents often involve cars that" and "dangerous pileups involving more than 20 cars", and the summary creation process added the strings "..." and "<b>" and "</b>" to make it easier for users to read the concatenated strings. These substrings from a document and represented to a user are an example of a "fragment" of a media object.

A "statistically interesting phrase" or "SIP" is a substring of a text that is identified as interesting. Often, the method of determining which phrases are interesting is an automated or semi-automated process that relies on statistical information gathered from corpora of documents. For example, one way of identifying SIPs is to statistically assess which phrases are relatively common in a given text but relatively uncommon in a reference corpus. This determines interestingness of phrases in the text relative to the statistical background of the reference corpus. For example, the phrase "tree farm" may occur twice in a document containing a hundred pairs of words. That means it has a relative frequency of about 1%. Meanwhile, the phrase "tree farm" might only occur ten times in a reference corpus containing ten million pairs of words, i.e. one in a million chance of randomly choosing that pair of words out of all the pairs. Since one-in-one-hundred is much larger than one-in-one-million, the phrase "tree farm" stands out against the statistical backdrop of the reference corpus. By computing the ratio of these two frequencies, one obtains a likelihood ratio. By comparing the likelihood ratios of all the phrases in a document, a system can find statistically interesting phrases. One notices that simply because of finite size effects, that the smallest possible frequency of occurrence for a phrase in a short text is certain to be much larger than the frequencies of many phrases in a large reference corpus. This observation underscores the importance of comparing likelihood ratios, rather than treating each such score as containing much independent meaning of its own. Nonetheless, likelihood ratio comparisons are one effective way of identifying SIPs.

A "sub-media object" is a media object that is part of a second media object. For example, a chapter in a book is a sub-media object of the book, and a paragraph in that chapter is a sub-media object of the chapter. A pixel in a digital image is a sub-media object of the digital image. A sub-media object is any fragment of a larger media object. For example, a fragment of a document might be an image of a portion of the document, such is commonly done with digital scans of paper documents. A fragment of a text document might be a string of symbols contained in the text document and represented to a user. Since digital media objects can be replicated ad infinitum, a sub-media object of a digital media object can accurately reproduce any portion of the original media object without necessarily becoming a sub-summary.

A "sub-summary" is summary of a sub-media object. A summary may simply be a set of one or more sub-media objects excerpted from the original media object. The word "sub-summary" is defined here for clarity: a summary of a sub-media object is just as much a summary as other types of summaries, however in relation to a "containing summary" about a larger fragment of the original work, a sub-summary describes a smaller part than the containing summary that summarizes the larger fragment.

A "metric space" is a mathematical conceptual entity defined as follows: a metric space is a set of elements possibly infinite in number and a function that maps any two elements to the real numbers with the following properties. A metric on a set X is a function (called the distance function or simply distance)

$$d:X \times X \to R$$

(where R is the set of real numbers). For all x, y, z in X, this function is required to satisfy the following conditions:
1. $d(x, y) \geq 0$ (non-negativity)
2. $d(x, y)=0$ if and only if $x=y$ (identity of indiscernibles)
3. $d(x, y)=d(y, x)$ (symmetry)
4. $d(x, z) \leq d(x, y)+d(y, z)$ (subadditivity/triangle inequality).

A "vector space" is a mathematical conceptual entity with the following properties: Let F be a field (such as the real numbers or complex numbers), whose elements will be called scalars. A vector space over the field F is a set V together with two binary operations:
   vector addition: $V \times V \to V$ denoted v+w, where v, w∈V, and
   scalar multiplication: $F \times V \to V$ denoted a v, where a∈F and v∈V,
satisfying the axioms below. Four require vector addition to be an Abelian group, and two are distributive laws.
1. Vector addition is associative: For all u, v, w∈V, we have u+(v+w)=(u+v)+w.
2. Vector addition is commutative: For all v, w∈V, we have v+w=w+v.
3. Vector addition has an identity element: There exists an element 0∈V, called the zero vector, such that v+0=v for all v∈V.
4. Vector addition has an inverse element: For all v∈V, there exists an element w∈V, called the additive inverse of v, such that v+w=0.
5. Distributivity holds for scalar multiplication over vector addition: For all a∈F and v, w∈V, we have a (v+w)=a v+a w.
6. Distributivity holds for scalar multiplication over field addition: For all a, b∈F and v∈V, we have (a+b)v=a v+b v.
7. Scalar multiplication is compatible with multiplication in the field of scalars: For all a, b∈F and v∈V, we have a (b v)=(ab)v.
8. Scalar multiplication has an identity element: For all v∈V, we have 1 v=v, where 1 denotes the multiplicative identity in F.

Formally, these are the axioms for a module, so a vector space may be concisely described as a module over a field.

A "metric vector space" is a mathematical conceptual entity with the properties of both a vector space and a metric space.

The "dimension" of a vector space is the number of vectors in the equivalence class of basis vectors that minimally span the vector space.

A "line segment" is a geometric entity in a metric space defined by two entities in the metric space. These two entities are referred to as the "ends" of the line segment. The line segment is the two ends plus the concept of a shortest path connecting them, where the path length is determined by the metric on the metric space.

A "domain" is an arbitrary subset of a metric space. Examples of domains include a line segment in a metric space, a polygon in a metric vector space, and a non-connected set of points and polygons in a metric vector space.

A "domain identifier" is any mechanism for specifying a domain. For example, a list of points forming a bounding box or a polygon is a type of domain identifier. A map image is another type of domain identifier. In principle, a name for a place can constitute a domain identifier, but this is a less common type of domain identifier, because it lacks the explicit representation of dimensionality that a map image has.

A "sub-domain" is a domain which is a subset of another domain. For example, if one is considering a domain that is a polygon, then an example of a sub-domain of that domain is a line segment or subset of line segments selected from the set of line segments that make up the polygon.

A "polyline" is an ordered set of entities in a metric space. Each adjacent pair of entities in the list is said to be "connected" by a line segment.

A "polygon" is a polyline with the additional property that it implicitly includes a line segment between the last element in the list and first element in the list.

A "polyhedron" is a set of polygons with some of the line segments inherent in the underlying polylines are associated with line segments from other polygons in the set. A "closed" polyhedron is a polyhedron in a metric vector space and every line segment is associated with a sufficient number of other line segments in the set that one can identify an interior domain and an exterior domain such that any line segment connecting an element of the interior domain to an element of the exterior domain is guaranteed to intersect a polygon in the set.

A "bounding box" is a right-angled polyhedron that contains a particular region of space. Its "box" nature is based on the polyhedron's square corners. It is a "bounding" nature is based on its being the minimum such shape that contains the region of interest. A bounding box is a common way of specifying a domain of interest, because it is technically easy to implement systems that display, transmit, and allow navigation of right-angled display elements—especially in two dimensions.

A "spatial domain" is a domain in a metric vector space.

A "coordinate system" is any means of referring to locations within a spatial domain. For example, a so-called Cartesian coordinate system on a real-valued metric vector space is a tuple of real numbers measuring distances along a chosen set of basis vectors that span the space. Many examples of coordinate systems exist. "Unprojected latitude-longitude" coordinates on a planet, like Earth, are an example of two-dimensional spherical coordinates on a sphere embedded in three-dimensional space. A "datum" is a set of reference points from which distances are measured in a specified coordinate system. For example, the World Grid System 1984 (WGS84) is commonly used because the Global Position System (GPS) uses WGS84 as the defining datum for the coordinates that it provides. For coordinate systems used to describe geographic domains, one often speaks of "projected" coordinate systems, which are coordinates that can be related to unprojected latitude-longitude via mathematical functions and procedures called "projection functions." Other types of coordinate systems use grids to divide a particular domain into subdomains, e.g. the Military Grid Reference System (MGRS) divides the Earth into subdomains labeled with letters and numbers. Natural language references to places are a coordinate system in the general sense that people often recognize a phrase like "Cambridge" as meaning a place, but there may be many such places. Such ambiguity is typically not tolerated in the design of coordinate systems, so an important part of constructing location-related content is coping with such ambiguity, either by removing it or describing it or simply stating that it exists.

A "physical domain" is a spatial domain that has a one-to-one and onto association with locations in the physical world in which people could exist. For example, a physical domain could be a subset of points within a vector space that describes the positions of objects in a building. An example of a spatial domain that is not a physical domain is a subset of points within a vector space that describes the positions of genes along a strand of DNA that is frequently observed in a particular species. Such an abstract spatial domain can be described by a map image using a distance metric that counts the DNA base pairs between the genes. An abstract space, humans could not exist in this space, so it is not a physical domain.

A "geographic domain" is a physical domain associated with the planet Earth. For example, a map image of the London subway system depicts a geographic domain, and a CAD diagram of wall outlets in a building on Earth is a geographic domain. Traditional geographic map images, such as those drawn by Magellan depict geographic domains.

A "location" is a spatial domain. Spatial domains can contain other spatial domains. A spatial domain that contains a second spatial domain can be said to encompass the second spatial domain. Since some spatial domains are large or not precisely defined, any degree of overlap between the encompassing spatial domain and the encompassed location is considered "encompassing." Since a spatial domain is a set of elements from a metric vector space, the word "encompassing" means that the logical intersection of the sets of elements represented by the two spatial domains in question is itself a non-empty set of elements. Often, "encompassing" means that all of the elements in the second spatial domain are also elements in the encompassing domain. For example, a polygon describing the city of Cambridge is a location in the spatial domain typically used to represent the state of Massachusetts. Similarly, a three-dimensional polyhedron describing a building in Cambridge is a location in the spatial domain defined by the polygon of Cambridge. The word "location" is a common parlance synonym for a "spatial domain."

"Proximate locations" are locations that are closer together than other locations. Closeness is a broad concept. The general notion of closeness is captured by requiring that proximate locations be contained within a circle with a radius less the distance between other locations not considered proximate. Any distance metric can be used to determine the proximity of two results. A plurality of proximate locations is a set of locations that have the spatial relationship of being close together.

The "volume" of a domain is a measure of the quantity of space contained inside the domain. The volume is measured by the metric along each of the dimensions of the space, so the units of volume of the units of the metric raised to the dimension of the space, i.e. $L^d$. For one-dimensional spaces, domains have volume measured simply by length. For two-dimensional spaces, domains have volume measured by area, that is, length squared.

A domain can be viewed as a list of points the space. A domain is said to "contain" a point if the point is in the list. The list may be infinite or even innumerable. A domain is said to "contain" another domain if 100% of the other domains's points are contained in the domain. A domain is said to "partially contain" another domain if more than 0% but less than 100% % of the other domain's points are contained in the domain.

A "location reference" is a sub-media object of a document that a human can interpret as referring to a location. For example, a sub-string of a document may be "Cambridge, Mass.," which a human can interpret as referring to an entity with representative coordinates longitude-latitude coordinates (−71.1061, 42.375). As another example, a location reference may be the name of an organization, such as "the Administration," which in some contexts means the US Presidential Administration and its main offices at the White House in Washington, D.C.

Two locations are said to be "co-referenced" if a single document contains location references to both locations.

A "candidate location reference" is a submedia object identified in a media object, where the submedia object may refer to a location. Typically, a candidate location reference is identified by a set of metadata that also includes a confidence score indicating the likelihood that the identified submedia object actually refers to the location.

A "multi-dimensional map" is a map representing a domain with more than one dimension.

A "statistical property" is a piece of metadata about a piece of information generated by analyzing the information using statistical techniques, such as averaging or comparing the information to averages gathered from reference information. For example, a document has information in it that can be statistically analyzed by comparing the frequency of occurrence of consecutive pairs of words in the document to the frequency of occurrence of those pairs in a reference corpus of documents. The resulting statistical property is a ratio of frequencies. Other statistical properties exist. Statistical properties are often used to distinguish a subset of information from a larger set of information. For example, given a set of documents, one might analyze them to compute a statistical property that differentiates a subset of those documents as being more relevant to a user's query. As another example, a system may analyze information in a media object to decide how likely it is that it refers to a particular location. The result confidence score is a statistical property of the document-location tuple, and it can be used to distinguish it relative to other document-location tuples.

A "document-location tuple" is a two-item set of information containing a reference to a document (also known as an "address" for the document) and a domain identifier that identifies a location.

A "geospatial reference" is a location reference to a location within a geographic domain.

"Location-related content" is information that can be interpreted as identifying or referring to a location within a spatial domain. Location-related content can be associated with a media object in many ways. For example, location-related content may be contained inside the media object itself as location references, such as names of places, explicit latitude-longitude coordinates, identification numbers of objects or facilities or buildings. For another example, location-related content may be associated with a media object by a system that associates a reference to a media object with location-related content that is separate from the media object itself. Such a system might be a database containing a table with a URL field and a latitude-longitude field in a table. To obtain location-related content associated with a media object, a person or computer program might pass the media object to a geoparsing engine to extract location-related content contained inside the media object, or it might utilize a system that maintains associations between references to media objects and location-related content. The fact that a creator of a media object once lived in a particular place is a piece of location-related content associated with the media object. Other examples of such auxiliary location-related content are the locations of physical copies of the media object and locations of people interested in the media object.

A "sub-media object that is not a location-related content" is a sub-media object that is not a location reference. For example, a fragment of a text document that says "Eat great pizza in" is not location-related content even though the subsequent string may be a location reference.

A "spatial relationship" is information that can be interpreted as identifying or referring to a geometric arrangement, ordering, or other pattern associated with a set of locations. For example, "the aliens traveled from Qidmore Downs to Estheral Hill," describes a spatial relationship that organizes the location references "Qidmore Downs" and "Estheral Hill" into an ordering. Another name for a spatial relationship is a geometric relationship.

A "reference to a media object" is a means of identifying a media object without necessarily providing the media object itself. For example, a URL is a reference to a media object. For another example, media object title, author, and other bibliographic information that permits unique identification of the media object is a reference to that media object.

A "graph" is a set of items (often called "nodes") with a set of associations (often called "links") between the items. A "weighted graph" is a graph in which the associations carry a numerical value, which might indicate the distance between the items in the set when embedded in a particular space. A "direct" graph is a graph in which the associations have a defined direction from one item to the other item.

A "cycle" is a subset of links in a graph that form a closed loop. A cycle in a directed graph must have all the links pointing in one direction around the loop, so that it can be traversed without going against the direction of the associations. An "acycle graph" is a graph that contains no cycles.

A "directed acyclic graph" is a graph with directed links and no cycles. A "hierarchy" is a name for a directed acyclic graph. "DAG" is another name for a direct acyclic graph. One type of DAG relevant to our work here is a DAG constructed from partial containment of geometric entities in a space. Since a geometric entity can overlap multiple other areas, the graph of relationships between them is usually not a tree. In principle, a network of partial containment relationships is not even a DAG because cycles can emerge from sets of multiply overlapping locations. Nonetheless, one can usually remove these cycles by making judgment calls about which locations ought to be considered parent nodes for a particular purpose. For example, a DAG could be constructed from the states of New England, the region known as New England, and the region known as the "New England seaboard." If a data curator decides that New England is the parent node for all the states and all the states are parent nodes to the New England seaboard, then a three level DAG has been constructed. The curator could have made another organization of the relationships.

A "tree" is a directed acyclic graph in which every node has only one parent.

A "general graph" is just a graph without any special properties identified.

An "image" is a media object composed of a two-dimensional or three-dimensional array of pixels that a human can visually observe. An image is a multi-dimensional representation of information. The information could come from a great variety of sources and may describe a wide range of phenomena. Pixels may be black/white, various shades of gray, or colored. Often a three-dimensional pixel is called a "voxel." An image may be animated, which effectively introduces a fourth dimension. An animated image can be presented to a human as a sequence of two- or three-dimensional images. A three-dimensional image can be presented to a human using a variety of techniques, such as a projection from three-dimensions into two-dimensions or a hologram or a physical sculpture. Typically, computers present two-dimensional images on computer monitors, however, some human-computer interfaces present three-dimensional images. Since an image is a multi-dimensional representation of information, it implies the existence of a metric on the information. Even if the original information appears to not have a metric, by representing the information in an image, the process of creating the image gives the information a metric. The metric can be deduced by counting the number of pixels separating any two pixels in the image. If the image is animated, then the distance between pixels in two separate time slices includes a component from the duration of time that elapses between showing the two time slices to the human. Typically, a Euclidean metric is used to measure the distance between pixels in an image, however other metrics may be used. Since images can be interpreted as having a metric for measuring the distance between pixels, they are representations of domains. Typically, images are representations of spatial domains. An image of a spatial domain that is associated with the planet Earth is typically called a "geographic map." An image of another spatial domain may also be called a "map," but it is a map of a different type of space. For example, an image showing the fictional location known as "Middle Earth" described in the novels by Tolkien is a type of map, however the locations and domains displayed in such a map are not locations on planet Earth. Similarly, one may view images showing locations on the planet Mars, or locations in stores in the city of Paris, or locations of network hubs in the metric space defined by the distances between router connections on the Internet, or locations of organs in the anatomy of the fish known as a Large-Mouth Bass. An image depicting a spatial domain allows a person to observe the spatial relationships between locations, such as which locations are contained within others and which are adjacent to each other. A subset of pixels inside of an image is also an image. Call such a subset of pixels a "sub-image". In addition to simply depicting the relationships between locations, an image may also show conceptual relationships between entities in the metric space and other entities that are not part of that metric space. For example, an image might indicate which people own which buildings by showing the locations of buildings arranged in their relative positions within a domain of a geographic metric space and also showing sub-images that depict faces of people who own those buildings. Other sub-images may be textual labels or iconography that evokes recognition in the human viewer.

A "map image" is an image in which one or more sub-images depict locations from a spatial domain. A "geographic map image" is a map image in which the spatial domain is a geographic space.

"Scale" is the ratio constructed from dividing the physical distance in a map image by the metric distance that it represents in the actual domain. A "high scale" image is one in which the depiction in the map image is closer to the actual size than a "low scale" image. The act of "zooming in" is a request for a map image of higher scale; the act of "zooming out" is a request for a map image of lower scale.

A "search engine" is a computer program that accepts a request from a human or from another computer program and responding with a list of references to media objects that the search engine deems relevant to the request. Another name for a request to search engine is "search query" or simply a "query." Common examples of search engines include: free-text search engines that display lists of text fragments from media objects known as "web pages;" image search engines that accept free-text or other types of queries from users and present sets of summaries of images, also known as "image thumbnails;" commerce sites that allow users to navigate amongst a selection of product categories and attributes to retrieve listings of products; and online book stores that allow users to input search criteria in order to find books that match their interests. Frequently, a result set from a book search engine will contain just one result with several different types of summaries about the one book presented in the result list of length one. Related books are often described on pages that are accessible via a hyperlink; clicking such a hyperlink constructs a new query to the book search engine, which responds by generating a new page describing the new set of results requested by the user.

A "search result listing" is the list of references provided by a search engine.

A "search user" is a person using a search engine.

A "text search engine" is a search engine that accepts character symbols as input and responds with a search result listing of references to text documents.

A "string" is a list of characters chosen from some set symbols (an alphabet) or other means of encoding information. A "free text string" is a string generated by a human by typing, speaking, or some other means of interacting with a digital device. Typically, the string is intended to represent words that might be found in a dictionary or in other media objects. However, the point of the "free" designator is that the user can enter whatever characters they like without necessarily knowing that they have been combined that way ever before. That is, by entering a free text string, a user is creating a new string.

A "free text query" is a search engine query based on a free text string input by a user.

A "geographic search engine" or "geographic text search engine" or "location-related search engine" or "GTS" is a search engine that implements U.S. Pat. No. 7,117,199. A GTS provides location-based search user interfaces and tools for finding information about places using free-text query and domain identifiers as input. A GTS generally produces a list of document-location tuples as output.

A "user interface" is a visual presentation to a person. A "search user interface" is a user interface presented to a search user by a search engine.

A "display area" is a visual portion of a user interface. For example, in an HTML web page, a DIV element with CSS attributes is often used to specify the position and size of an element that consumes part of the visual space in the user interface.

A "text area" is a display area containing text and possibly other types of visual media.

A "map area" is a display area containing a map image and possibly other types of visual media.

A "graph area" is a display area containing a visual representation of a graph and possibly other types of visual media.

A "variable display element" is a class of display areas that encode a numerical value, such as a relevance score, in a visual attribute. Any instance of a given class of variable display elements can be easily visually compared with other instances of the class. For example, map visual indicators or markers with color varying from faint yellow to blazing hot orange-red can be easily compared. Each step along the color gradient is associated with an underlying numerical value. As another example, a map marker might have variable opacity, such that one end of the spectrum of values is completely transparent and the other extreme of the spectrum is totally opaque. As another example, background colors can be used to highlight text and can be a class of variable display elements using a gradient of colors, such as yellow-to-red.

A "human-computer interface device" is a hardware device that allows a person to experience digital media objects using their biological senses.

A "visual display" is a media object presented on a human-computer interface device that allows a person to see shapes and symbols arranged by the computer. A visual display is an image presented by a computer.

Computer systems often handle "requests" from users. There are many ways that a computer system can "receive a request" from a user. A mouse action or keystroke may constitute a request sent to the computer system. An automatic process may trigger a request to a computer system. When a user loads a page in a web browser, it causes the browser to send a request to one or more web servers, which receive the request and respond by sending content to the browser.

A "visual indicator" is a sub-image inside of a visual display that evokes recognition of a location or spatial relationship represented by the visual display.

A "marker symbol" is a visual indicator comprised of a sub-image positioned on top of the location that it indicates within the spatial domain represented by the visual display.

An "arrow" is a visual indicator comprised of an image that looks like a line segment with one end of the line segment closer to the location indicated by the visual indicator and the other end farther away, where closer and farther away are determined by a metric that describes the visual display.

The word "approximate" is often used to describe properties of a visual display. Since a visual display typically cannot depict every single detailed fact or attribute of entities in a space, it typically leaves out information. This neglect of information leads to the usage of the term approximate and often impacts the visual appearance of information in a visual display. For example, a visual indicator that indicates the location "Cambridge, Mass." in a geographic map image of the United States might simply be a visual indicator or marker symbol positioned on top of some of the pixels that partially cover the location defined by the polygon that defines the boundaries between Cambridge and neighboring towns. The marker symbol might overlap other pixels that are not contained within Cambridge. While this might seem like an error, it is part of the approximate nature of depicting spatial domains.

A "spatial thumbnail" is a visual display of a summary of a media object that presents to a user location-related content or spatial relationships contained in the media object summarized by the spatial thumbnail.

A "digital spatial thumbnail" is a spatial thumbnail comprised of a digital media object that summarizes a second media object, which might be either digital media object or other form of media object.

A "companion map" is a visual display that includes one or more spatial thumbnails and the entire media object summarized by the spatial thumbnail. If a companion map is a sub-summary, then may include only the sub-media object and not the entirety of the larger media object from which the sub-media object is excerpted.

An "article mapper application" is a computer program that provides companion maps for a digital media object.

To "resolve" a location reference is to associate a sub-media object with an entity in a metric space, such as a point in a vector space. For example, to say that the string "Cambridge, Mass." means a place with coordinates (−71.1061, 42.375) is to resolve the meaning of that string.

A "geoparsing engine" is a computer program that accepts digital media objects as input and responds with location-related content extracted from the media object and resolved to entities in a metric space. While the name "geoparsing engine" includes the substring "geo", in principle a geoparsing engine might extract location-related content about locations in non-geographic spatial domains, such as locations within the anatomy of an animal or locations with a metric space describing DNA interactions or protein interactions. Such a system might simply be called a "parsing engine."

A "text geoparsing engine" is a geoparsing engine that accepts digital text documents as input and responds with location-related content extracted from the document and resolved to entities in a metric space.

An "automatic spatial thumbnail" is a spatial thumbnail generated by a geoparsing engine without a human manually extracting and resolving all of the location references of the media object summarized by the spatial thumbnail. An automatic spatial thumbnail might be semi-automatic in the sense that a human might edit portions of the spatial thumbnail after the geoparsing engine generates an initial version. The geoparsing engine may operate by generating so-called "geotags," which are one type of location-related content that uses SGML, XML, or another type of compute-readable format to describe locations and spatial relationships in a spatial domain, such as a geographic domain. For further details on geotags, see, e.g., U.S. Provisional Patent Application No. 60/835,690, filed Aug. 4, 2006 and entitled "Geographic Text Search Enhancements," the entire contents of which are incorporated herein by reference.

An "automatic spatial thumbnail of a text document" is an automatic spatial thumbnail generated by a text geoparsing engine in response to a digital text document.

An "integrated spatial thumbnail" is an integrated summary that includes as one or more spatial thumbnails. An integrated spatial thumbnail may include sub-media objects excerpted from the media object being summarized, which illustrate location references that relate to the location-related content summarized by the spatial thumbnail. For example, an integrated spatial thumbnail that summarizes a PDF file might show text excerpted from the PDF file and a spatial thumbnail with a geographic map image showing visual indicators on locations described in the PDF's text. For another example, an integrated spatial thumbnail that summarizes a movie might show a text transcript of words spoken by actors in the movie and a spatial thumbnail showing the animated path of two of the movie's protagonists through a labyrinth described in the film.

An "automatic integrated spatial thumbnail" is an integrated spatial thumbnail in which one or more of the spatial thumbnails is an automatic spatial thumbnail.

A "representation of location-related content" is a visual display of associated location-related content. Since location-related content describes domains and spatial relationships in a metric space, a representation of that content uses the metric on the metric space to position visual indicators in the visual display, such that a human viewing the visual display can understand the relative positions, distances, and spatial relationships described by the location-related content.

A "web site" is a media object that presents visual displays to people by sending signals over a network like the Internet. Typically, a web site allows users to navigate between various visual displays presented by the web site. To facilitate this process of navigating, web sites provide a variety of "navigation guides" or listings of linkages between pages.

A "web site front page" is a type of navigation guide presented by a web site.

A "numerical score" is a number generated by a computer program based on analysis of a media object. Generally scores are used to compare different media objects. For example, a computer program that analysis images for people's faces might generate a score indicating how likely it is that a given contains an image of a person's face. Given a set of photos with these scores, those with the highest score are more likely to contain faces. Scores are sometimes normalized to range between zero and one, which makes them look like probabilities. Probabilistic scores are useful, because it is often more straightforward to combine multiple probabilistic scores than it is to combine unnormalized scores. Unnormalized scores range over a field of numbers, such as the real numbers, integers, complex numbers, or other numbers.

A "relevance score" is a numerical score that is usually intended to indicate the likelihood that a user will be interested in a particular media object. Often, a relevance score is used to rank documents. For example, a search engine often computes relevance scores for documents or for phrases that are responsive to a user's query. Media objects with higher relevance scores are more likely to be of interest to a user who entered that query.

A "confidence score" is a numerical score that is usually intended to indicate the likelihood that a media object has particular property. For example, a confidence score associated with a candidate location reference identified in a document is a numerical score indicating the likelihood that the author of the document intended the document to have the property that it refers to the candidate location. Confidence scores can be used for many similar purposes; for example, a system that identifies possible threats to a war ship might associate confidence scores with various events identified by metadata coming from sensor arrays, and these confidence scores indicate the likelihood that a given event is in fact a physical threat to the ship.

A "spatial cluster" is a set of locations that have been identified as proximate locations. For example, given a set of locations associated with a set of document-location tuples, one can identify one or more subsets of the locations that are closer to each other than to other locations in the set. Algorithms for detecting spatial clusters come in many flavors. Two popular varieties are k-means and partitioning. The k-means approach attempts to fit a specified number of peaked functions, such as Gaussian bumps, to a set of locations. By adjusting the parameters of the functions using linear regression or another fitting algorithm, one obtains the specified number of clusters. The fitting algorithm generally gives a numerical score indicating the quality of the fit. By adjusting the number of specified locations until a locally maximal fit quality is found, one obtains a set of spatially clustered locations. The partitioning approach divides the space into approximately regions with approximately equal numbers of locations from the set, and then subdivides those regions again. By repeating this process, one eventually defines regions surrounding each location individually. For each region with more than one location, one can compute a minimal bounding box or convex hull for the locations within it, and can then compute the density of locations within that bounding box or convex hull. The density is the number of locations divided by the volume (or area) of the convex hull or bounding box. These densities are numerical scores that can be used to differentiate each subset of locations identified by the partitioning. Subsets with high density scores are spatial clusters. There are many other means of generating spatial clusters. They all capture the idea of finding a subset of locations that are closer to each other than other locations.

A phrase in a text document is said to be "responsive to a free text query" if the words or portions of words in the text are recognizably related to the free text query. For example, a document that mentions "bibliography" is responsive to a query for the string "bib" because "bib" is a commonly used abbreviation for "bibliography". Similarly, a document that mentions "car" is responsive to a query containing the string "cars".

An "annotation" is a piece of descriptive information associated with a media object. For example, a hand-written note in the margin of a book is an annotation. When referring to maps, an annotation is a label that identifies a region or object and describes it with text or other forms of media, such as an image or sound. Map annotation is important to location-related searching, because the search results can be used as annotation on a map.

A "physical domain" is a region of space in the known universe or a class of regions in the known universe. For example, the disk-shaped region between the Earth's orbit and the Sun is a region of space in the known universe that changes in time as our solar system moves with the Milky Way Galaxy. For another example, space inside of a particular model of car are a class of region; any copy of the car has an instance of that class of physical domain.

A "planetary body" is a physical domain of reasonably solid character following a trajectory through the known universe, such as the planet Earth, the planet Mars, the Earth's Moon, the moons of other planets, and also asteroids, comets, stars, and condensing clouds of dust.

DESCRIPTION OF DRAWINGS

FIG. 13A schematically represents elements of an interface allowing a user to correct location references extracted from text according to an embodiment of the invention;

FIG. 13B schematically represents elements of an interface allowing a user to correct location references extracted from text according to an embodiment of the invention;

FIG. 13C schematically represents elements of an interface allowing a user to correct location references extracted from text according to an embodiment of the invention; and FIG. 13D schematically represents elements of an interface allowing a user to correct location references extracted from text according to an embodiment of the invention.

DETAILED DESCRIPTION

Overview

Figure 1:
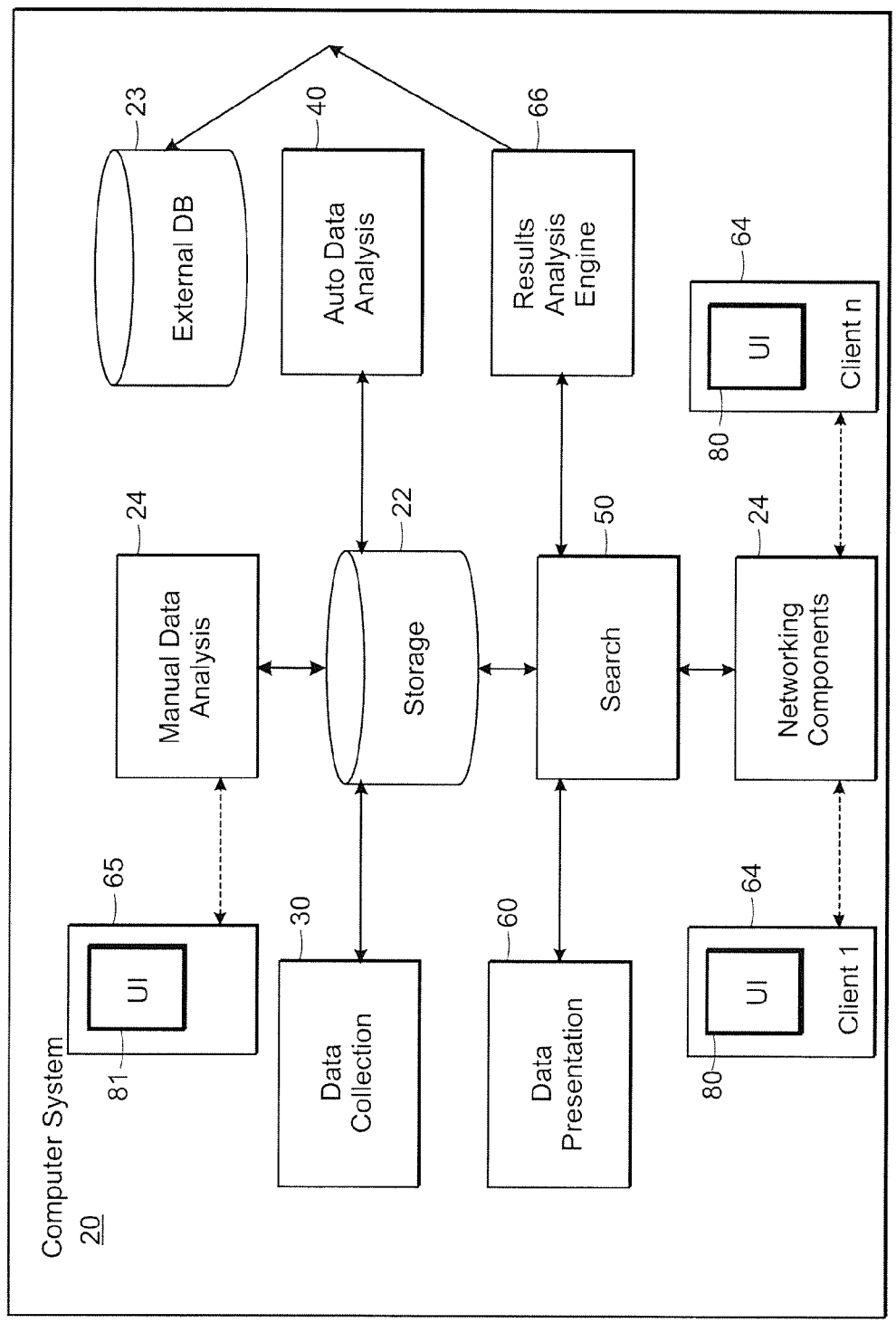
FIG. 1 schematically shows an overall arrangement of a computer system according to an embodiment of the invention.

The systems and methods described herein provide enhanced ways of presenting information to users. The systems and methods can be used in concert with a geographic text search (GTS) engine, such as that described in U.S. Pat. No. 7,117,199. However, in general the systems and methods are not limited to use with GTS systems, or even to use with search engines.

Under one aspect, the systems and methods organize a corpus of documents, e.g., the results of a GTS search, in a way intended to be more meaningful to a user than a conventional "flat list" in which the documents or portions of documents are merely ranked by a relevance score. More specifically, the corpus of documents is organized hierarchically, based on spatial relationships between locations referenced within the documents. A relatively large spatial area, such as a country, can be treated as a "parent node" in a hierarchy. A relatively small spatial area that is at least partially contained within the larger area, such as a state within that country, can be treated as a "child node" of the parent. Child nodes may themselves have children, e.g., cities within a state, neighborhoods within the cities, addresses within the neighborhoods. The nodes are arranged hierarchically in a graph structure that represents the spatial relationships between the location entities, e.g., the child node is assigned a different level than its parent. The corpus of documents is then presented to the user, based on this graph structure, such that the user can view representations of locations at a selected node level, and can determine which documents or portions of documents are of particular interest based on the locations referenced within the documents. For example, and as described in greater detail below, the user can first be presented representations of locations at the highest node, e.g., can be presented with a list of different countries that different documents reference. If the user finds one of these countries interesting, and therefore selects it, then the user can be presented with that node's children at the next lowest level, e.g., can be presented with a list of states within that country, and so forth. This hierarchical organization can be represented in many ways, for example in a graph structure presented in a GUI, on a map, and/or within the list of documents itself. The graph structure represents relationships between the locations, and these relationships humans can curate these relationships to reflect the interests of particular groups of users.

Under another aspect, the systems and methods allow the user to inspect the results of a GTS search. GTS searches can generate a significant number of results, in the form of document-location tuples, which can be presented to the user as a plurality of selectable visual indicators, such as icons, on a map representing a domain of interest to the user. Conventionally, the user can select a visual indicator on the map in order to view the associated document. However, in some circumstances, the visual indicators may be highly clustered in a given area, which can make it difficult for the user to understand and/or to select results in that area, thus increasing the likelihood that the user will miss a highly relevant result. Allowing the user to inspect results within a particular subdomain, such as a highly clustered area, can allow the user to better appreciate the results within that subdomain. In some embodiments, this is accomplished by providing a "magnifying glass" in the interface that the user can "move" over the map in order to more closely view results within a particular subdomain represented on the map, without changing the scale of the original map. As the user moves the magnifying glass, the interface obtains and presents additional information about documents referencing that subdomain. For example, the interface can be configured to present "snippets" of text from at least some of the documents within the subdomain, where the snippets reference locations within the subdomain. Based on the snippets, the user can more easily determine which documents or portions of documents interest them.

Under another aspect, the systems and methods provide additional information, besides document-location tuples, in response to a user query to a GTS engine. Such a query typically includes a domain identifier, which identifies a domain (such as a city or bounding box) of interest to the user, and a free-text string. In some embodiments, the systems and methods recognize that additional information might be useful to the user, and construct an additional query. For example, the user's query might include the string "shoes" and the domain identifier "Cambridge, Mass." This query is sent as usual to the GTS engine, which finds and presents documents that satisfy the string as well as the domain identifier. The systems and methods recognize that it could also be helpful to the user to present a map of shoe stores in Cambridge, Mass., in combination with the normal GTS results, and so executes a separate query (for example, to a separate database of structured information such as a gazetteer) to determine this information. In some embodiments, the systems and methods instead perform a statistical analysis of phrases in the search results returned by the GTS engine, and present information to the user based on this analysis. For example, the systems and methods may determine that a particular phrase such as "gangs" is highly statistically correlated with a particular subdomain of the domain searched by the user, and present this information to the user, e.g., by annotating the map with text snippets including the phrase and/or by indicating the region on the map.

Under another aspect, the systems and methods can perform various statistical analyses on a corpus of documents, e.g., on a set of GTS search results, in order to determine additional information about the documents that the user might not have otherwise appreciated. For example, the systems and methods can recognize that the documents include statistically interesting phrases, that is, phrases that are statistically rare and therefore possibly represent interesting information (as compared to the word "the" which is extremely common). The phrases may also reference locations, in which case the presentation of the association between these phrases and the locations may be useful to the user, for example, the user may not have recognized such an association. An annotated map can be presented to the user, where the annotations are "snippets" of text from the documents that include the statistically interesting phrase as well as the location reference therein. Or, for example, the systems and methods can recognize that among locations referenced within the documents, some locations may occur relatively more or less frequently than others, and that the user may appreciate this fact. A map can be presented to the user that uses visual indicators to represent that certain sets of proximate locations are "hotspots," that is, that a relatively large number of documents reference those locations, and therefore may include particularly interesting information. In order to present this information more usefully to the user, the hotspot can be represented by a special indicator that shows how many documents reference a particular region, and possibly includes one or more snippets of text that reference the region.

Under another aspect, the systems and methods allow users to manually correct "GeoTags" associated with documents, and thus improve the information displayed to other users who wish to view location-related content of those documents. A GeoTag is a kind of metadata, associated with a document, that contains information about the locations that the document supposedly refers to, e.g., the name of the location, the coordinates of the location, and what substrings within the document refer to that location. GeoTags are usefully automatically generated for a document, e.g., by a GeoParser that parses the document, identifies what appears to be location references, and associates those references with known locations, as described in greater detail below and in U.S. Pat. No. 7,117,199. However, because it is an automated system, the GeoParser does not always obtain correct location references with perfect accuracy. A human can review and correct the results of the automated GeoParser, for example by adding GeoTags that the GeoParser missed, deleting a GeoTag that did not actually refer to a place, and/or by changing the location to which the GeoTag refers. This corrected set of GeoTags for the document can then be fed back to the GeoParser in order to train it to better identify location references.

Under another aspect, the systems and methods can allow the user to request location-related information about a document. For example, the user may obtain a document of interest, and wish to obtain a better understanding of the locations that the document refers to. A button can be provided in the user's document viewing interface that allows the user to view location-related content about the document. To obtain this location related content, the systems and methods communicate with a subsystem (which can be local or remote) that provides the location related content. That content can be presented to the user in a map interface and/or by displaying the text with location references highlighted.

First, a brief overview of an exemplary GTS system, and a GUI running thereon, will be described. Then, the different subsystems and methods will be described in greater detail, in separate sections following the overview. Not all embodiments will include all of the subsystems or methods.

Many of the embodiments described herein assume that a geographic text search (GTS) engine has generated a list of search results in response to a user query. For example, U.S. Pat. No. 7,117,199 describes exemplary systems and methods that enable the user, among other things, to pose a query to a geographic text search (GTS) engine via a map interface and/or a free-text query. The query results returned by the geographic text search engine are represented on a map interface as icons. The map and the icons are responsive to further user actions, including changes to the scope of the map, changes to the terms of the query, or closer examination of a subset of results.

In general, with reference to FIG. 1, the computer system 20 includes a storage 22 system which contains information in the form of documents, along with location-related information about the documents. The computer system 20 also includes subsystems for data collection 30, automatic data analysis 40, manual data analysis 24, search 50, data presentation 60, and results analysis engine 66. The computer system 20 further includes networking components 24 that allow a user interface 80 to be presented to a user through a client 64 (there can be many of these, so that many users can access the system), which allows the user to execute searches of documents in storage 22, and represents the query results arranged on a map, in addition to other information provided by one or more other subsystems, as described in greater detail below. The system can also include other subsystems not shown in FIG. 1.

The data collection 30 subsystem gathers new documents, as described in U.S. Pat. No. 7,117,199. The data collection 30 subsystem includes a crawler, a page queue, and a metasearcher. Briefly, the crawler loads a document over a network, saves it to storage 22, and scans it for hyperlinks. By repeatedly following these hyperlinks, much of a networked system of documents can be discovered and saved to storage 22. The page queue stores document addresses in a database table. The metasearcher performs additional crawling functions. Not all embodiments need include all aspects of data collection subsystem 30. For example, if the corpus of documents to be the target of user queries is saved locally or remotely in storage 22, then data collection subsystem need not include the crawler since the documents need not be discovered but are rather simply provided to the system.

The data analysis 40 subsystem extracts information and meta-information from documents. As described in U.S. Pat. No. 7,117,199, the data analysis 40 subsystem includes, among other things, a spatial recognizer and a spatial coder. As new documents are saved into storage 22, the spatial recognizer opens each document and scans the content, searching for patterns that resemble parts of spatial identifiers, i.e., that appear to include information about locations. One exemplary pattern is a street address. The spatial recognizer then parses the text of the candidate spatial data, compares it to known spatial data, and assigns relevance score to the document. Some documents can have multiple spatial references, in which case reference is treated separately. The spatial coder then associates domain locations with various identifiers in the document content. The spatial coder can also deduce a spatial relevance for terms (words and phrases) that correspond to geographic locations but are not recorded by any existing geocoding services, e.g., infer that the "big apple" frequently refers to New York City. The identified location-related content associated with a document may in some circumstances be referred to as a "GeoTag." Documents and location-related information identified within the documents are saved in storage 22 as "document-location tuples," which are two-item sets of information containing a reference to a document (also known as an "address" for the document) and a metadata that includes a domain identifier identifying a location, as well as other associated metadata such as coordinates of the location.

The search 50 subsystem responds to queries with a set of documents ranked by relevance. The set of documents satisfy both the free-text query and the spatial criteria submitted by the user (more below).

The data presentation 60 subsystem manages the presentation of information to the user as the user issues queries or uses other tools on UI 80. For example, given the potentially vast amount of information, document ranking is very important. Results relevant to the user's query must not be overwhelmed by irrelevant results, or the system will be useless. As described in greater detail below, the data presentation 60 subsystem can organize search results hierarchically, e.g., according to geographical location, in order to allow the user to more readily find results of particular interest than if the results were instead simply presented in a "flat" list as is conventionally done. This functionality can also be provided by logic within the user interface, or by other logic.

The auto data analysis engine 40 performs statistical analyses of the text of the documents and/or location references in the documents as described in greater detail below.

The results analysis engine 66 performs additional queries, e.g. to structured databases such as a gazetteer, represented as "External DB" 23, as is described in greater detail below.

Manual data analysis 24 presents an interface 81 running in client 65 that allows a user to manually correct geotags or other metadata associated with documents saved in storage 22. The geotags may have been automatically generated, e.g., by auto data analysis 40. Manual geotag correction is described in greater detail below.

Figure 2:
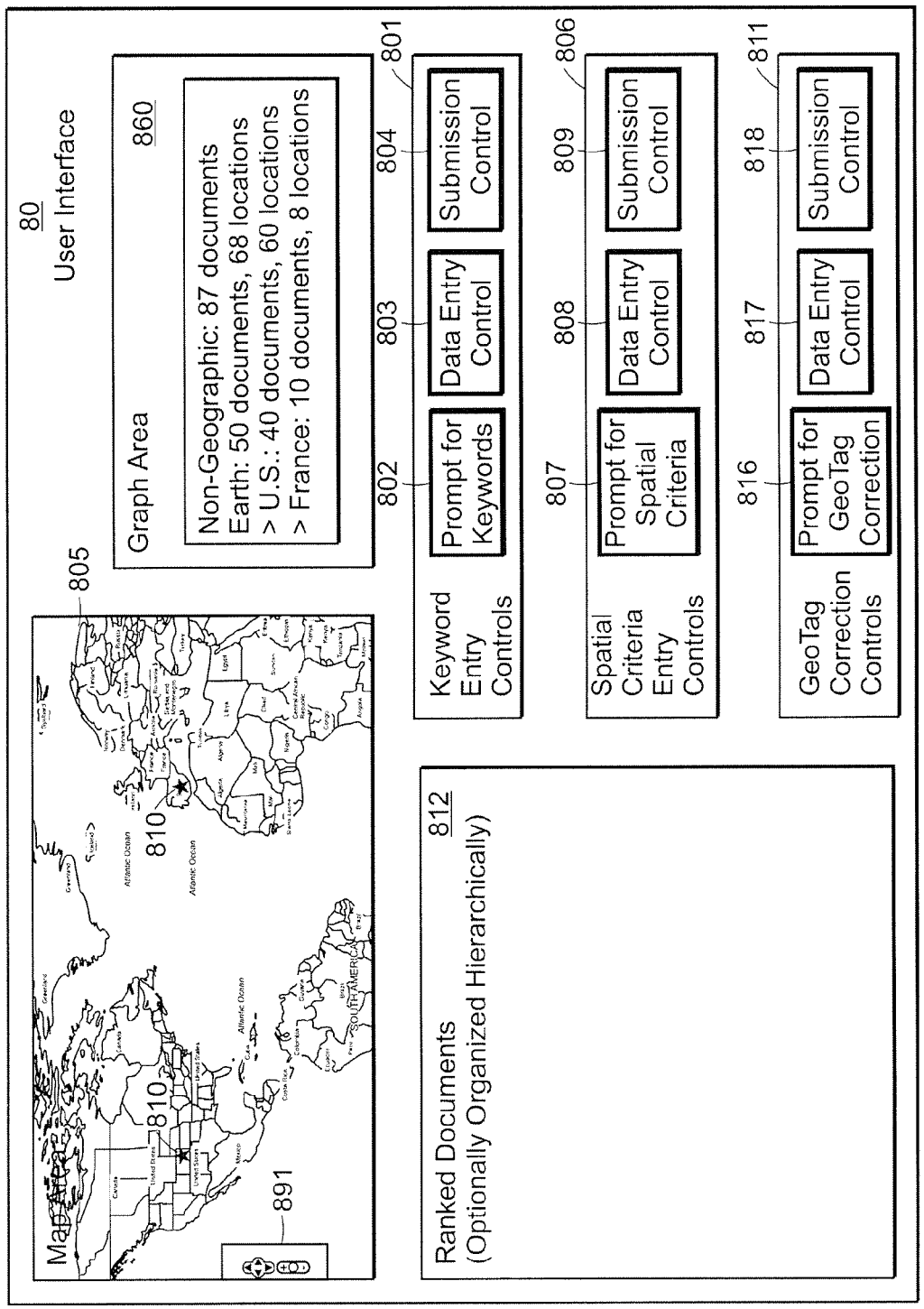
FIG. 2 schematically represents an arrangement of controls on a map interface according to an embodiment of the invention.

With reference to FIG. 2, the user interface (UI) 80 is presented to the user on a computing device having an appropriate output device. The UI 80 includes multiple regions for presenting different kinds of information to the user, and accepting different kinds of input from the user. Among other things, the UI 80 includes a keyword entry control area 801, a spatial criteria entry control area 806, a GeoTag correction control area 811, a graph area 860, a map area 805, and a document area 812.

As is common in the art, the UI 80 includes a pointer symbol responsive to the user's manipulation and "clicking" of a pointing device such as a mouse, and is superimposed on the UI 80 contents. In combination with the keyboard, the user can interact with different features of the UI in order to, for example, execute searches, inspect results, or correct results, as described in greater detail below.

Map 805 represents a spatial domain, but need not be a physical domain as noted above in the "Definitions" section. The map 805 uses a scale in representing the domain. The scale indicates what subset of the domain will be displayed in the map 805. The user can adjust the view displayed by the map 805 in several ways, for example by clicking on the view bar 891 to adjust the scale or pan the view of the map.

As described in U.S. Pat. No. 7,117,199, keyword entry control area 801 and spatial criteria control area 806 allow the user to execute queries based on free text strings as well as spatial domain identifiers (e.g., geographical domains of particular interest to the user). Keyword entry control area 801 includes area prompting the user for keyword entry 802, data entry control 803, and submission control 804. Spatial criteria entry control area 806 includes area prompting the user for keyword entry 802, data entry control 803, and submission control 804. The user can also use map 805 as a way of entering spatial criteria by zooming and/or panning to a domain of particular interest.

Examples of keywords include any word of interest to the user, or simply a string pattern. This "free text entry query" allows much more versatile searching than searching by predetermined categories. The computer system 20 attempts to match the query text against text found in all documents in the corpus, and to match the spatial criteria against locations associated with those documents.

After the user has submitted a query, the map interface 80 may use icons 810 to represent documents in storage 22 that satisfy the query criteria to a degree determined by the search 50 process. The display placement of an icon 810 represents a correlation between its documents and the corresponding domain location. Specifically, for a given icon 810 having a domain location, and for each document associated with the icon 810, the subsystem for data analysis 20 must have determined that the document relates to the domain location. The subsystem for data analysis 20 might determine such a relation from a user's inputting that location for the document. Note that a document can relate to more than one domain location, and thus would be represented by more than one icon 810.

The user can optionally use geotext correction controls 811 in order to modify metadata associated with documents, as described in greater detail below.

The graph area 860 can be used to present results to the user in a hierarchically organized manner, as described in greater detail below. The document area 812 displays documents to the user, which are optionally also organized hierarchically.

Hierarchical Organization and Presentation of Geographic Search Results

When presenting geographic search results generated from a query applied to a document corpus, there are generally many locations to display to the user. Individual documents often refer to multiple locations of different types, and any query that retrieves multiple document-location tuples is likely to have multiple locations to present to the user. One document might refer to a landmark like the Statue of Liberty, New York Harbor, the country of France, the country of the United States, and also a town in Wisconsin. Displaying all of these locations, or "georeferences," associated with the documents can be complicated.

For example, a single document might include the following pieces of text from the wikipedia:

"Liberty Enlightening the World, known more commonly as the Statue of Liberty, is a statue given to the United States by France in the late 19th century, standing at Liberty Island in the mouth of the Hudson River in New York Harbor as a welcome to all returning Americans, visitors, and immigrants . . . The copper statue, dedicated on Oct. 28, 1886, commemorates the centennial of the United States and is a gesture of friendship between the two nations. The sculptor was Frederic Auguste Bartholdi; Gustave Eiffel, the designer of the Eiffel Tower, engineered the internal supporting structure. The Statue of Liberty is one of the most recognizable icons of the U.S. worldwide; in a more general sense, the statue represents liberty and escape from oppression. It is also a favored symbol of libertarians."

"February 1979: Statue of Liberty apparently submerged, Lake Mendota (Madison, Wis.)"

When presenting geographic search results, for example as generated using the systems and methods described in U.S. Pat. No. 7,117,199 and related applications, it can be useful to represent one or more of the results as point locations in a map, even for references to locations that cover many pixels in the display. Any document-location tuple can be reduced to a document-point tuple by choosing some representative point to indicate the extended region. This allows the document-location tuples to be displayed simply as point objects on the map. The example document described above might be represented by point-like markers positioned in the center of the United States, the center of France, the center of the Statue of Liberty, the center of the Eiffel Tower, the center of Lake Mendota, the center of Madison, and the center of Wisconsin, the center of the Hudson river, and the center of New York Harbor.

However, search results being represented by points are typically extended areas, such as a town (e.g., Madison) being represented by its center coordinates alone. However, this can result in the user obtaining less information about the search result than is actually available. For example, a point representing the United States might be represented as a point placed at the geographic center of the United States on a map, e.g., in Kansas. A user viewing this point representation could misinterpret the point as representing a search result relevant only to Kansas, and thus inadvertently disregard what may actually be a useful search result.

Some conventional systems use scaling techniques to improve the presentation of point locations on a map. The scale of a map is the ratio of distance on the display to actual distance on the ground of the depicted place. Some software tools for making digital maps or sets of hardcopy maps allow the cartographer to set attributes on geographic features that determine the range of scales over which the feature will be displayed. The range of scales over which the feature is displayed are typically chosen to make the feature appear when the user is viewing a map that would dedicate a reasonable number of pixels to the feature, and make it disappear when the number of pixels would be small. The number of pixels will be small when viewing a relatively low scale map. When zoomed out far enough, the feature will be contained in less than a pixel. On the other hand, when zoomed in far enough the feature will cover the entire display and may not have any distinguishing differences from pixel to pixel. To cope with this, mapping tools allow cartographers to choose display parameters such as "minimum scale" and "maximum scale," or minscale and maxscale for short. If a geometric object's minscale attribute is 1:50,000 and maxscale attribute is 1:1,000, then the object will not be displayed unless the map has been zoomed into a scale larger than 1:50,000 but less than 1:1,000.

When displaying GTS results generated from a query applied to a document corpus, as described in U.S. Pat. No. 7,117,199, the various geometric features referenced by the text can be given display attributes such as minscale and maxscale. These attributes can determine whether a result is presented to a user, when the user is viewing a map zoomed to a particular scale. For example, if the location component of one of the document-location tuples in a search result listing from a GTS is a location with a maxscale attribute of 1:100,000, then when the user zooms into a map with a larger scale (e.g. 1:50,000) then this document-location tuple would be removed from the list and not represented in the map by a visual indicator. The minscale/maxscale parameters of each location are set by the GTS geographic data set. It is possible for cartographers to update the parameters for the data set inside the GTS and for data that they add to the GTS for recognizing new location references.

Using the example document provided above, it can be seen that a point is not a an accurate representation of the Eiffel Tower, and the user must zoom-in in order to view a high-scale rendering of the structure. Conversely, a point may not be a particularly useful representation of France or the United States on a low-scale map of the entire world, because these are much larger regions.

While geographic information systems (GIS) can display polygons that more accurately depict the extended nature of real physical entities and regions, this requires more sophisticated display techniques and can visually clutter the display. Thus, for many applications, a point marker can be a computationally simple way of representing an extended area.

Here we disclose systems and methods that organize GTS results hierarchically in order to present the results more meaningfully to the user, and to give the user more control over what is presented in the map. Point-like visual indicators, polygons, or any other suitable markers are used to represent the hierarchically organized search results. However, instead of representing search results based solely on scaling, the search results are hierarchically organized in an acyclic graph structure according to geographical relationships between locations referenced by those search results. For example, among some of the geographical entities referenced in the example document above, Lake Mendota is contained within Wisconsin, and Wisconsin is contained within the United States. Using a user interface such as that described below, a user can select a particular level of the acyclic graph structure to view information about search results at high levels of the hierarchy (e.g., continents or countries), or at low levels of the hierarchy (e.g., states, cities, or particular geographical features), as desired. Thus, the user can potentially find search results of particular interest more readily than if all the search results simply satisfying a particular scaling criteria were presented to the user, as is conventionally done.

Figure 3A:
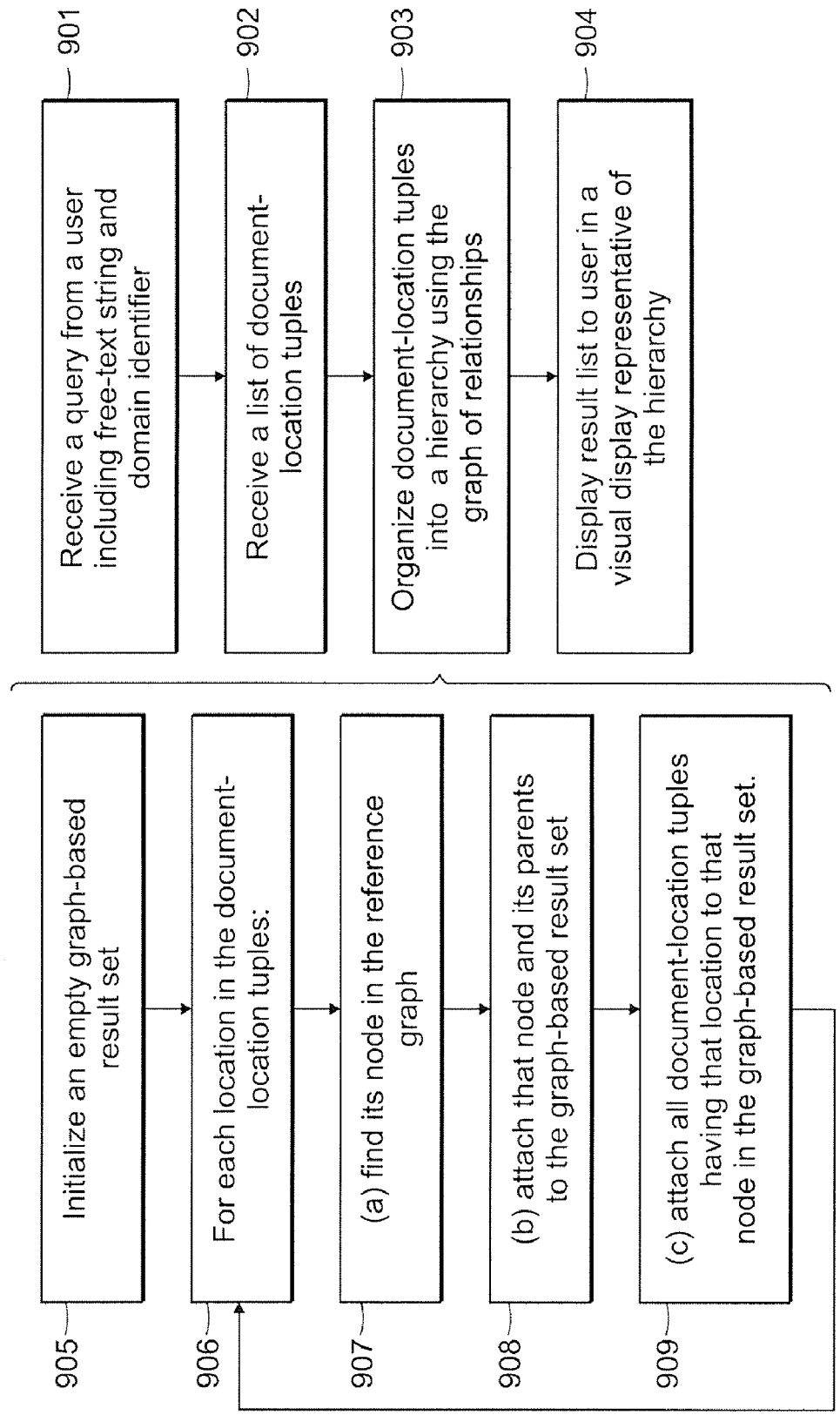
FIG. 3A is a schematic of steps in a method of hierarchically organizing search results according to an embodiment of the invention.

FIG. 3A is a flow chart of a method for hierarchically ordering search results and presenting the results in a visual display representative of the hierarchy. The method is described from the point of view of the interface program that presents results to the user. To provide graph-based search results, the system receives a query 901 from a user and responds with document-location tuples that have been organized into a hierarchical result set 904. The user's query can include a free-text string, such as might be submitted through a FORM field in an HTML page, or it can include a domain identifier, such as the bounding box for a map view displayed to a user, or can include both. If absent, the free-text string is treated as the empty string. If absent, the domain identifier is treated as the whole space, such as the entire planet Earth. The user's query is sent to a search engine, which generates a list of relevance-sorted document-location tuples and associated metadata 902. Each document-location tuple is implemented as a docID and a locID number that refer to a master database of documents and locations known to the system. The locID numbers are associated with nodes in the reference graph 907, which allows the system to determine the locIDs of parent locations in the reference graph 903. To construct a result set, the system initializes an empty graph 905. The subtrees of the reference graph that contain one or more locations 906 in the set of document-location tuples are gathered together into a result set graph 908, which is a copy of a subset of the reference graph. The information associated with the document-location tuples are attached to the result set graph 909. This result set graph is the hierarchically organized result set that is sent to the user's client for display 904. The client application provides a visual representation of the result set graph, so that the user can benefit from the greater understanding and clarity that the graph structure provides.

Figure 3B:
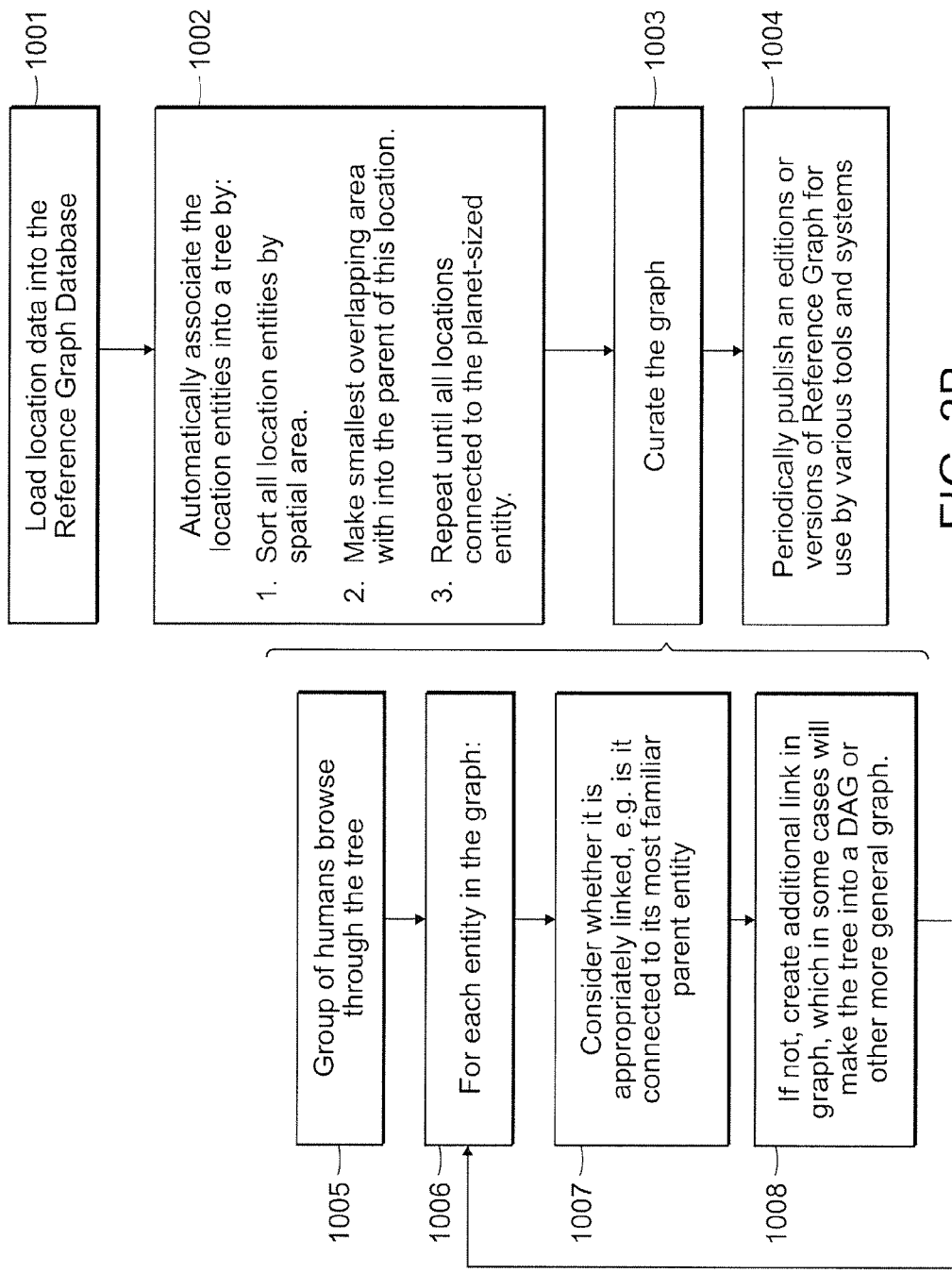
FIG. 3B is a schematic of steps is a method of hierarchically organizing a reference graph according to an embodiment of the invention.

FIG. 3B shows steps in a method of constructing a reference graph. To construct a reference graph, one can take a flat list of possibly many geometric entities and load them into a regular SQL database 1001. Then, an initial tree graph can be constructed by computing the area of every location 1002(1), point locations have zero area and contain no other locations, and defining the smallest area that overlaps a location to be that location's parent 1002(2). By repeating this 1002(3), a tree structure containing all the locations is obtained. Humans 1005 can then curate the graph 1003 by browsing through the tree 1005 and for each node 1006 evaluating whether it has any links that the curators deem to be inappropriate or is missing any links to other entities that it should have. The resulting graph 1008 might have multiple parents for some nodes (a DAG) or even may have cycles. This curated graph can be published to other systems at various times 1004. Note that while at least some nodes representing larger-area geographical features will be parents of (at a higher level than) nodes representing smaller-area geographical features that are encompassed within the larger-area geographical areas, in some circumstances a smaller-area geographical feature can be a parent to a larger-area geographical feature. For example, the "Eastern Seaboard" can be a parent to the states that make up the Eastern Seaboard, even the states together occupy a larger geographical area than does the Eastern Seaboard.

The resulting organization of search results into a graph, with or without the use of a reference graph to do so, represents relationships amongst geometric entities in a vector space of interest. The relationships may be containment, or partial containment, or proximity or abstract relationships such as who owns particular pieces of property. Such abstract relationships might be devoid of geometric meaning yet still provide associations amongst the geometric entities in the space. Documents that refer to these locations may refer to multiple locations. An entire corpus of documents that refers to locations in the vector space may be indexed for geographic search. The graph structure of geometric relationships can greatly assist the search user in searching and exploring these documents and the information contained within them. A user interface that utilizes such a graph structure can include three display areas: a text area, a map area, and a graph area. All three areas need not be included in a particular UI 80. In some circumstances a single area can serve a dual role, as described in greater detail below. FIGS. 4A-4E show exemplary map and graph areas that a user can view for a search result returning the document discussed above. As described above, the map area 805 displays a map image and visual indicators associated with documents that refer to those locations. Although it is not shown in FIGS. 4A-4E, the text area displays submedia objects, summaries, and metadata about the document-location tuples in the search result set retrieved by the user's query. The graph area 860 displays a visual representation of the graph of relationships amongst the locations referenced in the search result set.

The graph area 860 allows the user to see the relationships amongst the locations and to navigate amongst the locations within the graph structure. By selecting a location in the graph area, the user can cause the map area to change the selected domain, thus updating the user's query. Although the described embodiment assumes that a directed acyclic graph (DAG) is used to organize the locations, other graph types can be used, such as tree graphs.

It is possible to combine the graph area with the text area. For example, rather than a flat list, the text area can present the document-location tuples in a hierarchical structure representing a directed acyclic graph that could be constructed from spatial relationships amongst the locations.

It is also possible to combine the graph area with the map area. For example, if the locations in the space are associated via partial containment, then it is often straightforward to assign minscale/maxscale attributes to the locations so that all the locations at a particular level in the directed acyclic graph appear within the same scale range. With this structure in place, when presenting visual indicators in the map, the system will present only locations at one level in the DAG. By zooming in, the user can select a lower level in the DAG. By zooming out to a lower scale, the user can select a higher level in the DAG. This puts the graph navigation ability into the map itself.

As illustrated by these two examples, the graph structure can be represented in both the map area and the text area simultaneously. It is also possible to put the graph area separately as an independent visual display area. Such an independent graph area might show a network of nodes with lines between them or a hierarchical list of folder-like images indicating that locations are contained inside of other locations. FIG. 4A-4E illustrate the latter, although it should be understood that it is a non-limiting representation of the graph structure.

We define the term "geohierarchy" to mean a graph structure, such as a directed acyclic graph data structure, containing a geographic entity at every node. All of the geographic entities contained within or overlapping with an entity are linked as child elements of that node. When only fully containing relationships are included, this is a tree graph, i.e. every node has only one immediate parent. When geographically overlapping regions are included, then a node can have multiple parents. Either type of graph is a useful type of geohierarchy.

Any set of geographic search results can be used to "populate" nodes in a geohierarchy. Each document-location tuple in the search results is associated with a list of documents attached to each location node in the geohierarchy. For example, the above example document from wikipedia would get associated with the nodes for Lake Mendota, Wis., the United States, France, etc.

Different geohierarchies might organize different entities in different ways. For example, the Hudson River could be treated as a child of the United States node or it could be treated the child of any of several levels of subregion, or it might not be included as a distinct node at all.

Figure 4A:
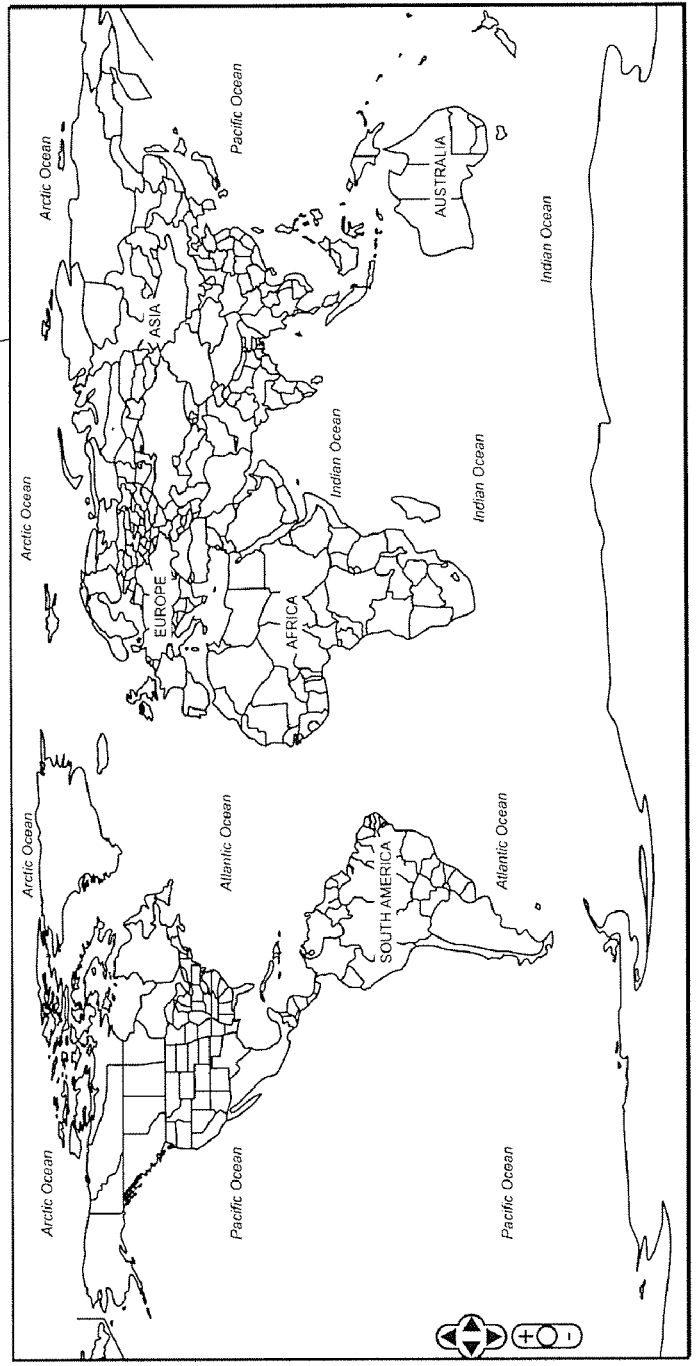
FIG. 4A schematically represents elements of a map interface for presenting hierarchically organized search results according to an embodiment of the invention.

As shown in FIG. 4A, the geohierarchy is presented to the user as a visual display element in the graphical user interface that presents the search results. The geohierarchy is a list of node names with control elements that allow the user to navigate through the hierarchy by "expanding" any node to display its children nodes. This visual effect is familiar from file system GUIs and other foldering displays.

Each node in the geohierarchy identifies a subgraph that includes all of the children descending from that node. When our system presents a geographic search result set, it populates a geohierarchy and counts the number of document-location tuples in each of the subgraphs whose root node is currently visible to the user. As the user navigates the geohierarchy by closing and opening various nodes, the system presents the number of document-location tuples contained below the nodes that the user is looking at.

FIGS. 4A-4E shows a graph 860 and a map 805 for a search result set containing only the example document described above. In this search result, ten nodes in a typical geohierarchy are activated—one node for each of the geographic entities referenced. When the user interface first presents the results, as shown in FIG. 4A, it has the geohierarchy fully collapsed to show only two nodes, one relating to non-geographic documents (of which there are none), and one relating to documents referring to Earth (of which there is one, with 10 location references). The corresponding map 805 represents the lowest level node shown in the graph, in this case Earth. Because many documents refer only to locations on Earth, in some circumstances the graph 860 and map 805 of FIG. 4A need not be displayed to the user, and the graph and map of FIG. 4B, providing a high level overview of which locations on Earth the documents refer, shown instead. However in circumstances where documents refer to locations outside of Earth, e.g., if the user is seeking information about different planetary bodies, then the graph and/or map of FIG. 4A could reflect other parent nodes corresponding to the other planetary bodies.

Figure 4B:
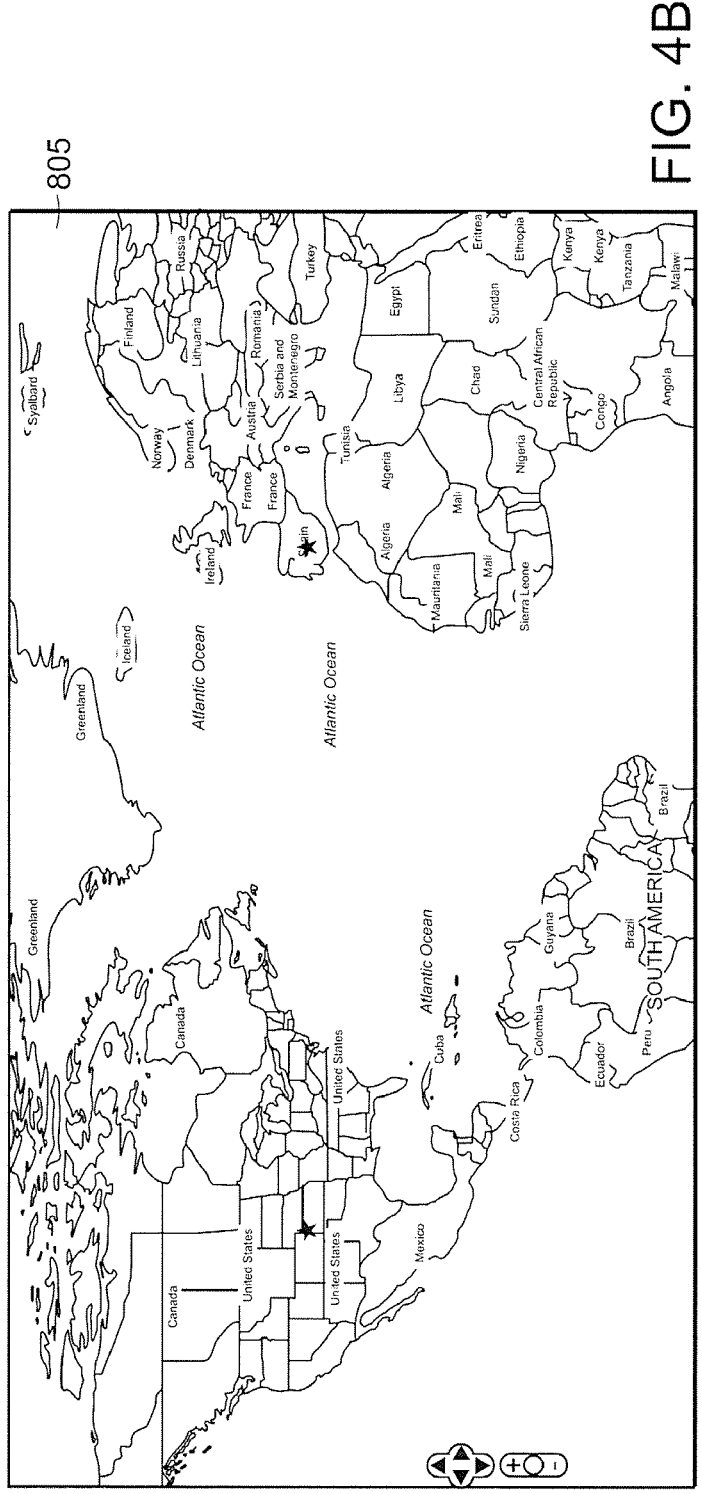
FIG. 4B schematically represents elements of a map interface for presenting hierarchically organized search results according to an embodiment of the invention.

As shown in FIG. 4B, if the user opens the second node (relating to documents referring to Earth) then graph 860 expands that node to show the second node's two child nodes at the next lowest level, one relating to documents referring to France (of which there is one, with one location reference), and one relating to documents referring to United States (of which there is one, with seven location references). The total location count appears to have gone down, because 1+7=8, which is two less than ten. This is because the United States and France were included in the ten locations on Earth, and now they are represented by the two populated nodes in the expanded visual representation of the geohierarchy. The map can display polygons for France and the United States and points within this polygons for the other locations, or it might not show anything for the US and France and show two or more separate maps zoomed in on the clusters of locations. Representations of these nodes are also indicated on the corresponding map 805, as point markers (such as a "star," as illustrated) or as a polygon representing an area on the map (not shown).

Figure 4C:
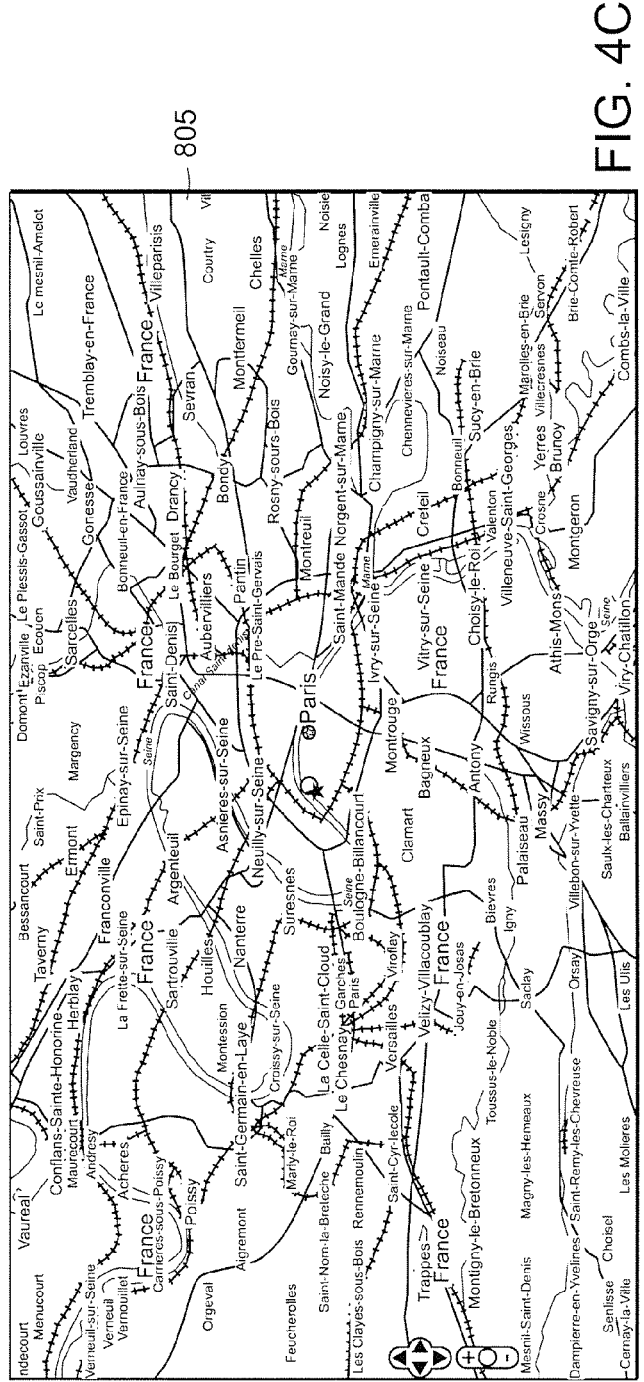
FIG. 4C schematically represents elements of a map interface for presenting hierarchically organized search results according to an embodiment of the invention.
Figure 4D:
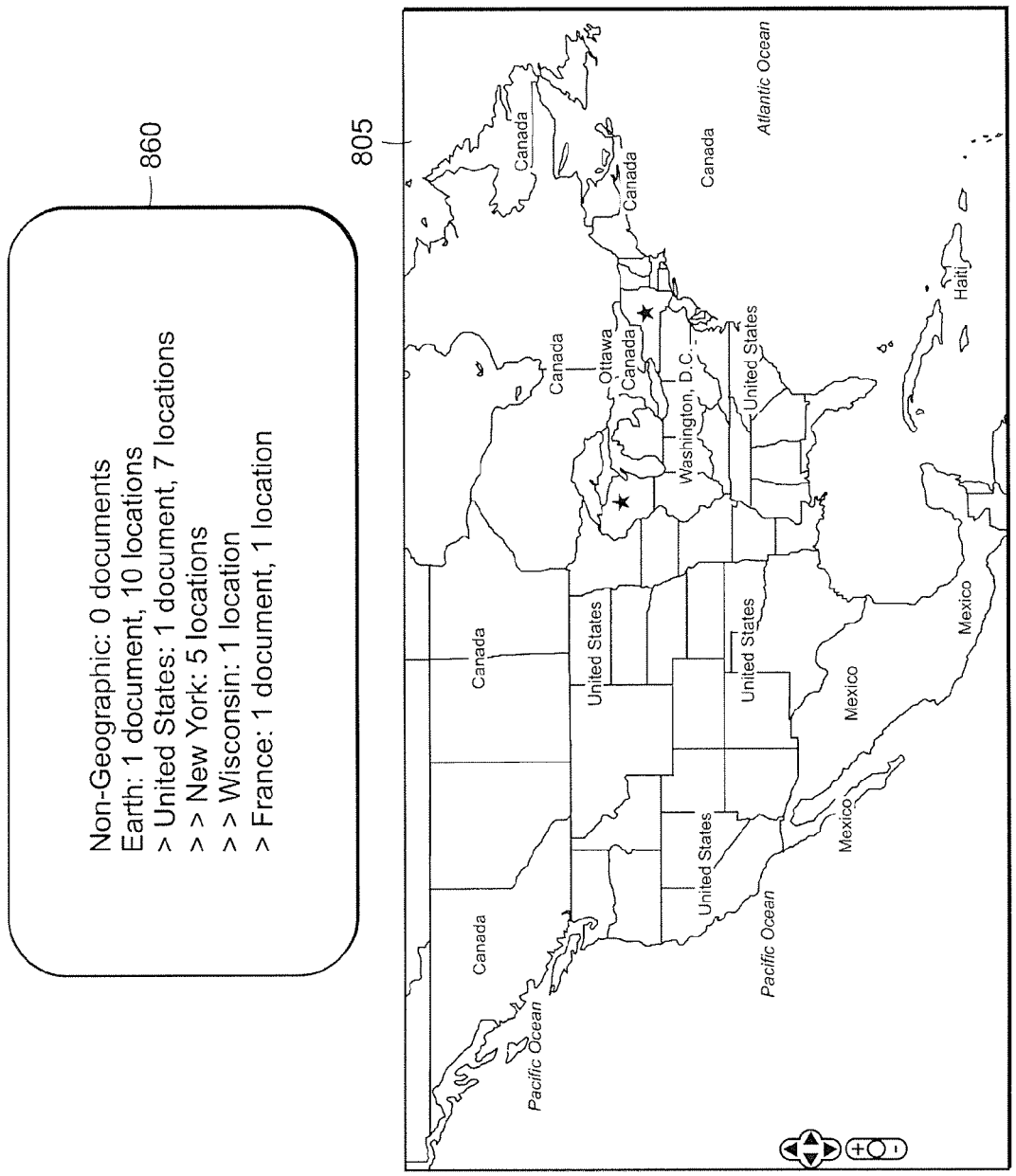
FIG. 4D schematically represents elements of a map interface for presenting hierarchically organized search results according to an embodiment of the invention.
Figure 4E:
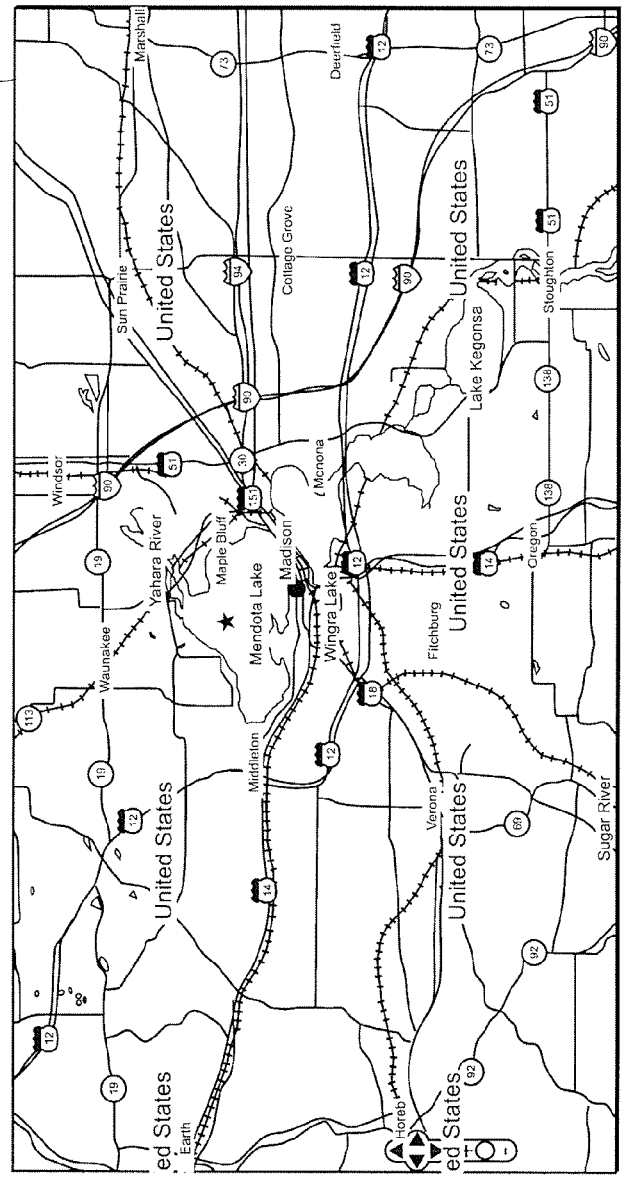
FIG. 4E schematically represents elements of a map interface for presenting hierarchically organized search results according to an embodiment of the invention.

As shown in FIG. 4C, if the user opens the France node, then graph 860 expands to show that node's child, relating to documents referring to the Eiffel Tower. The user can open the France node either by selecting it within the graph structure (e.g., by clicking on it), or by clicking on the "star" or other representation of the node on the map 805. The "/" symbol shown in the left most graph 860 in FIG. 4C indicates that Paris is one of the containing regions for the Eiffel Tower. Alternatively, since there is only one location inside of France, the system could present graph 860', in which the fact that Paris contains the Eiffel Tower, and that France contains Paris, are represented by the use of the "/" symbol instead of requiring the user to continue to expand nodes to find that the Eiffel Tower is contained within Paris, and that Paris is contained within France. When the user selects the France node, the map 805 zooms to show greater detail of France. FIG. 4C shows the map as automatically zooming to the Paris street level and marking the Eiffel Tower with a "star," although this level of zoom is intended to be merely illustrative. As described in greater detail below, the UI can also represent the particular "snippet" of text from the searched document that refers to the selected node, e.g., " . . . Gustave Eiffel, the designer of the Eiffel Tower, engineered the internal supporting structure. The Statue of Liberty is . . . ," by annotating the map 805 with the snippet, by displaying the snippet associated with the corresponding node in the graph region 860, and/or by displaying the snippet in the text region (not shown). As shown in FIG. 4D, if the user instead unfolded the United States node, either by selecting the node on the graph 860 or by selecting the representation of the United States in map 805, the graph 860 would present the next-lowest children nodes belonging to the United States node, here New York (five locations) and Wisconsin (one location). The map 805 zooms to show a more detailed representation of the United States, and represents the New York and Wisconsin children nodes on the map. As shown in FIG. 4E, further expansion of the Wisconsin node provides greater detail in graph region 860 regarding the locations within Wisconsin to which the document refers, and also zooms in to show an appropriate level of detail in the map 805. Each node presented in graph 805 might have result extract text listed underneath it. The extract text can include, e.g., URLs, document titles, and other document or location information.

Various map behaviors can be tied to the geohierarchy. As the user navigates the geohierarchy, the system chooses which visual indicators to display in the map based on which node was most recently opened. For example, if the user opens the Wisconsin node, the map zooms into show Wisconsin and only the sublocations are plotted in the map. Similarly, if the user selects the United States node, it presents the sublocations but not a point-like marker at the center of the United States. Other representations of the locations within the selected node, and other levels of detail in the map, are possible.

This geohierarchy is particularly useful when navigating large result sets with millions of documents. One mode of behavior is to present map markers (visual indicators) for only the leaf nodes in the tree. As the user zooms in toward a particular area, the map markers might convert to polygons.

Another mode of behavior is to present map markers (visual indicators) for all nodes of the same level in the geohierarchy. The level of any node is simply the number of links between it and the geohierarchy's root node. By carefully organizing a particular geohierarchy, all regions of a similar type can be grouped together into the same level. For example, all continents might be level two, all countries level three, all administrative regions level four, all cities and all landmarks level five.

Nodes often have more than one parent. For example a landmark inside a city might have multiple parents: e.g. a neighborhood and a zipcode not fully contained in that neighborhood. For a particular implementation of the geohierarchical navigation GUI, such non-tree like graphs can be handled in different ways. For example, the visual indicator can appear in both.

Nodes can also have geofeature type information attached to them. For example, while cities and landmarks might both be at level five in the hierarchy, they are clearly different kinds of objects. They might be represented by different types of markers (visual indicators) in the map.

A user who is expert in a particular area may want to change the geohiearchy by rearranging parent-child links or by adding new nodes. For example, an expert in the neighborhoods of Boston might want to create several new neighborhoods by uploading or drawing polygons that cover the neighborhoods. By defining these new nodes, the user improves the navigation and organization of the results.

It will be understood that while the discussion with reference to FIGS. 3 and 4 assumes that the UI performs the hierarchical ordering of search results, the hierarchical ordering of search results can also be done remotely from the interface program, for example at data presentation subsystem 60. The functionality can also be distributed among different subsystems as appropriate.

Under another aspect, tools can be provided that allow users to better understand individual results within clusters of documents, such as providing a magnifying window showing detailed information. For example, users often ask the system to display a large amount of information that could clutter the map and detrimentally affect the user's ability to understand the results. While marker clustering, ghosting, hierarchies, and other techniques can help reduce the clutter, it can instead be useful to let the user know where the clutter really is, since the clutter actually contains information. Mounds of markers (visual indicators) indicate where more things are happening, and can help a user decide where to zoom in for more exploration. To facilitate this, a variety of tools can be used to help a user inspect groups of results. These tools give the user quantitative and visual diagnostics of mounds of results.

For example, a "magnifying tool" can be used to cause a section of the map display to expand into a larger number of pixels, so that the user can visually resolve more details. This type of movable magnifying glass is a common technique in mapping displays. Our system has an enhanced version of this tool that displays additional information derived from the documents associated with locations in the area being magnified. This information helps the user understand the information in that area without zooming the entire map into that area. The information can include the number of results within the magnifying window; a geohierarchy result display for just the results within the magnifying window; and relevant text annotations or "snippets" for multiple markers within the magnifying window (more below).

Figure 5A:
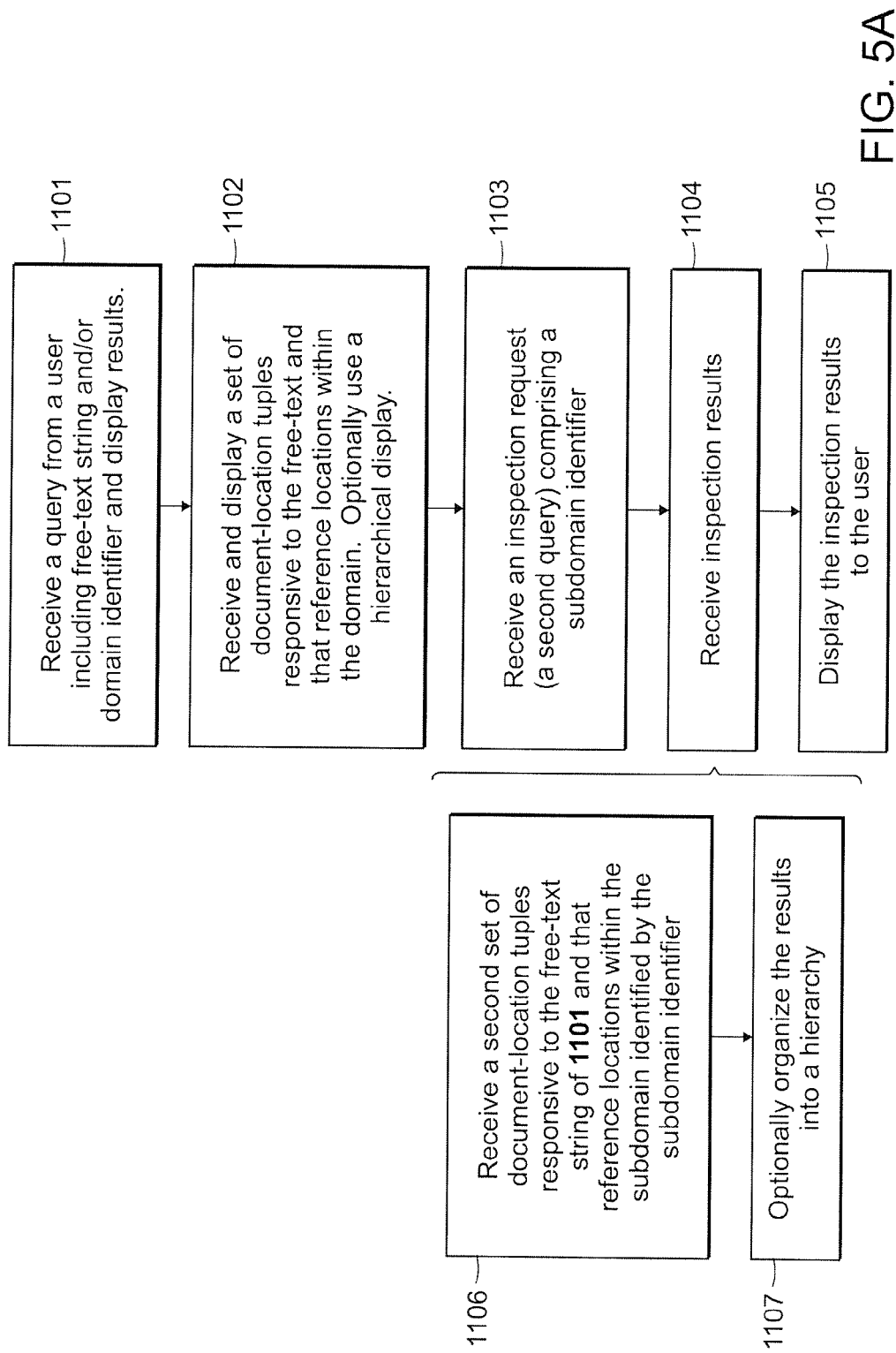
FIG. 5A is a schematic of steps in a method for allowing a user to inspect search results according to an embodiment of the invention.

FIG. 5A shows one method for allowing a user to inspect search results. First a user issues a first GTS query 1101 that can include a free-text string, such as might be submitted through a FORM field in an HTML page, and/or a domain identifier, such as the bounding box for a map view displayed to a user. If absent from the query, the free-text string is treated as the empty string. If absent from query, the domain identifier is treated as the whole space, such as the entire planet Earth. The user's query is sent to an index engine, which returns a list of relevance-sorted document-location tuples and associated metadata responsive to the domain identifier and free-text query, which are displayed 1102 to the user, e.g., on a map, as described above. Optionally, the results are hierarchically organized, as described above. Next, a user request for result inspection is accepted 1103. In the inspection request, the user identifies a subdomain of particular interest within the domain identified in the first query, so the larger domain identifier need not be changed. The inspection request is treated as a second query, and responsive to the second query the system receives a set of document-location tuples 1104 for the subdomain 1106 and displays them alongside the results of the first query 1105 while continuing to display the larger domain of the first domain identifier. The additional results may be presented in a totally different way, such as callout or popup boxes with text about the various documents and locations in the document-location tuples retrieved for the subdomain. The inspection results are optionally organized hierarchically 1107.

Figure 5B:
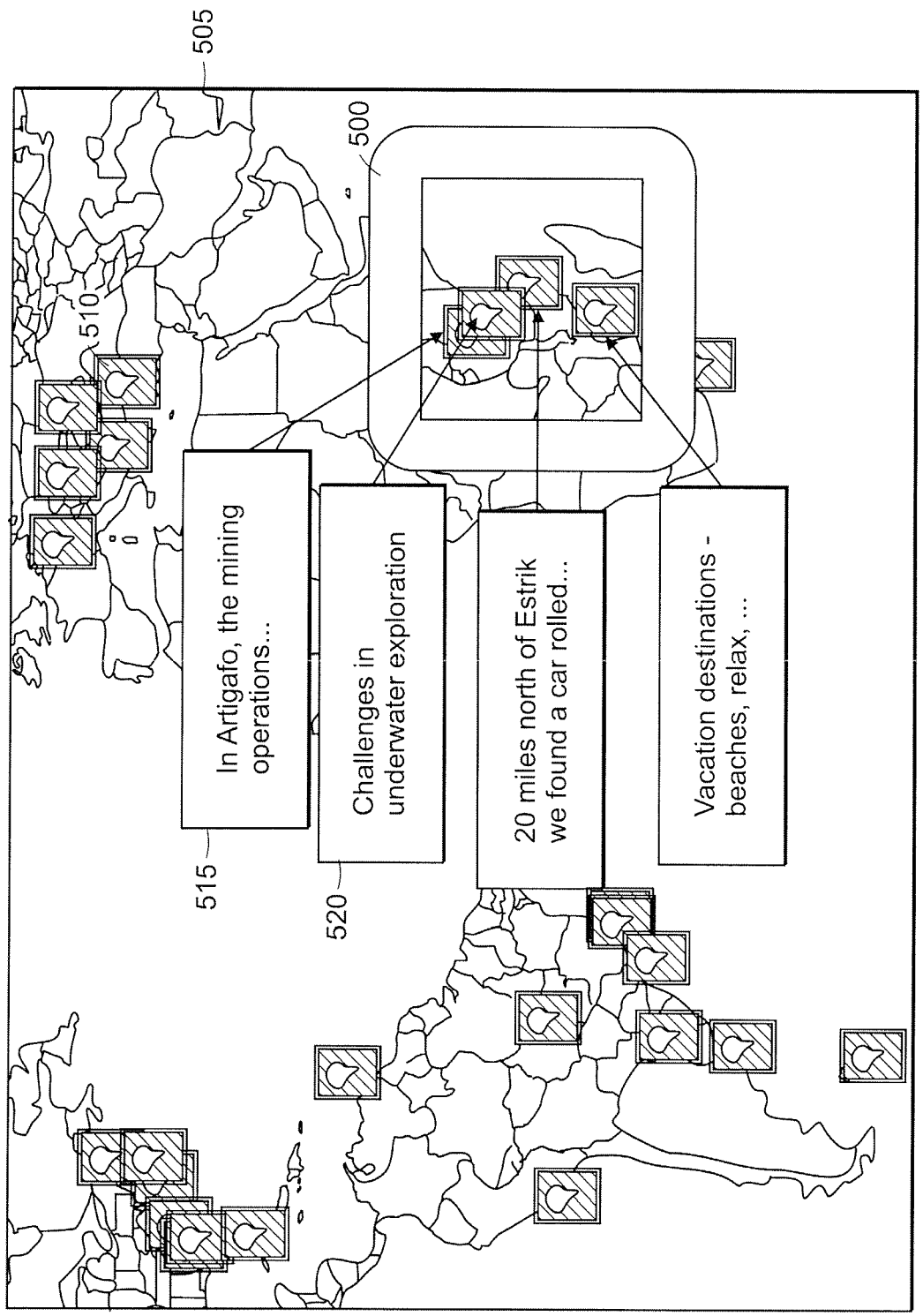
FIG. 5B schematically represents elements of a map interface for allowing a user to inspect search results according to an embodiment of the invention.

FIG. 5B shows an exemplary map interface that allows the user to inspect search results using a movable "magnifying window" or bounding box that encompasses a subdomain of specified area. The interface includes a map 505 that represents the domain of the first query. A plurality of visual indicators 510 representing the results of the first query are displayed on the map. The movable magnifying window 500 is of fixed size and thus encompasses a subdomain of specified area at a given map scale. Magnifying window 500 can also be made to have an adjustable size. As the user moves the magnifying window around the map 505, the interface uses subdomains encompassed by the magnifying window as inputs to inspection queries. In response to the inspection queries, the interface obtains a set of results based on the subdomain and displays information about those results to the user. For example, as shown in FIG. 5B, the top 4 results are shown annotated with snippets of relevant text, with lines connecting the text to the visual indicators. The number of annotated results can be set as desired. Methods of annotating results are discusses in greater detail below.

Desirably, the map markers (visual indicators) displayed in a geographic search UIs represent as much information as possible within just a few pixels. It can be useful to make the transparency of the marker proportional to the relevance of the information represented by the marker. It can also, or alternately, be useful to draw lines between markers representing location references within the same document.

Figure 6:
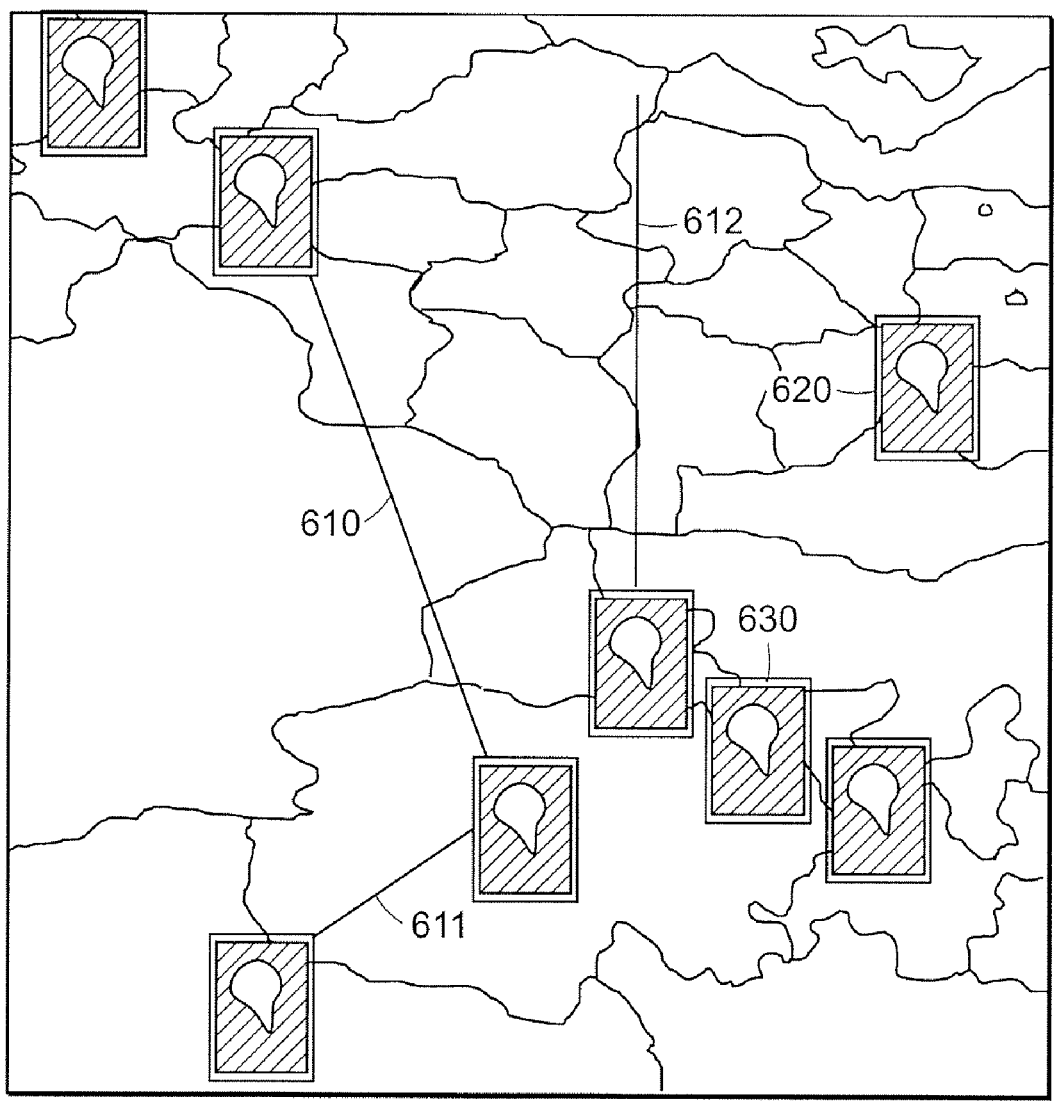
FIG. 6 schematically represents elements of a map interface for presenting search results according to an embodiment of the invention.

FIG. 6 illustrates an exemplary map interface using both the transparency of visual indicators and lines between indicators to provide additional information about the search results the indicators represent. For example, connecting lines 610 and 611, which connect three indicators, represent that those three indicators' locations are all referenced in the same document. The single line 612 fading as it goes north indicates that that indicator's location is referenced in a document that also references another location that is off the map in the direction of the line.

Some indicators also have different transparency than one another, because they represent results with different levels of relevance. For example, indicator 620 is less transparent than indicator 630 because the document that indicator 620 represents has a higher relevance score than the document that indicator 630 represents.

In one embodiment, when the user clicks any of the three indicators connected by lines, a special popup appears that shows all three georeferences in the document. The other indicators generate popups with just the snippet for their individual georef.

Providing Statistically Interesting Geographic Information Based on Queries to a Geographic Search Engine When entering free text entry queries to a GTS, it is sometimes desirable to receive additional information other than document-location tuples. While geographic search is typically focused on extracting snippets of text from documents that refer to geographic locations, there are other pieces of information that are geographically referenced and are useful to users of geographic search systems. As is described in U.S. Pat. No. 7,117,199 a geographic search system responds to queries containing free text entry and a domain identifier by finding documents that both refer to geographic locations within the displayed map area and also are responsive to the free text query. The geographic search system then displays visual indicators in the map that represent these documents.

Here we disclose additional information that can be obtained based on the user's query. In one embodiment, a subsystem analyzes the free text query and domain identifier input by the user in order to identify questions related to the user's input, that can be answered using geographic information available to the system. Once the subsystem has identified a question or possibly a set of questions relevant to the user's input, then it attempts to answer using a variety of data sources—some of which may be corpora of documents and some of which may be other databases with different or additional structure.

This goes beyond simply finding text in documents responsive to the keywords, because it can construct answers in the form of statements of fact. Previous embodiments simply show text extracted from documents. The current system rearranges that text and can incorporate data from multiple sources to construct statements that are either known to be factual or can be presented as possibly factual. We call these factual or possibly factual structured statements "answers." Answers are sometimes more useful than search results.

While not all free text queries entered by users can be answered directly by a computer system using heuristics and artificial intelligence algorithms, if the question is simple enough to get an answer, then this answer is often more appreciated by the user than a set of search results that require the user to process and understand documents in order to find the answer.

Non-geographic examples of this type of question answering are well known on the public Web, where it is common to see a search engine provide an factual answer to a user query. For example, a query for the word "pi" into Yahoo's or Google's or MSN's search engine generates a list of documents containing the word and also a "short cut" or "instant answer" presented at the top of the page showing the number "Answer: pi=3.14159265."

It is also common to see answers that suggest a user look at a map. For example, if a user issues a query to a text search engine for the string "london" then it is common for a text search engine to respond with documents containing the string and also a suggestion that the user view a map of "London, England." If a user is looking at a map, and the system recognizes that the user's query string is a geographic location, it may limit the suggested locations to those within the present map view.

Here, we disclose a method of producing answers when the answer is based at least in part on a domain identifier. The answer can additionally be responsive on a free-text query that does not itself reference a geographic domain. This is considerably more difficult than simply providing the number Pi, because geography introduces additional degrees of freedom in both interpreting the user's question and presenting the answer.

Figure 7A:
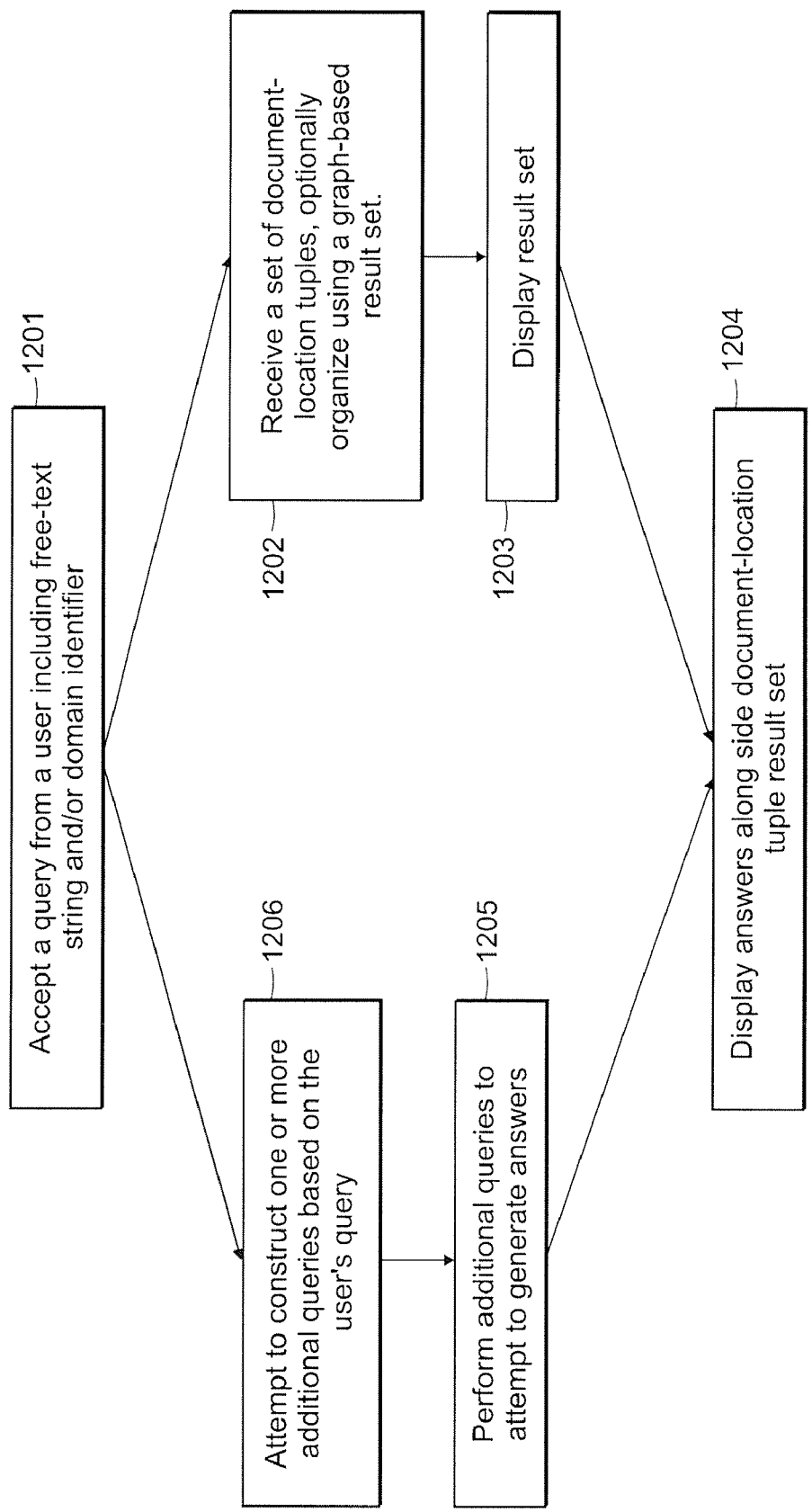
FIG. 7A is a schematic of steps in a method for constructing additional queries in response to a user query according to an embodiment of the invention.

FIG. 7A is a flow chart of a method for generating one or more answers based on a user's query. First, the user interface accepts a query from a user 1201. The user's query 1201 can include a free-text string, such as might be submitted through a FORM field in an HTML page, or it can include a domain identifier, such as the bounding box for a map view displayed to a user, or can include both. If absent from the query, the free-text string is treated as the empty string. If absent from query, the domain identifier is treated as the whole space, such as the entire planet Earth. The interface then receives a set of GTS results 1202 and display them to the user 1203. The interface, or an appropriate subsystem in communication with the interface, also attempts to construct one or more additional queries based at least in part on the domain identifier part of the user's query 1206 and attempts to use those queries to generate answers 1205 that it can display alongside the GTS results 1204. The interface or subsystem may use several means of attempting to construct additional queries, including sending substrings of the user's query string to topical databases to find subject matter that may be plotted on maps, such as population densities, types of locations, and locations of events.

As a simple example, the method of FIG. 7A can be used analyze the user's query to find words or phrases that could refer to data sets that are contained in structured databases, e.g. a search containing the word "population" might indicate that the user is interested in seeing the number of people living in the areas displayed in the domain identifier. While a regular geographic search system as previously described would search for documents responsive to the string "population," this new type of subsystem could respond by plotting population density directly from a database containing population numbers for various places. This population data is the answer. The subsystem can present this population information in several ways, for example:

Numbers can be plotted on the map.
Contour lines can be plotted on the map.
Density can be represented by splotches of color on the map.
Numbers can be listed in a hierarchical tree.

These various ways of presenting information could be used for many types of answers. The answer information can be presented along side regular GTS results, e.g., in the same user interface as the representations of document-location tuples.

There are many single words or short phrases that can be interpreted as questions with structured geographic answers. Examples include:

Words indicating numeric measurements and quantities, such as population and physical or geologic facts. Examples of this type of question include, "how deep is the harbor," "how tall are the mountains," "how much gold is in this area?" "population," "number of dairy cows," "volume of water flowing in these pipes." Answers to these types of questions often involve plotting numbers or contours in the map.

Words indicating points of interest or landmarks or types of physical entities or structures, such as the words "park," "buildings," "airports," "stations," "harbor," and other types of entities that are typically listed in a gazetteer. The answer to such a query can simply be highlighting these entities in the map and labeling them. Since this answer involves querying a database for entities within the map extent, it is a more sophisticated type of answer than Pi=3.14.

Words indicating types of events or issues that might occur in a particular area, such as "event," "kidnapping," "car crash," "road block," "landmine," "conference," "meeting," "speech," and other activities that might be listed in a history of occurrences. The answer to such a query can be highlighting locations in the map and labeling them with text descriptions from a database of events. Such a database typically has a temporal attribute that allows the system to display a timeline of the sequence of events. Such a database of events might be automatically constructed by extracting events from a corpus of documents. Human auditing of such a database might enhance the accuracy of the event descriptions. Since this type of answer involves querying a database for records within the map extent chosen by the user and possibly also time range information chosen by the user, it is a more sophisticated type of answer than Pi=3.14.

Words indicating interest in a movable object or transient presence, such as the location of a person or a weather event. Examples of such queries include, "storms," "tornados," "where is Osama Bin Laden?," "where will the levy break first," "what is the extent of the epidemic now?" Answers to these types of questions often involve animated graphics moving across the map with an indication of when the phenomenon was present at each location. For example, to answer the question about tornadoes, several different data sets might be presented simultaneously, including the historic density of tornado paths and the path of a tornado happening right now.

As is evident from these examples, many types of geographic questions require sophisticated analysis of the user's question. Our system uses a combination of handcrafted patterns and statistical rules for deciding what the user's question is. Using this analysis, our system constructs queries to multiple databases of different kinds.

If the query matches a handcrafted pattern such as "Where is _," then our system creates queries for the word in the "_" to a gazetteer database and also a database containing information extracted from corpora of natural language documents. If the gazetteer database responds with an exact match for the words in the "_," then this is more likely to be what the user wanted, so it is presented at the top of the results list. On the other hand, if there is no good match in the gazetteer database, then the first few results from the document database are more likely. The system can further enhance the answer from the document database by presenting the information in the form of statements of fact. For example, if the documents' authors have been identified, then the system can present answers in the form:

Author _ states that " . . . _ was first observed in _A_ and is now at _B_ . . . "

The _A_ and _B_ locations can be plotted in the map. A link to the document containing this statement can be provided, so the user can read more.

Under another aspect, "Blind relevance feedback (BRF)" can be used to perform a statistical analysis of documents, e.g., received in response to a user query. BRF is a well-known technique in information retrieval (IR). To perform BRF, an IR system does an additional set of analysis on the results returned for a regular user query. The IR systems looks through the results to find patterns that are both uncommon in the entire corpus of documents and common in this particular result set.

Figure 7B:
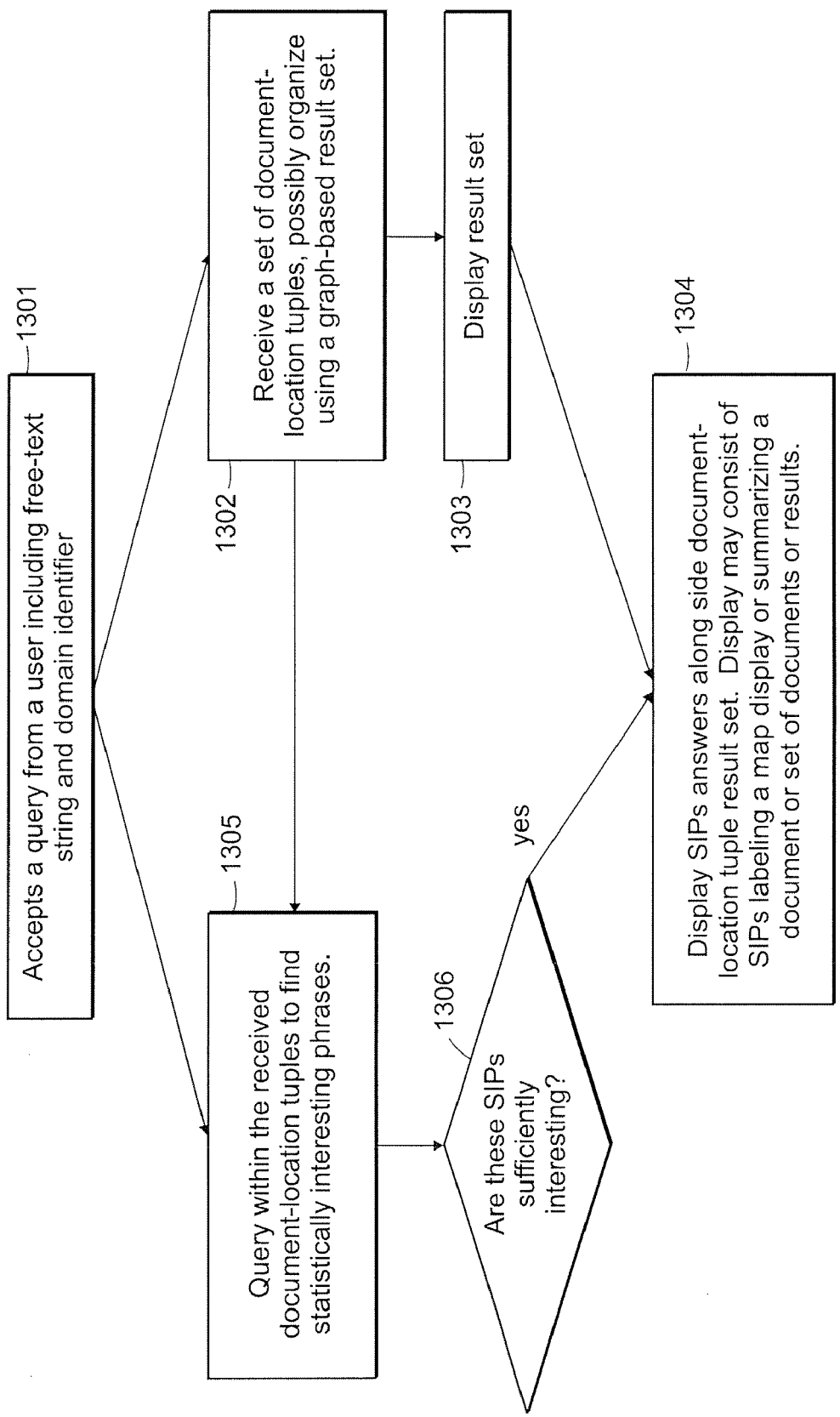
FIG. 7B is a schematic of steps in a method for identifying and presenting statistically interesting phrases in documents according to an embodiment of the invention.

FIG. 7B is a flow chart of steps in a method for statistically analyzing search results. First, the user interface accepts a query, e.g., a free text string and domain identifier, from a user 1301. A set of document-location tuples based on that query is received 1302, and displayed to the user 1303. The system then queries within the result set to find statistically interesting phrases 1305. "Statistically interesting" means that the phrases have a statistical property that distinguishes them from other phrases in the documents. For example, the phrases may have a statistical occurrence below a pre-determined threshold, or the top N phrases (e.g., as ranked by statistical occurrence) can be selected. If this generates sufficiently interesting phrases 1306, then they are displayed to the user 1304 as either additional summary text in the documents or as additional textual labels in the map. For example, if a user's query for "asbestos" generates a set of document-location tuples with extract texts containing the uncommon phrases "toll stop" and "break pads" then these additional phrases may be used to label the locations referenced in those documents that contain these statistically interesting phrases. In some embodiments, the statistical property that distinguishes the phrases is related to the user's query. For example, the statistically interesting phrases that are the most statistically similar to phrases within the user's free text query can be ranked higher than other phrases that are statistically interesting, but may not have as apparent a relationship to the user's query.

Figure 8A:
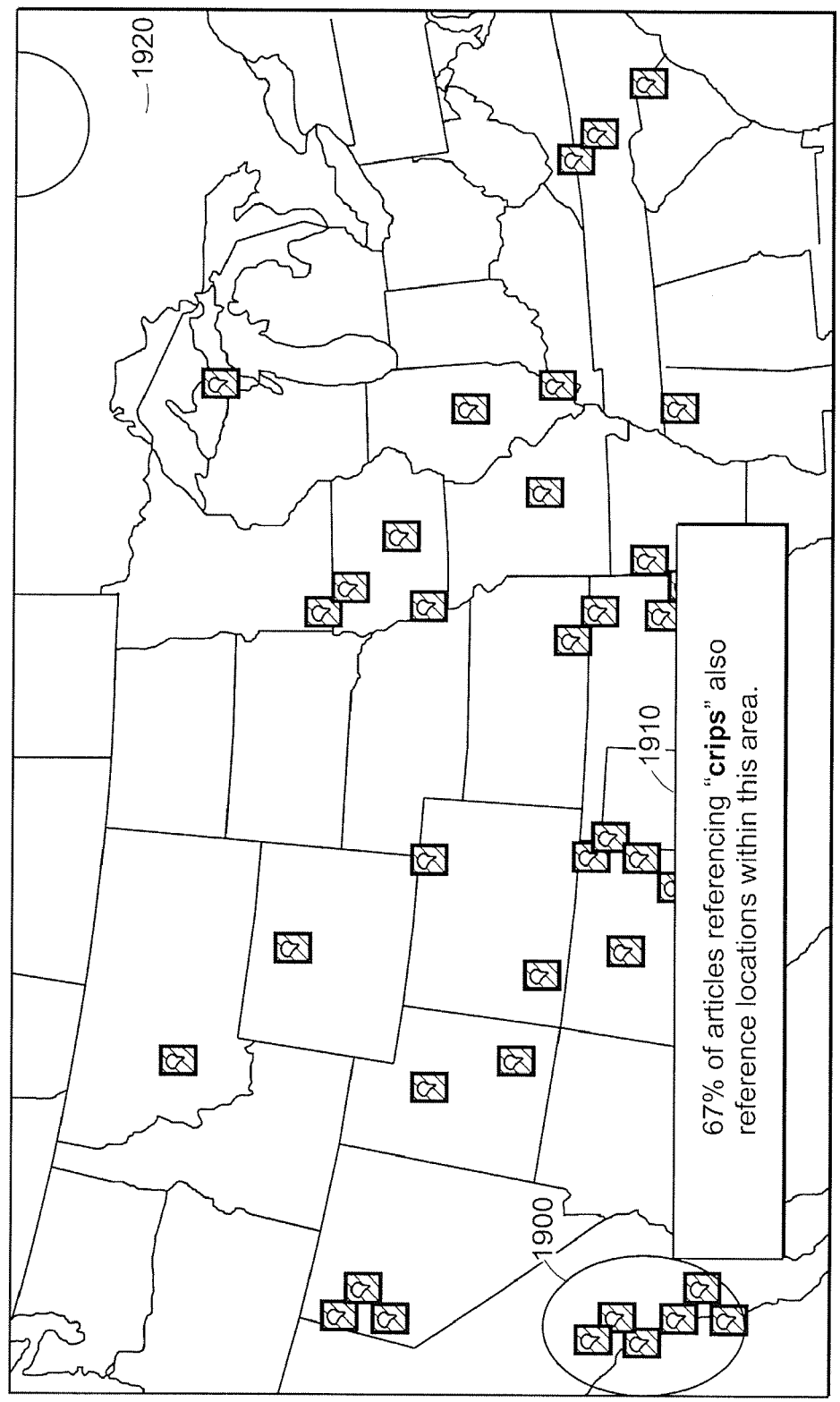
FIG. 8A schematically represents elements of a map interface for presenting clusters of documents having statistically interesting phrases according to an embodiment of the invention.

In one example, a query for the word "crips" might retrieve documents with a disproportionate number of references to Los Angeles, because "crips" is the name of a gang in that city. BRF allows the system to gather more information for the user. A typical use of this additional information is simply to present these statistically unusual phrases to the user as possible additional queries. In one embodiment, this additional BRF-derived information is presented on the map. For example, as illustrated in FIG. 8A, if a user entered a query for "crips" the method of FIG. 7B can be used to generate a user interface highlighting Los Angeles on the map 1920 with indicator 1900, and a text box 1910 stating the fact that "67% of documents referencing crips also reference this region." Even if the specific geographic reference is not Los Angeles itself, the system detects the geographic proximity to Los Angeles and includes this information in the statistics reported to the user.

As described in U.S. Pat. No. 7,117,199, a geographic search system presents a plurality of visual indicators in a domain identifier representing documents responsive to the free text query and containing references to locations within the domain identifier. Often, a single visual indicator represents a plurality of documents referring to the same location or nearby locations or locations that are visually indistinguishable at a particular map scale. When many documents refer to locations covered by a small visual area, for example a small number of screen pixels, then we call this visual area a "hotspot." The intensity of a hotspot is measured relative to the average spatial density of location references in the result set. A useful type of display technique for representing such a hotspot is one that visually indicates various facts about the hotspot, such as: the visual extent of the hotspot; the number of documents within the hotspot; the distribution of relevance scores for snippets of text that reference locations within the hotspot; the number of other searches recently occurring within that hotspot; and statistically interesting phrases extracted from the documents within that hotspot.

Figure 7C:
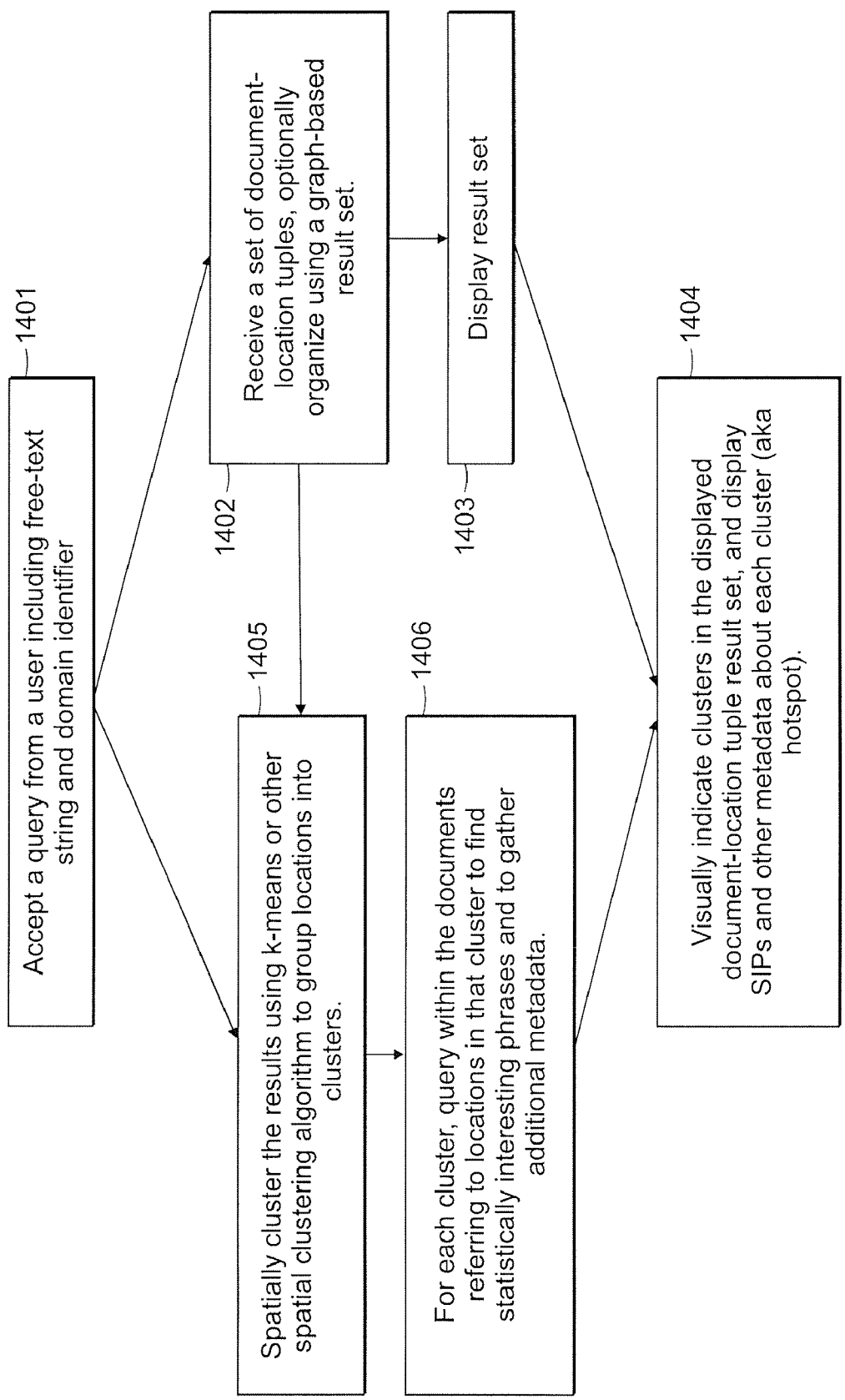
FIG. 7C is a schematic of steps in a method for identifying and presenting clusters of documents having statistically interesting phrases according to an embodiment of the invention.

FIG. 7C is a flow chart in steps in a method of visually indicating clusters of documents, and information about those clusters. First, a user interface accepts a query from a user 1401, e.g., a free text string and a domain identifier. The interface then receives a set of document-location tuples for that query 1402, and displays it to the user 1403. The interface, or an appropriate subsystem in communication with the interface, then queries within the result set to find clusters of locations 1405. Cluster detection can be achieved through k-means fitting of the locations' centroids or some other spatial clustering algorithm. For each spatial cluster, a query is performed within the subcorpus of documents that reference locations within that cluster in order to find statistically interesting phrases that describe that cluster 1406. Then, the interface displays visual indicators to indicate the locations of the clusters and annotate these locations with the SIPs 1404. For example, if a user's query for "asbestos" generates a set of document-location tuples with locations clustered at a couple spots along major highways and the documents within these clusters contain the uncommon phrases "toll stop" and "break pads" then these additional phrases are used to annotate these locations.

Figure 8B:
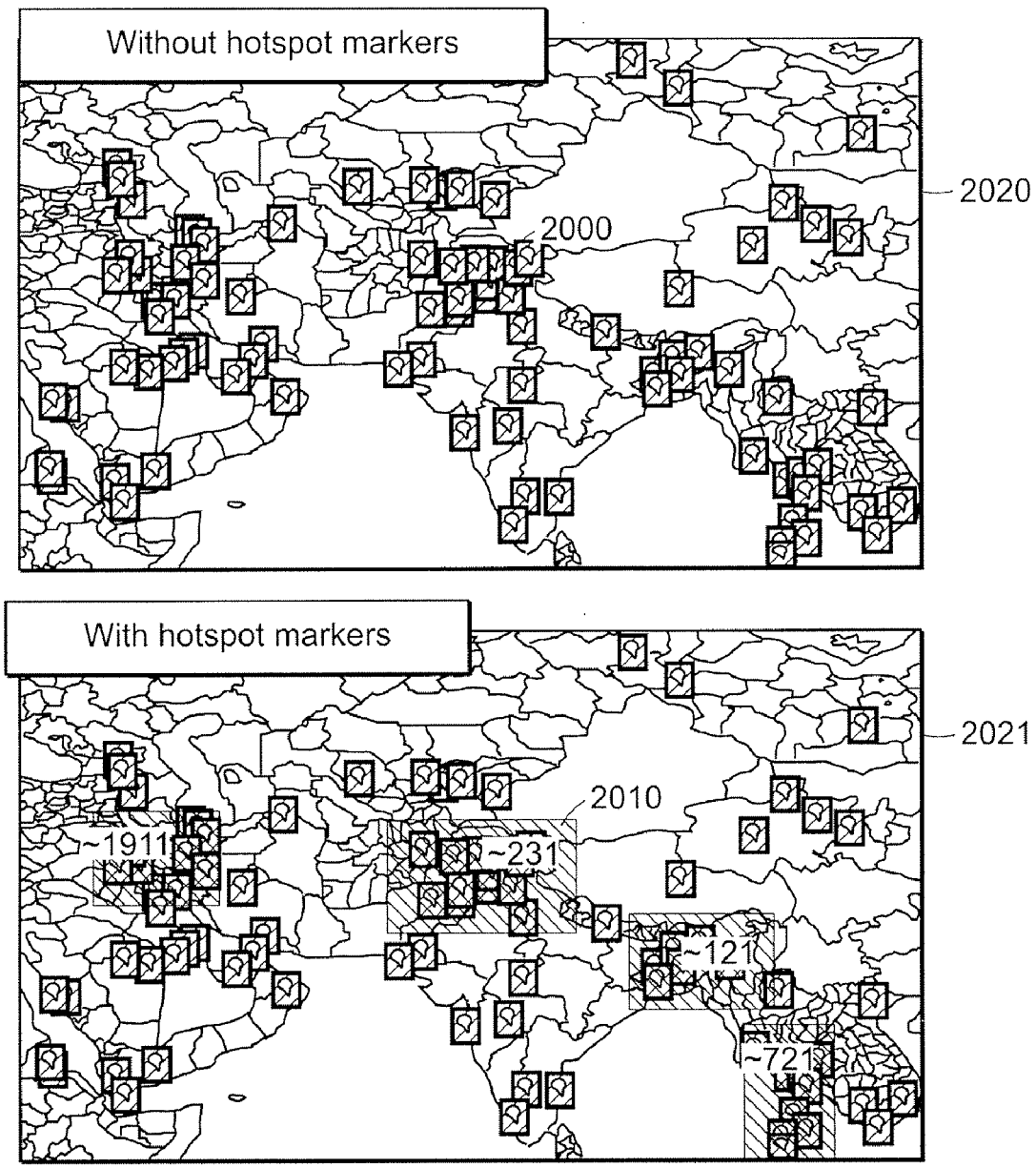
FIG. 8B schematically represents elements of a map interface for presenting clusters of documents according to an embodiment of the invention.

FIG. 8B shows two different geographic maps with geographic search results plotted on them. In the upper map 2020 without hotspot markers, the document markers indicate relevance to the users query by fading the intensity of the red color in the rectangular marker. Region 2000 has a large number of visual indicators "piled" on top of one another, making it hard to determine information about documents referring to that region. In the lower map 2021 with hotspot markers, hotspot markers, which are semi-transparent indicators covering regions of varying size and shape, have been added. The numbers presented in these new markers indicate the approximate number of documents responsive to the user's query within those regions. In the lower map 2021, region 2000 is covered by a hotspot marker 2010 which provides a cleaner representation of the large number of documents referring to that region.

When a user indicates interest in a hotspot, e.g., hotspot marker 2010, by mousing over or clicking it, the user interface displays additional information, such as those listed above.

To generate a set of statistically interesting phrases for a hotspot, the interface issues a query to the GTS system for the keywords entered by the user and for the bounding box indicated by the hotspot. This is the same type of query as was issued for the user to generate the larger display that includes the hotspot, but now the bounding box of the domain has been replaced with the bounding box for the subdomain of the hotspot. The GTS responds with extract texts for the document-location tuples matching this new query, and the system analysis these extract texts to find SIPs.

For example, if the user's query is for "crips" over a map of the entire united states, and a large fraction of the top 100 most relevant documents is near Los Angeles, then the system issues a second query over this region of the map. The system considers all the extracts together and looks for phrases that are common in the extracts but uncommon in general. The notion of "uncommon in general" can be defined by a set of one-gram and two-gram phrase frequencies extracted from a large corpus of text. In this example, the phrase "crips street gang" may occur frequently in the hotspot. The system would then display this SIP to the user when they mouseover the hotspot.

Under another aspect, the system has a notion of "geographic relevance," which allows the GTS to present those special substrings of a document that are both about a particular georeference and also statistically more likely to be interesting to a user.

A well-known practice in natural language processing and information retrieval is document summarization. Document summarization attempts to represent the gist and key statements of a document with a small subset of the strings in the document. One way to do this is to break the document in to sentences and rank the sentences on their statistical probability of their occurrence in a larger corpus.

Natural language processing experts have developed a variety of algorithms and heuristics for calculating the statistical probability of a sentence. A basic approach starts with a large corpus that is chosen to represent the writing style and topics of interest. Breaking the document into words and counting how many times each word occurs and dividing by the total number of tokens in the corpus yields the "unigram corpus frequencies." Breaking the corpus into strings of two tokens allows one to compute the bigram or 2-gram frequencies.

The unigram estimate of the probability of a given sentence occurring is the product of the corpus frequencies of all the words in the sentence. Computing the frequency of sentences of various lengths, and multiplying the estimate by the probability of a sentence of that length occurring in the corpus, can improve this estimate.

Many further enhancements to the sentence probability estimate are possible and well known. The most improbable sentences or phrases are considered to be the most interesting and therefore the most indicative or informative.

From such a process, one can break a document or a collection of documents into a ranked set of phrases. The highest ranked sentences are the most informative. This can be done before any user submits a query with particular words that could also be used to rank the phrases and sentences.

Given a ranking of the phrases in a document or corpus, particular attention is paid to those phrases or sentences containing georeferences. For any given location, there are typically many phrases containing a reference to that location. The best "labels" for a location are those phrases that contain the reference and are also most informative. These labels are used to describe the location in summaries of the location, and are plotted on the map as textual annotation. These summaries and annotations give information about the location that would otherwise require the user to explore a huge number of documents. Each snippet of text has a hyperlink back to the document from which it was extracted.

When a user does a geographic search with keywords and a particular area of interest selected with the map, the corpus is filtered into a smaller set of phrases and documents. Some of the best labels for a location might be eliminated because they do not match the keyword search. Nonetheless, these labels are informative, so we provide them in a separate listing and separate map annotation layer. Those snippets that are most statistically similar to phrases selected by the user's keyword query are ranked higher. Statistical similarity can be measured simply by number of infrequent words in common.

Figure 9:
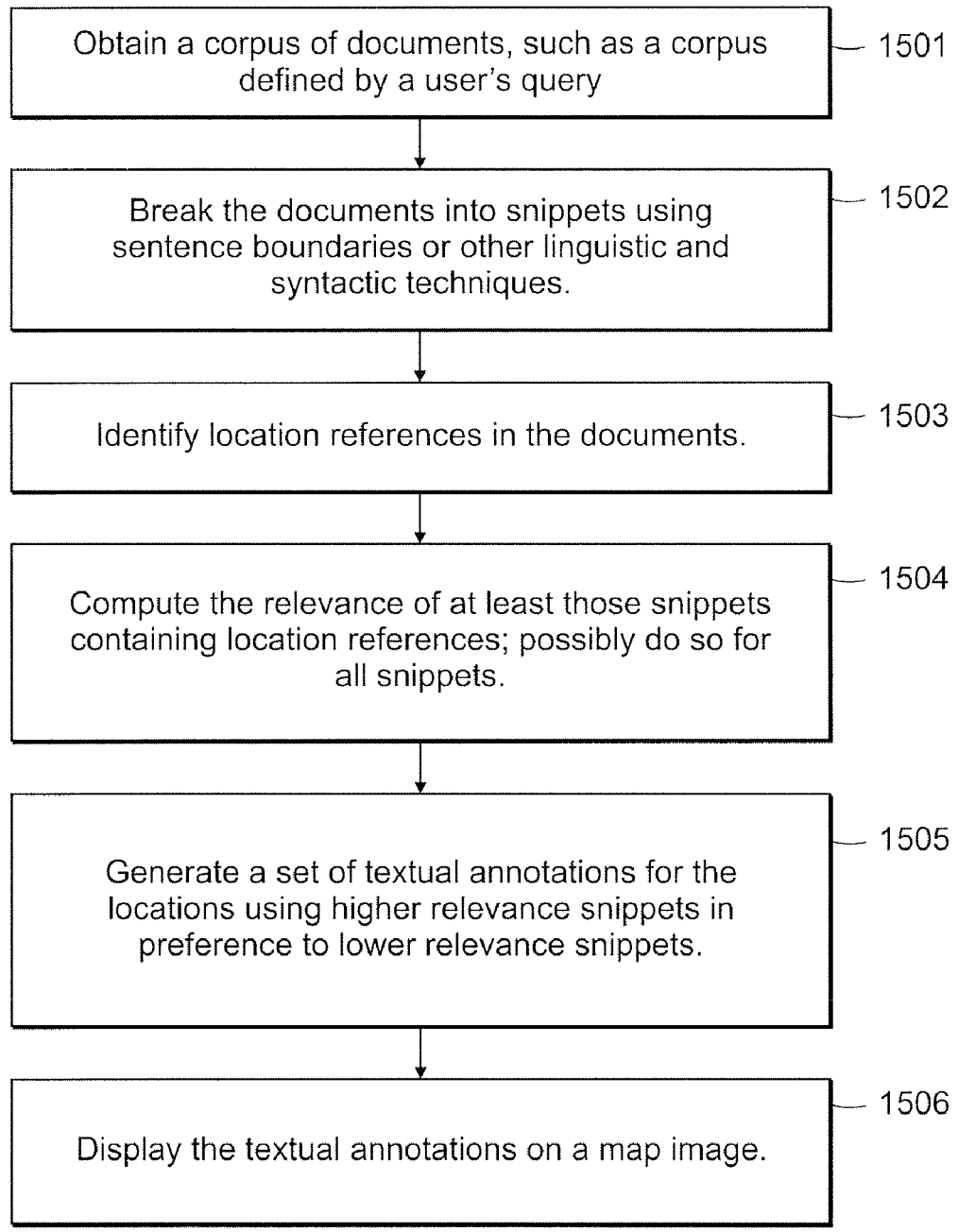
FIG. 9 is a schematic of steps in a method for annotating a map interface with statistically interesting phrases that reference locations according to an embodiment of the invention.

FIG. 9 is a flow chart of an illustrative method of annotating a map image with useful textual labels. First, the system obtains a corpus of documents by some means, such as through the action of a user's query to a search engine identifying a set of documents 1501, and generates labels from these documents. To generate the labels, the system breaks the documents into substrings of text 1502 using statistical parsing and other types of parsing techniques to generate a list of meaningful substrings, such as sentences. Then, the system identifies locations referenced in the documents 1503, for example, by using a geoparser engine. Then the system computes relevance scores or some other kind of ranking score for at least those snippets containing location references 1504. In some cases, it is useful to calculate scores for all the substrings, because then they can all be compared even if some do not have location references. By sorting the snippets with location references by their scores 1505, the higher scoring snippets can be used as textual annotations displayed to a user on a map that shows the referenced locations 1506.

Under another aspect, rare or unfamiliar georeferences (also called "georefs," "geotags," and "location references extracted from text") are often valuable for an automated system to extract and attempt to resolve, because a human searching for information will typically not think of looking for information about unfamiliar locations. Naturally, smaller locations that are less commonly known are more likely to be unfamiliar to any given user. Thus, locations that are infrequently referenced in a corpus are more likely to be valuable.

Given this understanding, special emphasis is placed on georefs that have been identified with high confidence and are also statistically rare. The rarer the location, the higher the "value score." When a user appreciates a particular georef, even ones with a low-value score, the system allows them to click a "high-value georef" button that increases the value score for other users in the future.

It is straightforward to compute a value score. One exemplary way to compute a value score is to analyze a large reference corpus for references to locations. The total number of references to a given location divided by the total number of all references to any location is a measure of the rareness. This ratio is called the reference frequency—lower ratios are more rare. When a geoparsing engine recognizes a particular reference to a location, it generates a confidence score indicating how likely it is that the author intended to refer to that location. To obtain a value score for this particular location reference, one can multiple this references confidence score by the inverse of that locations reference frequency. This number will be larger for more certain references to locations that are less commonly referenced.

Figure 10:
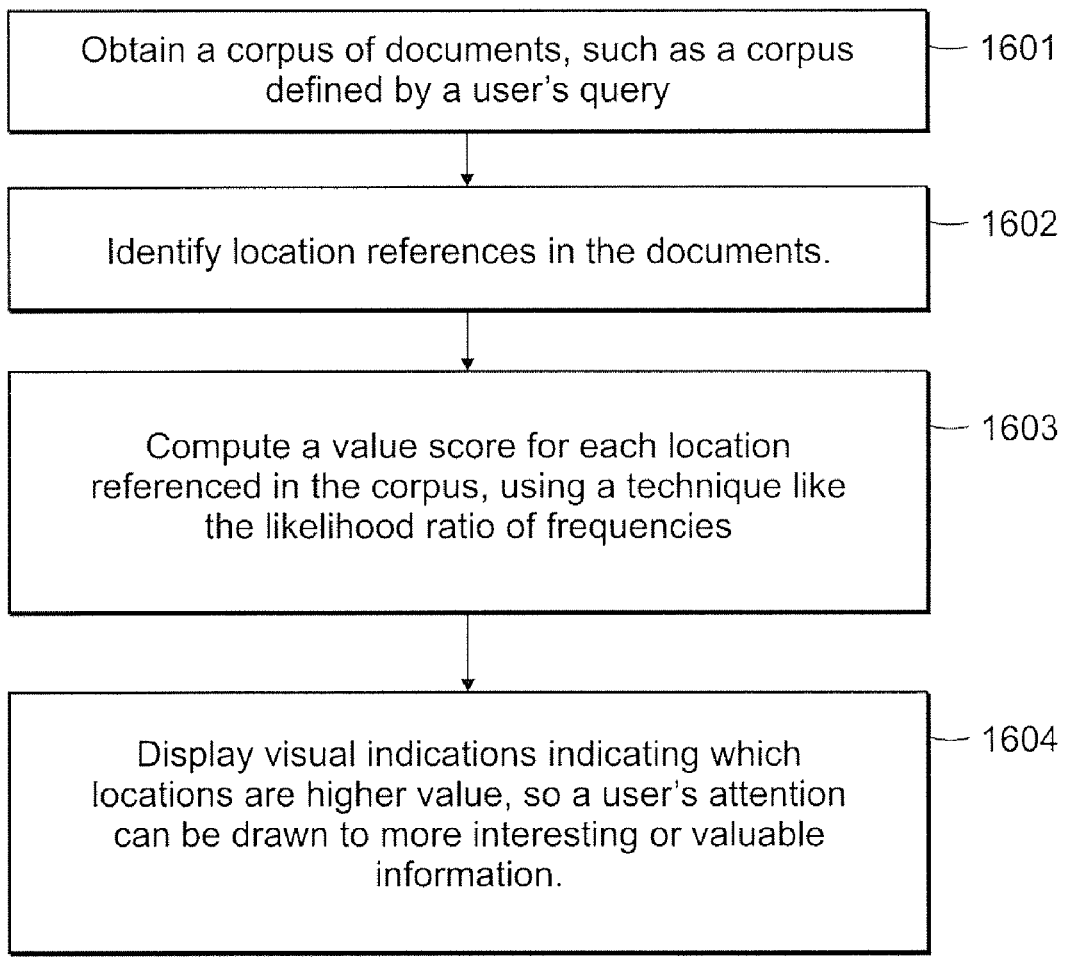
FIG. 10 is a schematic of steps in a method for presenting high value locations referenced in a corpus of documents according to an embodiment of the invention.

FIG. 10 illustrates steps in a method of identifying and displaying high value location references, or "georefs." First, a subsystem obtains a corpus of documents by some means, such as through the action of a user's query to a search engine identifying a set of documents 1601. The subsystem then assesses the value of each location referenced in the text. The subsystem does this by first identifying locations referenced in the documents using either an automatic geoparser or by getting them from an store of already identified location references 1602. Then, for each location referenced in the corpus, the subsystem computes a value score 1603. One way to compute a value score is to compare the frequency of occurrence of references to this location in this corpus to the frequency in a large "reference corpus" or "baseline corpus." Locations that are not commonly referenced in the baseline corpus but are commonly referenced in this corpus are more rare. Naturally, if a geoparser engine provides confidence scores indicating the probability that the author really intended a particular location interpretation of a substring in the author's document, then that confidence score should impact the value score such that less confidence location references are lower value. Higher value locations are then highlighted in the visual display 1604, either with different visual indicators in map images or in text highlighting or both.

Additional enhancements to the value score can come from incorporating aspects of statistically interesting phrase analysis. For example, a document that refers to a rare location many times puts greater emphasis on that rare location than a document that only mentions it once. Such greater focus might be rolled into the value score or represented as an independent score, like word relevance.

Similarly, the value score could incorporate geographic proximity or containment to recognize when a document refers to several rare locations that are close together or related.

Given value scores computed by some mechanism like the above, a user interface displaying location-related information from a corpus of documents can highlight locations of possibly greater interest in a number of ways.

One approach to using value scores is to choose a threshold and for all location references with value score above the threshold put special highlighting, such as bold face text or yellow background coloring, on text substrings that reference location.

Another approach to using value scores is to present a variable intensity display element such as variable opacity or color hotness associated with the references or visual indicators of locations. By changing the visual intensity in proportion with the value score, the user's attention is drawn to possibly more interesting locations.

For clarity, by "less frequently referenced locations" we mean locations with a high value score, where the value score is computed by some means similar to the above descriptions.

Generating and Correcting GeoTags

Under another aspect, a user reviewing a document can request location-related information about that document through a user interface, e.g. a "button" in a browser toolbar. The document need not have been received as a result of a GTS search, but instead can be any document that the user is interested in. When the user clicks the button or otherwise requests location-related information about the document, the text of the document is sent to a GeoParser server. The server responds with XML or javascript data that the user interface then uses to display a map and to highlight snippets of text that correspond to markers in the map. The document itself is not changed, and the floating map is superimposed on top of the page. This allows users to quickly and easily learn about the geography described in any document. The map can be hidden or made larger.

Figure 11:
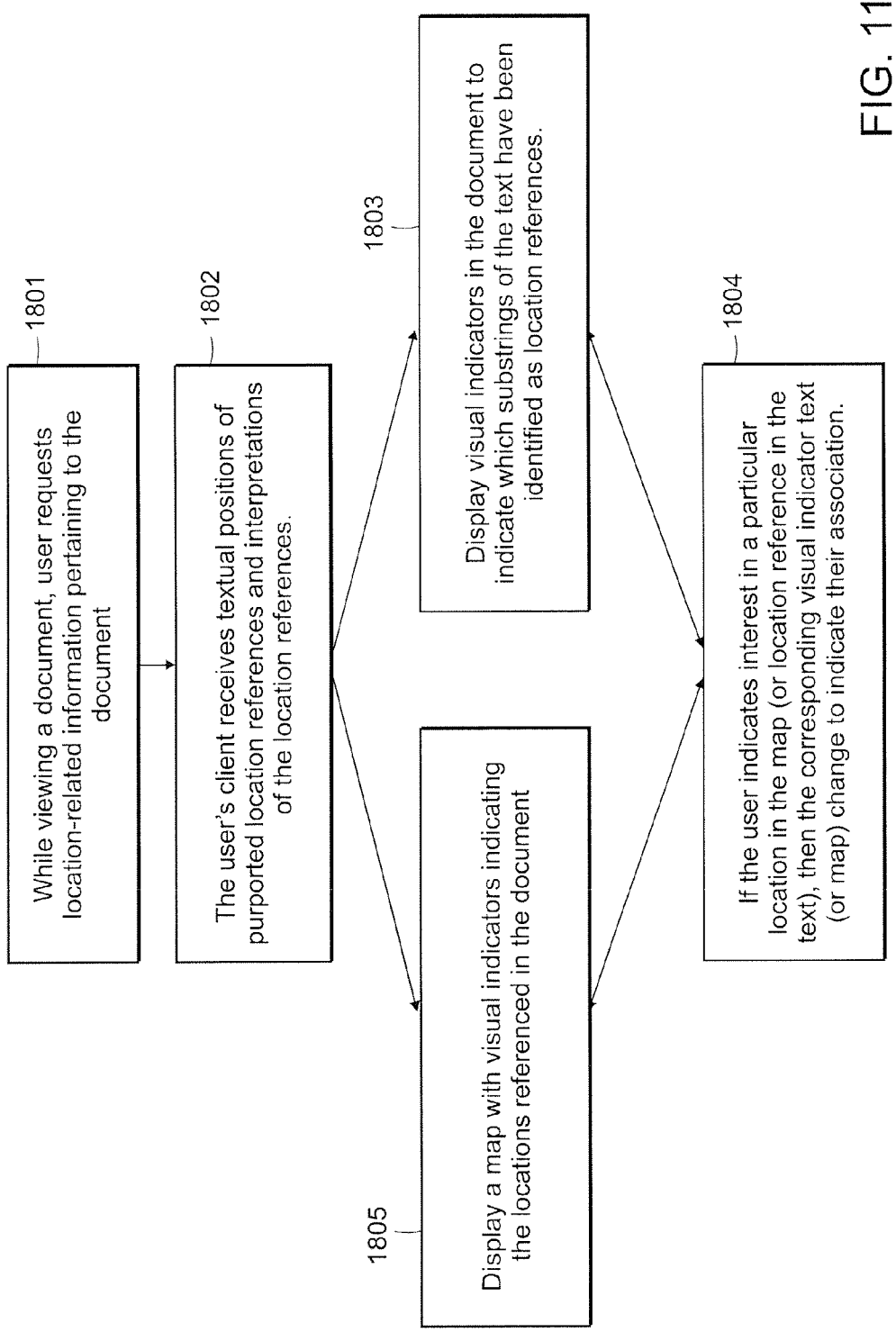
FIG. 11 is a schematic of steps in a method for requesting location-related information about a document according to an embodiment of the invention.

FIG. 11 illustrates steps in a method of helping a user understand the text that they read in a document by allowing users to request automatically generated location-based information. When the user requests this information 1801, the interface requests and receives a plurality of location references within the document 1802 from an appropriate subsystem in communication with the interface. To obtain the location references for the document, the interface typically either transmits address information (such as a URL) to the subsystem, or transmits the document directly to the subsystem, or the subsystem has a copy of the to which the client refers. The subsystem then passes this document through an automatic geoparser engine or retrieves the location-related information from a database keyed on docID. system sends information about the location references to the user's client, which is typically a web browser 1802. The location reference information is sufficient to highlight 1803 the substrings of the document that reference locations and also to indicate these locations on a map 1805. These highlights and visual indications are coupled by the software running in the client, which allows the user to point at either the highlighted text or the highlighted map area in order to see the corresponding other highlight change. In some embodiments the interface program itself performs the analysis thus obviating the need to transmit the document to an external server or subsystem.

The user interface can also include a button in the toolbar that, when selected, opens a comment window that allows the user to enter a message to the humans maintaining the GeoParser server. After the user enters a message describing what they like or do not like about the geotags in the article (for example, if they found an error in a location reference), they can click a submit button and the text is sent to the server for human attention. Typically, this is used to file trouble tickets about various types of georefs that are either incorrectly tagged or not recognized by the GeoParser server.

Manual tagging is a common activity in the field of natural language processing. Manual tagging is the process of having humans annotate text documents by marking words and phrases as being particular types of references. For geographic natural language processing, it is common to have manual taggers mark strings of text that refer to geographic locations. For example, in the document from wikipedia above, a manual tagger would be expected to put tags around the geographic references like this:

"<GeoTag>Liberty Enlightening the World</GeoTag>, known more commonly as the <GeoTag>Statue of Liberty<GeoTag>, is a statue given to the <GeoTag>United States</GeoTag> by <GeoTag>France</GeoTag> in the late 19th century, standing at <GeoTag>Liberty Island</GeoTag> in the mouth of the <GeoTag>Hudson River</GeoTag> in <GeoTag>New York Harbor</GeoTag> as a welcome to all returning Americans, visitors, and immigrants. The copper statue, dedicated on Oct. 28, 1886, commemorates the centennial of the <GeoTag>United States</GeoTag> and is a gesture of friendship between the two nations. The sculptor was Frederic Auguste Bartholdi; Gustave Eiffel, the designer of the <GeoTag>Eiffel Tower</GeoTag>, engineered the internal supporting structure. The <GeoTag>Statue of Liberty<GeoTag> is one of the most recognizable icons of the <GeoTag>U.S. </GeoTag> worldwide; in a more general sense, the statue represents liberty and escape from oppression. It is also a favored symbol of libertarians . . . .

February 1979: <GeoTag>Statue of Liberty</GeoTag> apparently submerged, <GeoTag>Lake Mendota (Madison, Wis.)</GeoTag>"

Such manually tagged text can then be used to train a machine learning system to automatically identify georeferences in other text or it can be used to evaluate the output of such an automatic tagger.

Under one aspect, the manual tagging system disclosed herein introduces two important enhancements. First, it uses an automatic tagger to pre-process each document before presenting it to the manual tagging human, so that the human can simply correct the tags instead of having to create all the tags from scratch. The tags generated by the automatic system have, amongst possible others, these four properties:

Each tag identifies a string of text.

Each tag identifies a list of geographic entities that the author might have intended. Each geo entity can be displayed in a map.

Each geo entity listed has a confidence score indicating the probability that the author of the text intended to refer to this geographic entity.

Each tag identifies a section or sections of text in the document that are highly relevant to this geographic reference. These sections of text could range in size from a fragment of a sentence to the entire document.

The system presents this information to the manual tagger so that they can correct the tags. All four attributes can be adjusted. The manual tagger can remove a tag entirely or create totally new tags or merge multiple tags into one. For example, an automatic tagger might identify Lake Mendota and Madison and Wisc. as three different georefs, and the manual tagger might merge these three into one georef just to Lake Mendota.

The system displays the highest confidence geographic locations in a map, so that the manual tagger can see where they are easily. This is easier than having the manual tagger read coordinate numbers.

The manual tagger is expected to eliminate all but one geographic location interpretation for each georeference. This selected interpretation is then labeled with a 100% confidence score.

When the manual tagger highlights a piece of text using their pointer, the system automatically queries a gazetteer database for possible interpretations of the string. These possible interpretations are presented to the manual tagger in a list and on the map, so that they can choose the most correct interpretation. If the manual tagger does not see the interpretation that they believe is correct, the system allows them to click in the map to create a new geoentity. The map can be zoomed into a high-scale view to allow the manual tagger to choose the point location or polygon vertices that best represent the geoentity they are defining. The map shows high resolution satellite imagery of the real location, to aide in their creation of the point, line, or polygon entity.

This newly created geoentity is then saved into the system's gazetteer for future use by manual taggers.

This same map-clicking procedure can be used to improve the accuracy of the geoentities in the gazetteer. If the user finds a geoentity that is poorly represented, for example by a point instead of a polygon, they can improve that data by clicking in the map to create a polygon.

The ranges of text to which a particular georeference is relevant are called "georelevant text ranges." These text ranges often overlap. To handle this, the system steps through the automatically geotags one at a time, allowing the manual tagger human to see text ranges for each georeference one at a time. The extremes of the georelevant text ranges are marked with arrows that can be moved to reduce or expand the georelevant text.

After the manual tagger has corrected the tags, they click the "save" button to have the manually tagged document sent back to the server and saved for future use.

One type of future use is displaying the manually tagged document to users interested in the information in the document. In this situation, it useful to indicate to the user that this document has been manually tagged and has 100% confidence scores.

Most of the systems described herein utilize a GeoParsing engine to automatically identify strings of characters that refer to geographic locations. When a human reads a document, they use their understanding of natural language and the subject matter of the text to recognize the meaning of words and phrases in the text. This human understanding process copes with ambiguity and makes decisions about the meaning. Typically, people can figure out the authors intended meaning with high certainty. For example, a human reader can understand the difference between these references to places called "Paris:"

For example, consider this piece of text:

"President Bush visited families in the little town of Paris on his way to a rally in Galveston. Next week he will attend a birthday celebration for the president of France at his home on the outskirts of Paris."

When the GeoParser marks a piece of text as referring to a geographic location, the software is often not certain that the author really intended to refer to that particular location or even that the author intended to refer to a location at all. To cope with this, the GeoParser engine also provides a confidence score with each georeference that it postulates. These confidence scores are numbers that can be compared. Typically, they are probabilities that can be interpreted as the likelihood that the author really did intend this. These confidence scores allow automated systems to present users with the most likely information first and less confident information second.

Typically, a GeoParsing engine performs two steps: extraction and resolution. In the extraction step, the system decides which pieces of text refer to geographic locations. In the resolution step, the system decides which location the author meant by that string. The resolution step can produce multiple candidate answers with different confidence scores. Often, the highest confidence alternative is correct, but not always.

Probabilistic confidence scores range between zero and one. Most text is ambiguous and >90% confidence georeferencing is often not possible, even for state of the art systems.

All probabilities tend to occur frequently. That is, a GeoParser will often assign probabilities of 0.1, 0.2, 0.3, . . . 0.9, and all numbers in between.

Typically, when a user encounters an automatically generated georeference, the human can reach a higher degree of confidence than the automated system did. In fact, humans can resolve many georefs with essentially perfect certainty with little or no access to additional reference material, such as a gazetteer or map. Under one embodiment, a "Tag Corrector" GUI helps users feed their understanding back into the GeoParsing engine, so that it can produce better information in the future.

It is called the "tag" corrector because GeoParsers typically generate XML or other types of syntactic markings to indicate which strings are georefs and to which locations it thinks they refer. These XML marks are called "tags," and the Tag Corrector allows the user to fix errors by adjusting the tags or other marking indicators.

There are several contexts in which a Tag Corrector GUI is useful. The basic process of these various GUIs is similar:

An information system presents a user with pieces of information, some of which was generated by an automatic GeoParser. Examples include a geographic search GUI or an Article Mapper GUI.

The user recognizes that a particular georeference is not correct or has marked with lower confidence than the user's own confidence of the meaning. Using the example above, an automatic GeoParsing engine might mark the first reference to Paris as probably meaning Paris, France, which is wrong, and might mark the second reference as meaning Paris, France but with less than a probability of 1.0.

The Tag Corrector GUI makes it easy for the user to change the tags. Possible changes include Deleting a tag Extending or reducing the range of characters included in the tag Changing the confidence score of the tag Changing the location to which the tag refers Improving the precision of the location definition.

These pieces of information are sent back to the GeoParser engine, so that it can make use of them. This is often implemented with an HTTP POST across a network to a server hosting the GeoParser.

Figure 12:
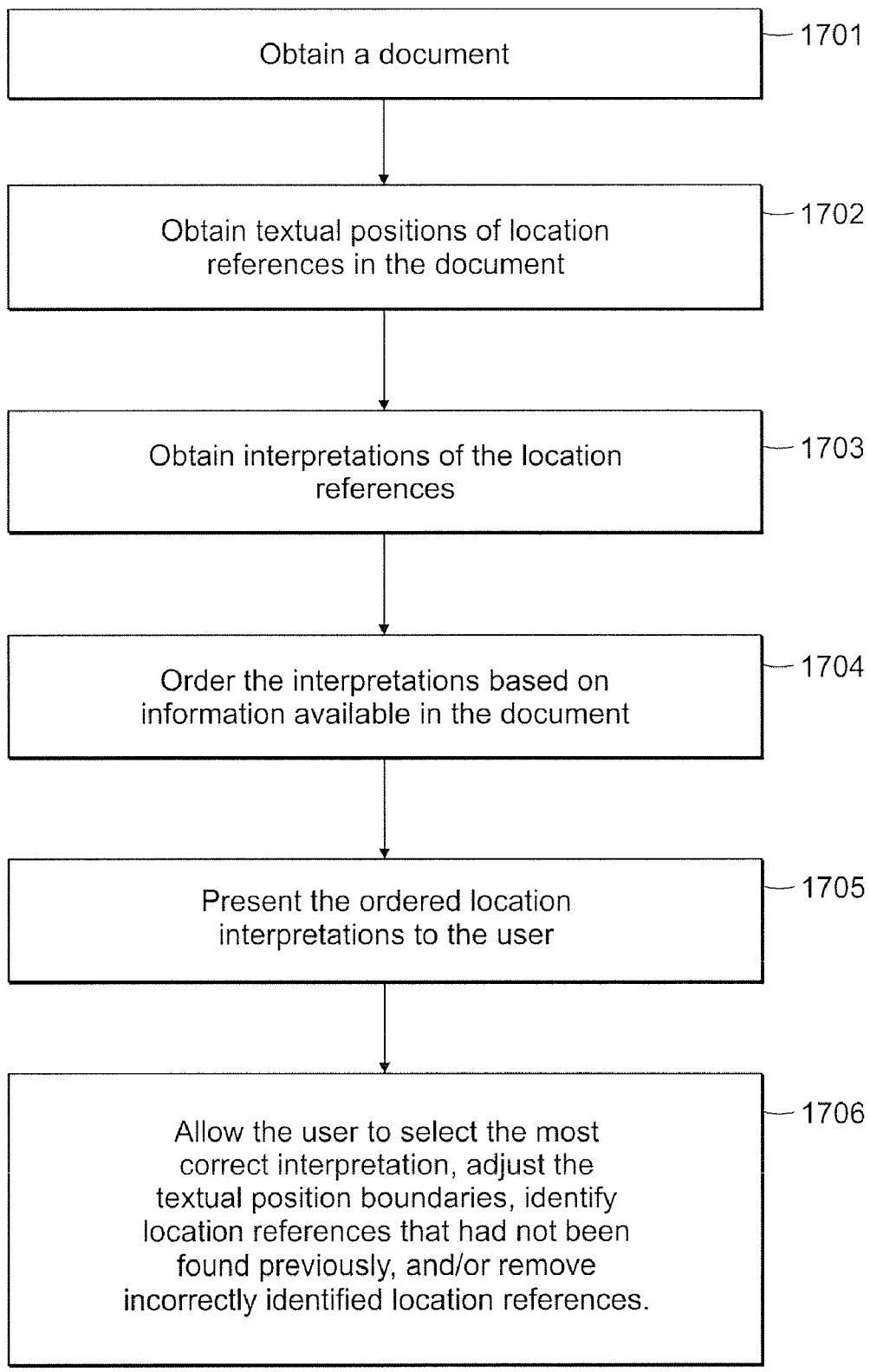
FIG. 12 is a schematic of steps in a method for allowing a user to correct location references extracted from text according to an embodiment of the invention.

FIG. 12 illustrates steps in a method of allowing humans to rapidly generate manually "truthed" documents by manually correcting location reference tags generated by an automatic process. First, the Tag Corrector GUI obtains a document 1701 through some means, such as a user uploading or selecting a document. The GUI then obtains the textual positions of location references in the document from a database or from an automatic geoparser engine 1702. The GUI also obtains interpretations of the substrings at these various textual positions 1703. These interpretations are ordered by likelihood that the interpretation is correct (i.e., corresponds to the writer's meaning), so that the most likely meanings are higher in the list 1703. By presenting this ordered list to the user 1705 and allowing the user to select 1706 from an ordered list, the system accelerates the person's progress. The system also allows the user to adjust the extent of the substring by adjusting the textual positions. The system also allows the user to identify location references that the automatic geoparser missed, and to adjust, change, or delete incorrectly identified location references.

This human-checked information can be useful in several ways. If another user is to be presented with the same information, e.g. because they requested the same document, the GeoParser can send the human-checked form of the information instead of regenerating the same wrong answers. If humans disagree with results previously checked by other humans, the GeoParser can indicate how many humans agree with a particular interpretation.

The GeoParser engine can also "learn" from the human-checked information in order to perform better on other documents that have not yet been manually checked. As is common in the art of machine learning, algorithms such as hidden Markov models and neural networks can utilize statistics gathered from manually checked documents to automatically analyze other documents. Such procedures are typically called "training." By incorporating more manually tagged information into the training process, the machine learning system typically performs better.

It is possible to automatically dump manually checked documents directly into a GeoParser for automatic training without human guidance. Often, a human engineer can adjust the machine learning system to take better advantage of manually tagged documents. It is often necessary to have a second layer of human auditing, i.e. people checking the information sent back to the system through the Tag Correcting GUIs. These people help ensure the quality of the corrected tags.

Tag Corrector GUIs gather information that can be used in all of these processes.

One useful feature of a Tag Corrector GUI is that it is easy for the user to change some aspect of the automatic information, and to send this information back to the server. Various embodiments of Tag Corrector GUIs can include the following specific types:

A listing of results to a search query often contains snippets of text extracted from documents that match the query. If the snippet of text contains a string of characters entered by the user, it is common in the art to highlight these substrings with a different color text or bold face. Geographic search introduces a new facet, because the user typically specifies their geographic region of interest by selecting a map view. While the search engine can be 100% certain that a document does or does not contain a string of characters entered by the user, the search engine must accept the less then perfect certainty of the GeoParsing when associating documents with the map. These associations only have the probabilistic confidence assigned by the GeoParser. Thus, it is useful to do more than just highlight the purportedly geographic strings in the extract text. One Tag Corrector GUI for search results puts little thumbs-up and thumbs-down icons in the search results, as illustrated in FIG. 13A. For example, this extract text might appear in a list of search results for the words "travels" and "water" with a map that covered the Middle East.

This type of GUI can be easily implemented with javascript running in the user's web browser. If a user clicks a thumbs-up icon, the javascript listening for clicks on that icon changes that location tag's confidence to 100% and immediately sends that information to the GeoParser server. If a user clicks a thumbs-down icon, the javascript listening for clicks on that icon removes the corresponding location tag by setting its confidence to 0. In the example above, a user would naturally click the thumbs-up on Oman and the thumbs-down on the Mohammed tag, because it is obviously a reference to the prophet himself and not to one of the small towns named after the prophet.

These icons gather feedback with a single click from the user.

A more sophisticated Tag Correcting GUI gives the user more control over the changes. For example, the Tag Correcting GUI illustrated in FIGS. 13B-13D allows the user to click on arrows and drag them in order to widen or narrow the string of text that has been tagged. By grabbing an arrow and dragging it all the way to the other arrow for the same tag, the user can close a tag. Also, clicking on an arrow and hitting the delete key deletes the tag. The little boxes indicate the confidence of the tag. The user can put the cursor in a box and type a different number, such as 1.0 or any other confidence they feel is appropriate.

FIG. 13B illustrates an exemplary section of text generated by an automatic geotagger and opened in a Tag Correcting GUI. FIG. 13C illustrates what the text might look like while being manually corrected in the Tag Correcting GUI.

The Tag Correcting GUIs discussed above and illustrated in FIGS. 13A-13C focus on the text. It can also be useful to let the user change the geographic meaning of the tag. Thumbnail images (defined above) can be helpful with this. For example, if the user disagrees with the location shown in the thumbnail near the highlighted text, they can click on the image to launch a tool for moving the location marker or expanding it into a polygon or line that better represents the real location. Such a user interface is illustrated in FIG. 13D.

Any changes the user makes are sent back to the server, so they can be incorporated into the gazetteer information used by the GeoParser.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-readable storage medium carrying one or more sequences of one or more instructions which, when executed by one or more processors, cause an apparatus to at least perform the following steps:
   determining to accept search criteria from a user, the search criteria including a domain identifier identifying a domain and a query;
   in response to accepting said search criteria from the user, receiving a set of tuples for a corpus of documents, at least one tuple
   (a) identifying a corresponding document in the corpus of documents satisfying the search criteria and
   (b) identifying location-related information referenced within that corresponding document and satisfying the domain identifier;
   determining to request and receiving a result from an additional query based at least in part on the domain identifier, the result not including any of the set of tuples; and
   determining to display a representation of at least a subset of the set of tuples and a representation of the result of the additional query; and
   wherein the additional query includes a query to a database.

2. A computer-readable storage medium of claim 1, wherein the representation of the at least a subset of the tuples comprises a plurality of indicators on a map image.

3. A computer-readable storage medium of claim 2, wherein the representation of the result of the additional query comprises an indicator on the map image.

4. A computer-readable storage medium of claim 1, wherein the additional query comprises a query to a database.

5. A computer-readable storage medium of claim 1, wherein the additional query comprises statistically analyzing phrases within the corpus of documents, and identifying a plurality of statistically interesting phrases based on the statistical analysis, the statistically interesting phrases having a statistical property that distinguishes them from other phrases in the documents.

6. A computer-readable storage medium of claim 5, wherein identifying the plurality of statistically interesting phrases comprises one of selecting phrases having a frequency of occurrence that exceeds a predetermined threshold, and selecting a pre-determined number of phrases having a frequency of occurrence higher than a frequency of occurrence of other phrases in the documents.

7. A computer-readable storage medium of claim 5, wherein the representation of the result of the additional query comprises a representation of the plurality of statistically interesting phrases.

8. A computer-readable storage medium of claim 7, wherein the representation of the plurality of statistically interesting phrases comprises a plurality of annotations on a map.

9. A computer-readable storage medium of claim 7, wherein the representation of the plurality of statistically interesting phrases comprises a list of the statistically interesting phrases.

10. A computer-readable storage medium of claim 7, wherein a plurality of the statistically interesting phrases are associated with a subdomain within the domain, and wherein the representation of the plurality statistically interesting phrases comprises a bounding box indicating the subdomain on a map.

11. A method comprising:
    determining to accept search criteria from a user, the search criteria including a domain identifier identifying a domain and a query;
    in response to accepting said search criteria from the user, receiving a set of tuples from a corpus of documents, at least one tuple
    (a) identifying a corresponding document in the corpus of documents satisfying the search criteria and
    (b) identifying location-related information referenced within that corresponding document and satisfying the domain identifier;
    determining to request and receiving a result from an additional query based at least in part on the domain identifier, the result not including any of the set of tuples; and
    determining to display a representation of at least a subset of the set of tuples and a representation of the result of the additional query; and
    wherein the additional query includes a query to a database.

12. The method of claim 11, wherein the representation of the at least a subset of the tuples comprises a plurality of indicators on a map image.

13. The method of claim 12, wherein the representation of the result of the additional query comprises an indicator on the map image.

14. The method of claim 11, further comprising determining to perform the additional inquiry, wherein the additional query comprises a query to a database.

15. The method of claim 11, further comprising determining to perform the additional inquiry, wherein the additional query comprises statistically analyzing phrases within the set of documents, and identifying a plurality of statistically interesting phrases based on the statistical analysis, the statistically interesting phrases having a statistical property that distinguishes them from other phrases in the documents.

16. The method of claim 15, wherein identifying the plurality of statistically interesting phrases comprises one of selecting phrases having a frequency of occurrence that exceeds a predetermined threshold, and selecting a pre-determined number of phrases having a frequency of occurrence higher than a frequency of occurrence of other phrases in the documents.

17. The method of claim 15, wherein the representation of the result of the additional query comprises a representation of the plurality of statistically interesting phrases.

18. The method of claim 17, wherein the representation of the plurality of statistically interesting phrases comprises a plurality of annotations on a map.

19. The method of claim 17, wherein the representation of the plurality of statistically interesting phrases comprises a list of the statistically interesting phrases.

20. The method of claim 17, wherein a plurality of the statistically interesting phrases are associated with a subdomain within the domain, and wherein the representation of the plurality statistically interesting phrases comprises a bounding box indicating the subdomain on a map.

21. A computer-readable storage medium carrying one or more sequences of one or more instructions which, when executed by one or more processors, cause an apparatus to at least perform the following steps:
    identifying a plurality of statistically interesting phrases occurring within a plurality of documents of a corpus of documents, the statistically interesting phrases having a statistical property that distinguishes them from other phrases in the documents;

identifying locations referenced within the identified statistically interesting phrases;
determining to display a representation of a domain, the domain encompassing at least a subset of the identified locations;
determining to display representations of the identified locations; and
determining to display the identified statistically interesting phrases, each of the displayed phrases visually associated with a corresponding one of the representations of the identified locations.

22. A computer-readable storage medium of claim 21, wherein the apparatus is caused to further perform:
computing a relevance score for at least one of the identified statistically interesting phrases, and displaying phrases having a relevance score exceeding a predetermined threshold.

23. A computer-readable storage medium of claim 21, wherein the statistical property of the statistically interesting phrases is related to a user's query.

24. A method comprising:
identifying a plurality of statistically interesting phrases occurring within a plurality of documents of a corpus of documents, the statistically interesting phrases having a statistical property that distinguishes them from other phrases in the documents;
identifying locations referenced within the identified statistically interesting phrases;
determining to display a representation of a domain, the domain encompassing at least a subset of the identified locations;
determining to display representations of the identified locations; and
determining to display the identified statistically interesting phrases, each of the displayed phrases visually associated with a corresponding one of the representations of the identified locations.

25. The method of claim 24, further comprising computing a relevance score for at least one of the identified statistically interesting phrases, and determining to display phrases having a relevance score exceeding a predetermined threshold.

26. The method of claim 24, wherein the statistical property of the statistically interesting phrases is related to a user's query.

27. A computer-readable storage medium carrying one or more sequences of one or more instructions which, when executed by one or more processors, cause an apparatus to at least perform the following steps:
identifying a plurality of locations referenced within a plurality of documents of a corpus of documents;
for at least one location of the plurality of locations, computing a value score based on a frequency of occurrences of references to the at least one location in the corpus of documents, wherein the computed value score varies inversely with how frequently the at least one location is referenced in the corpus of documents;
determining to display a representation of a domain, the domain encompassing the locations; and
determining to display an indicator on the representation of the domain, the indicator representing locations of the plurality of locations having a value score exceeding a predetermined value score.

28. A computer-readable storage medium of claim 27, wherein the indicator comprises a bounding box representing an area encompassing a plurality of proximate locations each having a value score exceeding the predetermined value score.

29. A method comprising:
identifying a plurality of locations referenced within a plurality of documents of a corpus of documents;
for at least one location of the plurality of locations, computing a value score based on a frequency of occurrences of references to the at least one location in the corpus of documents, wherein the computed value score varies inversely with how frequently the at least one location is referenced in the corpus of documents;
determining to display a representation of a domain, the domain encompassing the locations; and
determining to display an indicator on the representation of the domain, the indicator representing locations of the plurality of locations having a value score exceeding a predetermined value score.

30. The method of claim 29, wherein the indicator comprises a hounding box representing an area encompassing a plurality of proximate locations each having a value score exceeding the predetermined value score.

31. A computer-readable storage medium carrying one or more sequences of one or more instructions which, when executed by one or more processors, cause an apparatus to at least perform the following steps:
determining to accept search criteria from a user, the search criteria including a domain identifier identifying a domain and a query;
in response to accepting said search criteria from the user, receiving a set of tuples for a corpus of documents, at least one tuple (a) identifying a corresponding document in the corpus of documents satisfying the search criteria and (b) identifying location-related information referenced within that corresponding document and satisfying the domain identifier
identifying among the documents identified by the set of tuples a subset of documents referring to locations that are more spatially proximate to each other than to other locations referred to by the documents in the corpus of documents identified by the set of tuples; and
determining to display a representation of at the subset of documents.

32. A computer-readable storage medium of claim 31, wherein the representation of the subset of documents comprises at least one of a hotspot box and a plurality of annotations representing statistically interesting phrases within the subset of documents.

33. A method comprising:
determining to accept search criteria from a user, the search criteria including a domain identifier identifying a domain and a query;
in response to accepting said search criteria from the user, receiving a set of tuples for a corpus of documents, at least one of tuple (a) identifying a corresponding document in the corpus of documents satisfying the search criteria and (b) identifying location-related information referenced within that corresponding document and satisfying the domain identifier
identifying among the documents identified by the set of tuples a subset of documents referring to locations that are more spatially proximate to each other than to other locations referred to by the documents identified by the set of tuples; and
determining to display a representation of at the subset of documents.

34. The method of claim 33, wherein the representation of the subset of documents comprises at least one of a hotspot box and a plurality of annotations representing statistically interesting phrases within the subset of documents.

* * * * *